US008429088B2

(12) United States Patent
Kaplan et al.

(10) Patent No.: US 8,429,088 B2
(45) Date of Patent: Apr. 23, 2013

(54) ON-LOCATION ELECTRONICS TROUBLESHOOTING SERVICES SYSTEM

(76) Inventors: Scott P. Kaplan, Beaver Creek, OH (US); Preston L. Palmer, Gilbert, AZ (US); Nancy Schwartz, Beaver Creek, OH (US)

( * ) Notice: Subject to any disclaimer, the term of this patent is extended or adjusted under 35 U.S.C. 154(b) by 3379 days.

(21) Appl. No.: 10/757,221

(22) Filed: Jan. 13, 2004

(65) Prior Publication Data

US 2005/0015501 A1    Jan. 20, 2005

Related U.S. Application Data

(60) Provisional application No. 60/439,998, filed on Jan. 13, 2003, provisional application No. 60/484,298, filed on Jul. 3, 2003.

(51) Int. Cl.
*G06Q 10/00* (2012.01)
(52) U.S. Cl.
USPC ............................................. 705/305; 705/1.1
(58) Field of Classification Search .................. 705/305, 705/1.1
See application file for complete search history.

(56) References Cited

U.S. PATENT DOCUMENTS

| | | | |
|---|---|---|---|
| 5,334,821 A * | 8/1994 | Campo et al. ............. | 235/380 |
| 5,963,911 A * | 10/1999 | Walker et al. ............. | 705/7 |
| 6,188,994 B1 * | 2/2001 | Egendorf .................. | 705/40 |
| 6,587,851 B1 * | 7/2003 | Ditcharo et al. .......... | 707/6 |
| 6,847,816 B1 * | 1/2005 | Sarradin .................. | 455/407 |
| 7,069,333 B1 * | 6/2006 | Morris et al. ............. | 709/232 |
| 2002/0002633 A1 * | 1/2002 | Colling, III .............. | 709/318 |
| 2002/0025796 A1 * | 2/2002 | Taylor et al. ............. | 455/406 |
| 2003/0069797 A1 * | 4/2003 | Harrison ................. | 705/26 |
| 2004/0024789 A1 * | 2/2004 | Ditcharo et al. .......... | 707/200 |
| 2004/0044554 A1 * | 3/2004 | Bull et al. ............... | 705/8 |
| 2004/0068414 A1 * | 4/2004 | Springer ................. | 705/1 |
| 2004/0117155 A1 * | 6/2004 | Lane et al. ............... | 702/184 |

* cited by examiner

*Primary Examiner* — Candice D Wilson
(74) *Attorney, Agent, or Firm* — Stoneman Law Patent Group; Martin L. Stoneman

(57) ABSTRACT

A method and system for providing on-location troubleshooting services to homeowners and businesses for low-voltage electronic equipment and other on-location services. It employs the use of an Internet-based system for recording customer requests for service and subsequently automatically dispatching technicians and managing provision of the requested services. It also provides functions to support customer and technician recruitment and sign up. Additionally, it provides functions for recording customer satisfaction, requesting repair services and links to low-voltage electronics equipment suppliers for purchasing desired low-voltage electronics equipment. Service areas, work cells are established for groups of customers which are closely located geographically. Technicians are recruited and assigned responsibility for work cells based on whether their residence is in or close to a particular work cell or group of work cells. Customers and technicians may also access certain functions of the Internet-based system through telephones and telephone interface to the Internet-based system.

27 Claims, 38 Drawing Sheets

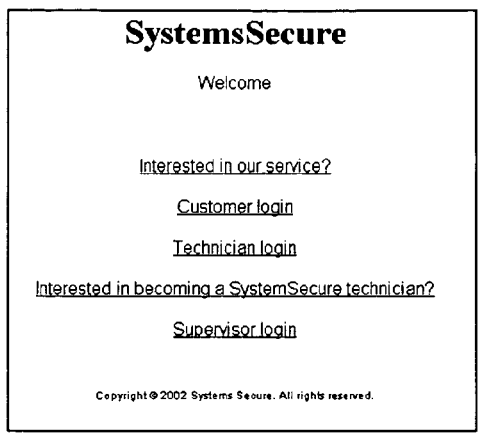
FIG. 45
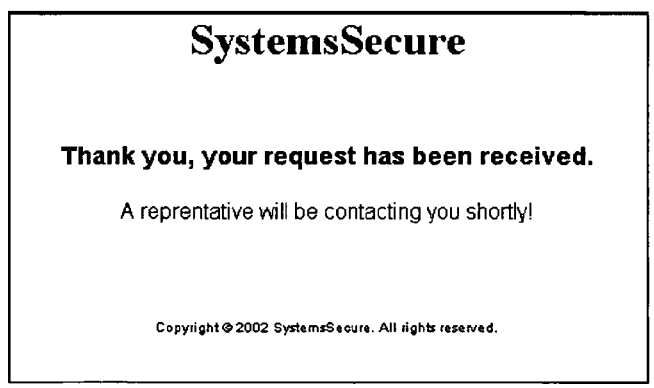
FIG. 46
FIG. 47

SystemsSecure

Customer Login:

Enter the phone number for this account: [_____]
in the form of 1234567890 (without dashes or parenthesis)

Enter the PIN number for this account: [_____]

[ Submit ]

Copyright © 2002 SystemsSecure. All rights reserved.

SystemsSecure

Sorry, incorrect login - please try again.

Customer login:

Enter the phone number for this account: [_____]
in the form of 1234567890 (without dashes or parenthesis)

Enter the PIN number for this account: [_____]

[ Submit ]

Copyright © 2002 SystemsSecure. All rights reserved.

FIG. 49

SystemsSecure

How can we help you?

○ Interested in adding service to another location

○ Moving

○ Moving service to another computer

○ Modify billing info

○ Comments:

[text box]

[Submit]

Copyright © 2002 SystemsSecure. All rights reserved.

FIG. 50

SystemsSecure

Thank you for your response

It will help us to continuously improve!

Copyright © 2002 SystemsSecure. All rights reserved.

FIG. 51

SystemsSecure

Technician login:

Enter the phone number for this account: ☐
in the form of 1234567890 (without dashes or parenthesis)

Enter the PIN number for this account: ☐

[Submit]

Copyright © 2002 SystemsSecure. All rights reserved.

FIG. 52

SystemsSecure

Sorry, incorrect login - please try again.

Technician login:

Enter the phone number for this account: ☐
in the form of 1234567890 (without dashes or parenthesis)

Enter the PIN number for this account: ☐

[Submit]

Copyright © 2002 SystemsSecure. All rights reserved.

FIG. 53

SystemsSecure

How can we help you?

○ Complete work order

○ Initial customer setup

Submit

Copyright © 2002 SystemsSecure. All rights reserved.

FIG. 54

SystemsSecure

Completed work report

Work order number: ☐

Time in: ☐ Time out: ☐
(use military time without a colon, e.g. 1830 for 6:30 PM)

Does the customer require services from a contractor?

○ No   ○ Yes

Submit

Copyright © 2002 SystemsSecure. All rights reserved.

FIG. 55

SystemsSecure

Incorrect work order number - please try again.

Completed work report

Work order number: [____]

Time in: [____] Time out: [____]
(use military time without a colon, e.g. 1830 for 6:30 PM)

Does the customer require services from a contractor?

○ No    ○ Yes

[ Submit ]

Copyright © 2002 SystemsSecure. All rights reserved.

SystemsSecure

Find a contractor

○ Commercial    ○ Residential select one... ▼
| select one... |
| Communications |
| Computer/Network |
| Electrician |
| Security |

[ Submit ]

Copyright © 2002 SystemsSecure. All rights reserved.

FIG. 57

SystemsSecure

Please help us improve with feedback on our service:

Enter your customer number [ ]

○ Completly satisfied  ○ Satisfied  ○ Unsatisfied

[ Submit ]

Copyright © 2002 SystemsSecure. All rights reserved.

FIG. 58

SystemsSecure

Incorrect customer login - please try again.

Please help us improve with feedback on our service:

Enter your customer number [ ]

○ Completly satisfied  ○ Satisfied  ○ Unsatisfied

[ Submit ]

Copyright © 2002 SystemsSecure. All rights reserved.

FIG. 59

SystemsSecure

Please enter the following information to be contacted about possible employment.

Name:

Address 1:

Address 2:

City:

State:

Zip:

Phone:

Email:

Please briefly describe your low-voltage systems background:

Submit

Copyright © 2002 SystemsSecure. All rights reserved.

FIG. 64

SystemsSecure

Supervisor login:

Enter the phone number for this account:
in the form of 1234567890 (without dashes or parenthesis)

Enter the PIN number for this account:

Submit

Copyright © 2002 SystemsSecure. All rights reserved.

FIG. 65

SystemsSecure

Sorry, incorrect login - please try again.

Supervisor login:

Enter the phone number for this account: [        ]
in the form of 1234567890 (without dashes or parenthesis)

Enter the PIN number for this account: [        ]

[ Submit ]

Copyright © 2002 SystemsSecure. All rights reserved.

FIG. 66

SystemsSecure

Please enter your information to setup your account.

Name: [        ]

Address 1: [        ]

Address 2: [        ]

City: [        ]

State: [    ]

Zip: [    ]

Cell Phone: [        ]

Home Phone: [        ]

Pager: [        ]

Email: [        ]

[ Submit ]

Copyright © 2002 SystemsSecure. All rights reserved.

FIG. 67

SystemsSecure

Welcome to the SystemSecure team!

Download the software

Note: Your PIN number will be emailed to you after the download is complete.

Copyright © 2002 SystemsSecure. All rights reserved.

FIG. 68

SystemsSecure

Use this page to change your customer information:

| | Current: | Revised: |
|---|---|---|
| Name: | Scott Kaplan | |
| Address 1: | 123 Wild Street | |
| Address 2: | Apt. 215 | |
| City: | Phoenix | |
| State / Provence: | AZ | |
| Zip / Postal Code: | 85032 | |
| Primary Phone (no dashes or parenthesis): | 1234567890 | |
| Secondary Phone: | 2345678901 | |
| Email: | scottk@yahoo.com | |
| Credit Card (no spaces or dashes): | ending in: 00031234 | |
| Expiration (month/year): | 0203 | |

Submit

Copyright © 2002 SystemsSecure. All rights reserved.

FIG. 69

ON-LOCATION ELECTRONICS TROUBLESHOOTING SERVICES SYSTEM

CROSS-REFERENCES TO RELATED APPLICATIONS

The present application claims priority from and is related to applicant's prior U.S. Provisional Application Ser. No. 60/439,998, filed Jan. 13, 2003, entitled "On-Location Electronics Troubleshooting Services System", and claims priority from and is related to U.S. Provisional Application Ser. No. 60/484,298, filed Jul. 3, 2003, entitled "On-Location Electronics Troubleshooting Services System", the contents of all of which are hereby herein incorporated by reference and are not admitted to be prior art with respect to the present invention by their mention in this cross-reference section.

BACKGROUND

This invention relates to a system for providing on-location electronics troubleshooting services to consumers and businesses in a manner that improves timeliness and quality of responses to requests for assistance. This system is made possible by the widespread availability of the Internet and improvements in related software.

In the past few years, the pace of change in low voltage electronics has accelerated and is likely to continue into the future. Low voltage electronics, typified by personal computers, also includes video and stereo equipment and all manner of devices from telephones to personal digital assistants. Not only has the number of devices increased, but their complexity has increased to the point where many are no longer installable without significant assistance from retailers and manufacturers. The increase in the number and complexity of low-voltage devices has made it increasingly difficult to troubleshoot problems when they inevitably arise. Recent economic troubles have forced many low-voltage manufacturers and dealers to reduce live telephone-based customer support as well in favor or email exchanges, FAQ (Frequently Asked Questions) lists or user forums. Even when support is available, it is often of marginal quality due to the low skill level of telephone support representatives and it has inherent limitations of time of day and the ability of the two parties to communicate clearly about a problem. Email exchanges and user forums are often time-consuming and require more knowledge than the user has and usually require multiple days to receive an answer, which answer has a high likelihood of being incorrect. FAQ lists can be helpful, but are usually limited to addressing only the most basic issues.

Today, beyond telephone support, the sources of assistance for consumers and small businesses are typically limited to: on-location assistance provided on an on-call basis; or technically oriented friends or family. And using either of these alternatives often means delays in getting a problem resolved in a timely manner. On-location full time technical support staff, which would theoretically be more responsive, is never an option for consumers; and most small businesses are unable to afford the cost. Additionally, telephone-based support is less and less often provided at no charge.

All the current alternatives are generally only available during business hours on business days; therefore, no help is available on nights and weekends. Consumers and small businesses are often forced to "live with a problem" for much longer than they would like or to pay a premium for on-location help on a one-time basis.

Additionally, most problems encountered are not intrinsic failures of a device, but are grounded in misunderstandings, user ignorance, and errors by users during installation or set up. This means that most consumers' and small businesses' low-voltage technical problems can be resolved quickly by a technically competent person working at the consumer's or business's location.

Furthermore, the problems faced by low-voltage devices manufacturers are common to a wide variety of other industries and service providers. Examples of other areas which face similar problems are services providers such as telephone companies, hotels, and information technology departments in large organizations and other service providers such as telephone and cable companies.

Coincident with these changes in low-voltage devices, a wide range of interactive devices have been developed to provide information to a variety of users via communications networks. These interactive devices include, for example, computers connected to various computer on-line services, interactive kiosks, interactive television systems, and a variety of other wired and wireless devices, such as personal data assistants (PDA's) and the like. In particular, the popularity of computer on-line services has grown immensely in popularity over the last decade. Computer on-line services are provided by a wide variety of different companies.

In general, most computer on-line services are accessed via the Internet. The Internet is a global network of computers. One popular part of the Internet is the World Wide Web, or the "Web." The World Wide Web contains computers that display graphical and textual information. Computers that provide information on the World Wide Web are typically called "Websites." A Website is defined by an Internet address that has an associated electronic page, often called a "homepage." Generally, a homepage is an electronic document that organizes the presentation of text, graphical images, audio and video into a desired display. These Websites are operated by a wide variety of entities, which are typically called "providers".

A user may access the Internet via a dedicated high-speed line or by using a personal computer (PC) equipped with a conventional modem or a variety of other wired and wireless devices. Special interface software, called "browser" software, is installed within the PC or other access device. When the user wishes to access the Internet by normal telephone line, an attached modem is automatically instructed to dial the telephone number associated with the local Internet host server. The user can then access information at any address accessible over the Internet. Two well-known web browsers, for example, are the Netscape Navigator browser marketed by Netscape Communications Corporation and the Internet Explorer browser marketed by Microsoft Corporation.

Information exchanged over the Internet is typically encoded in HyperText Mark-up Language (HTML) format. The HTML format is a scripting language that is used to generate the homepages for different content providers. In this setting, a content provider is an individual or company that places information (content) on the Internet so that others can access it. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.). When a web browser (or suitable executable program) accesses an HTML document, the web browser (or suitable executable program) reads the embedded tags in the document so it appears formatted in the specified manner.

An HTML document can also include hyperlinks, which allow a user to move from one document to another document on the Internet. A hyperlink is an underlined or otherwise emphasized portion of text that, when selected using an input device such as a mouse, activates a software connection module that allows the user to jump between documents or pages (i.e., within the same Website or to other Websites). Hyperlinks are well known in the art, and have been sometimes referred to as anchors. The act of selecting the hyperlink is often referred to as "clicking on" the hyperlink.

The advent and subsequent increased use of the Internet and its interconnected communications systems, coupled with new wireless technologies, may provide an opportunity for the development of new and advanced methods of providing skilled, timely on-location electronics troubleshooting services at a reasonable cost to the customer.

Additionally, a variety of other industries which provide some form of on-site service and support are also faced with problems and requirements are similar to those faced by the low-voltage electronics industry.

For example, hotels often have difficulty managing requests for deliveries to guest's rooms. Frequently guests request delivery of toiletries, food, etc., be to their room. Today, the requester (person or people) must call the front desk. Typically, person the front desk must in turn request that someone else deliver the requested items. This process presents a number of problems including no consistent way to track requests and deliveries of those items, difficulty in monitoring performance and completion, the involvement of several people and no tracking of the frequency of requests by the type of request, deliveries, repairs, etc.

Another example, many companies use call centers (not always in the US) to provide customer support. At best these can be frustrating and time consuming experiences for customers because it is frequently difficult to find the right person to help resolve the problem. This leads to unhappy customers and the need to maintain large call centers with their attendant expense.

A further example, information technology departments for many companies manage and process thousands of requests for help and service. Frequently, this support effort suffers from communications methods that ensure the highest priority problems are addressed first. Additionally, while voice mail and other forms of communication permit leaving a message with a person they do not permit centralized management including prioritization and assignment of the requests. Thus, problems are not resolved on timely basis and the support staff must each deal with conflicting priorities and frequent changes in work.

A final example, high rise building managers must deal with a constant flow of incoming service requests by tenants to the building manager. The building manager must then request the services of a trade contractor to address the problem. Finally the building manager must then follow up to ensure the problem is resolved. All this is typically very disjointed requiring many phone calls and time and effort for many people which results in improper work, late completions and unhappy tenants and trades contractors.

This opportunity is also applicable to a variety of other industries which provide some form of on-site service and support because their problems and requirements are similar to those faced by the low-voltage electronics industry. Such new and advanced methods (such as the inventions provided herein by applicant) of providing on-location support solve many of the current problems outlined above.

OBJECTS OF THE INVENTION

A primary object and feature of the present invention is provide a solution to these above-mentioned problems of the prior art by presenting a new and effective system for on-location electronics troubleshooting and similar services, typically available essentially 24 hours per day 365 days per year using skilled technicians—a new approach to troubleshooting by thinking "out of the box".

It is a further object and feature of the present invention to provide a system for managing customer communications of needs (whether involving repair or troubleshooting) and automatically dispatching technicians, with little or no human involvement, to the customers' locations based on a request from a respective customer.

It is a further object and feature of the present invention to provide a system which assists in the management of technicians and their work shift schedules with minimal supervisory involvement. It is still another object and feature of such a system to assist in recording completion of customers' troubleshooting requests and their satisfaction with the technician's work.

A further primary object and feature of the present invention is to provide such a system to permit customers to pay for the services in a variety of ways, including paying a monthly fee not directly related to the number of troubleshooting requests, paying a fee for each service request, or other combinations. It is another object and feature of the present invention to link with selected electronics suppliers to permit customers to purchase products for delivery at any time of day on any day. Further, it is another object and feature of the present invention to permit customers to request on-location repairs from qualified electronics repair companies.

It is yet another primary object and feature of the present invention to utilize the capabilities of the Internet-based on-location services management software to implement key functions and features of the invention. It is a further primary object and feature of the present invention to interface voice technology and the Internet-based on-location services management software to provide alternate methods of utilizing the invention. It is still another object and feature of the present invention to interface various wireless technologies with the Internet-based on-location services management software to implement key functions and features of the invention.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides an Internet-website-client-server-assisted system, relating to providing on-location electronics troubleshooting services, comprising the steps of: registering customer information relating to at least one customer; registering technician information relating to at least one technician having electronics-technician abilities relating to providing such on-location electronics troubleshooting services; maintaining a database, on at least one Internet website client server, of such customer information relating to such at least one customer; maintaining a database, on such at least one Internet website client server, of such technician information relating to such at least one technician; collecting automatically, using such at least one Internet website client server, at least one fee from such at least one customer relating to such on-location electronics troubleshooting services; receiving, on such at least one Internet website client server, requests relating to such on-location electronics troubleshooting services from such at least one customer; notifying automatically, using such at least one Internet website client server, such at least one technician to provide such on-location electronics troubleshooting services requested by such at least one customer; receiving on-location electronics troubleshooting service information, on at least one Internet website client server, from such at least one technician; and maintaining a database, on such at least one Internet website client server, of such on-location electronics troubleshooting service information.

Moreover, it provides such an Internet-website-client-server-assisted system wherein such at least one customer and such at least one technician are sufficiently co-located within geographical areas to provide appropriate response times. Additionally, it provides such an Internet-website-client-server-assisted system, wherein such step of receiving on-location electronics troubleshooting service information by such at least one technician comprises the steps of: receiving start time of such on-location electronics troubleshooting service, on such at least one Internet website client server, from selected such at least one technician; receiving end time of such on-location electronics troubleshooting services, on such at least one Internet website client server, from selected such at least one technician; storing such start time of such on-location electronics troubleshooting service on such at least one Internet website client server; and storing such end time of such on-location electronics troubleshooting service on such at least one Internet website client server. Also, it provides such an Internet-website-client-server-assisted system further comprising the steps of: receiving indication of any need relating to repair service, on such at least one Internet website client server, from such selected at least one technician; receiving indication of selected type of such repair service, on such at least one Internet website client server, from such selected at least one technician; storing such indication of any need relating to repair service on such at least one Internet website client server; storing such selected type of such repair service, on such at least one Internet website client server; selecting such at least one repair service of such selected type of repair service; and notifying such selected at least one repair service to contact such at least one customer.

In addition, it provides such an Internet-website-client-server-assisted system further comprising the steps of: receiving customer satisfaction evaluation from such selected at least one technician; and storing such customer satisfaction evaluation. And, it provides such an Internet-website-client-server-assisted system, wherein such step of collecting automatically, using such at least one Internet website client server, at least one fee from such at least one customer relating to such on-location electronics troubleshooting services comprises the steps of: agreeing to at least one payment of a specified amount by such at least one customer; and receiving such at least one payment. Further, it provides such an Internet-website-client-server-assisted system, wherein such step of receiving such at least one payment comprises the steps of: providing of credit card account information by such at least one customer; storing such at least one credit card account information, on at least one Internet website client server, relating to such at least one customer; authorizing at least one charge to such credit card account of such at least one customer; storing such authorization of at least one charge to such credit card account, on at least one Internet website client server, of such at least one customer; requesting at least one payment from such at least one credit card account on behalf of such at least one customer; and recording such at least one payment, on at least one Internet website client server, on behalf of such at least one customer.

Even further, it provides such an Internet-website-client-server-assisted system, wherein such step of requesting at least one payment from such at least one credit card account on behalf of such at least one customer comprises the step of requesting such at least one payment from such at least one credit card account on behalf of such at least one customer substantially automatically at pre-determined intervals. Moreover, it provides such an Internet-website-client-server-assisted system, wherein such step of requesting at least one payment from such at least one credit card account on behalf of such at least one customer comprises the step of requesting such at least one payment from such at least one credit card account on behalf of such at least one customer at completion of on-location electronics troubleshooting services by such at least one technician. Additionally, it provides such an Internet-website-client-server-assisted system further comprising the steps of: notifying such at least one customer requesting such on-location electronics troubleshooting services of estimated time of arrival of notified such at least one technician; and providing such on-location electronics troubleshooting services to such at least one customer. Also, it provides such an Internet-website-client-server-assisted system wherein such step of notifying such at least one customer requesting such on-location electronics troubleshooting services of estimated time of arrival of notified such at least one technician comprises the steps of: providing to such at least one customer such estimated time of arrival by such notified such at least one technician; and recording such estimated time of arrival provided by such notified such at least one technician.

In addition, it provides such an Internet-website-client-server-assisted system further comprising the steps of: providing such on-location electronics troubleshooting services to such at least one customer at any time of day; and providing such on-location electronics troubleshooting services to such at least one customer on any day. And, it provides such an Internet-website-client-server-assisted system, wherein such step of registering customer information relating to at least one customer further comprises the steps of: recruiting such at least one customer; obtaining agreement from such at least one customer to pay for such on-location electronics troubleshooting services; recording such customer information, on at least one Internet website client server, relating to such at least one customer; wherein such customer information comprises service location address; at least one contact name; at least one contact telephone number; and assigning such service location address to at least one geographic dispatch area. Further, it provides such an Internet-website-client-server-assisted system, wherein such customer information further comprises: customer name; customer billing address; customer email address; customer credit card number; and customer credit card number expiration date. Even further, it provides such an Internet-website-client-server-assisted system further comprising the steps of: providing on-location assistance relating to implementation of such on-site customer interface module of such Internet-website-client-server-assisted system to such at least one customer; and providing on-location usage training relating to such on-site customer interface module of such Internet-website-client-server-assisted system to such at least one customer.

Moreover, it provides such an Internet-website-client-server-assisted system, wherein such step of registering technician information relating to at least one technician having electronics-technician abilities relating to providing such on-location electronics troubleshooting services comprises the steps of: establishing a plurality of qualification criteria relating to selecting such at least one technician; wherein such qualification criteria comprise geographic location of residence of such at least one technician, and required minimum competency levels relating to electronics-technician abilities; and recruiting such at least one technician; and recording technician information, on at least one Internet website client server, relating to selected such at least one technician; wherein such technician information comprises technician name, technician home address, technician home telephone number, technician email address, and technician electronics-technician skills; selecting such at least one technicians using such plurality of qualification criteria; assigning such selected at least one technician a unique identification number; assigning such technician home address to at least one geographic dispatch area; and implementing at least one technician user interface module of such Internet-website-client-server-assisted system. Additionally, it provides such an Internet-website-client-server-assisted system, wherein such technician information further comprises: technician cellular phone number; and technician pager number.

Also, it provides such an Internet-website-client-server-assisted system wherein such step of receiving, on such at least one Internet website client server, requests relating to such on-location electronics troubleshooting services from such at least one customer comprises the steps of: inputting of login identification information, on such at least one Internet website client server, from such at least one customer; validating login identification information from such at least one customer; receiving confirmation of accuracy, on such at least one Internet website client server, of such customer information; receiving contact information, on such at least one Internet website client server, relating to such current at least one on-location electronics troubleshooting request; submitting of at least one problem description relating to such current at least one on-location electronics troubleshooting request by such at least one customer; and receiving of such at least one problem description relating to such current at least one on-location electronics troubleshooting request, on such at least one Internet website client server, from such at least one customer.

In addition, it provides such an Internet-website-client-server-assisted system, wherein such step of notifying automatically, using such at least one Internet website client server, such at least one technician to provide such on-location electronics troubleshooting services requested by such at least one customer comprises the steps of: selecting such at least one technician using dispatch selection criteria; wherein such dispatch selection criteria comprises identifying at least one of such at least one technician assigned to such same geographic dispatch area as such service location of such at least one customer requesting on-location electronics troubleshooting services, and identifying at least one such technician having greatest elapsed time since such last notification; and notifying such at least one technician to provide such on-location electronics troubleshooting services requested by such at least one customer; and recording time of such notification, on such at least one Internet website client server, of such at least one technician. And, it provides such an Internet-website-client-server-assisted system further comprising the steps of: receiving at least one work shift start request, on such at least one Internet website client server, from such at least one technician; storing time of day and date of receipt of such work shift start request, on such at least one Internet website client server, from such at least one technician; sending confirmation of start of work shift to such at least one technician; receiving at least one end of work shift request, on such at least one Internet website client server, from such at least one technician; storing time of day and date of receipt of such at least one end of work shift request, on such at least one Internet website client server, from such at least one technician; and sending confirmation of end of work shift to such at least one technician.

Further, it provides such an Internet-website-client-server-assisted system further comprising the step of presenting planned shift scheduling to such at least one technician. Even further, it provides such an Internet-website-client-server-assisted system further comprising the steps of: preparing text-based reports; and preparing graphical reports.

In accordance with another preferred embodiment hereof, this invention provides an Internet website client-server computer system relating to providing on-location electronics troubleshooting services comprising, in combination: computer interface and storage means for registering customer data relating to at least one customer; computer interface and storage means for registering technician data relating to at least one technician having electronics-technician abilities relating to providing such on-location electronics troubleshooting services; database means for maintaining a database of such customer data relating to such at least one customer; database means for maintaining a database of such technician data relating to such at least one technician; computer processor means for managing collecting at least one fee from such at least one customer relating to such on-location electronics troubleshooting services; computer interface and storage means for receiving requests relating to such on-location electronics troubleshooting services from such at least one customer; computer processor and communications-device means for automatically notifying such at least one technician to provide such on-location electronics troubleshooting services requested by such at least one customer; and computer interface and storage means for recording on-location electronics troubleshooting service information. Moreover, it provides such an Internet website client-server computer system further comprising: computer processor means for substantially fully automating such dispatching of such at least one technician to such at least one customer relating to such on-location troubleshooting. Also, it provides such an Internet website client-server computer system further comprising: computer processing means for selecting such at least one technician using dispatch selection criteria; wherein such dispatch selection criteria comprises such at least one technician assigned to such same geographic dispatch area of such at least one customer requesting on-location electronics troubleshooting services, and such at least one technician having greatest elapsed time since last such dispatch; and communications device means for notifying such at least one technician to provide such on-location electronics troubleshooting services requested by such at least one customer; and computer processor means for recording time of such notification of such at least one technician. Additionally, it provides such an Internet website client-server computer system, wherein such computer processor means for managing collecting at least one fee from such at least one customer relating to such on-location electronics troubleshooting services further comprises: computer interface and storage means for receiving credit card account information from such at least one customer; computer processor and communications means for requesting payment from such at least one credit card account on behalf of such at least one customer; and computer processor means for recording such payment on behalf of such at least one customer.

Also, it provides such an Internet-website-client-server-assisted system, wherein such computer processor and communications means for requesting payment from such at least one credit card account on behalf of such at least one customer comprises computer processor and communications means for requesting such at least one payment from such at least one credit card account on behalf of such at least one customer substantially automatically at pre-determined intervals. In addition, it provides such an Internet-website-client-server-assisted system, wherein such computer processor and communications means for requesting payment from such at least one credit card account on behalf of such at least one customer comprises computer processor and communications means for requesting such at least one payment from such at least one credit card account on behalf of such at least one customer at completion of on-location electronics troubleshooting services by such at least one technician. And, it provides such an Internet website client-server computer system, wherein such computer interface and storage means for receiving requests relating to such on-location electronics troubleshooting services from such at least one customer further comprises: computer interface means for inputting login identification information by such at least one customer; computer processing means for validating login identification information from such at least one customer; computer interface means for receiving confirmation of accuracy of such customer information; computer interface and storage means for receiving contact information relating to such current at least one on-location electronics troubleshooting request; and computer interface and storage means for receiving at least one problem description relating to such current at least one on-location electronics troubleshooting request by such at least one customer.

Further, it provides such an Internet website client-server computer system, further comprising: computer interface and storage means for receiving at least one work shift start request from such at least one technician; computer interface means for presenting confirmation of start of work shift to such at least one technician; computer interface and storage means for receiving at least one end of work shift request from such at least one technician; computer interface means for presenting confirmation of end of work shift to such at least one technician; computer interface means for presenting planned shift scheduling to such at least one technician; computer interface and processor means for presenting text reports; and computer interface and processor means for presenting graphical reports. Even further, it provides such an Internet website client-server computer system, wherein such computer interface and storage means for recording on-location electronics troubleshooting service information further comprises: computer interface and storage means for receiving start time of such on-location electronics troubleshooting service from such selected at least one technician; computer interface and storage means for receiving end time of such on-location electronics troubleshooting services from such selected at least one technician; computer interface and storage means for receiving indication of any need relating to repair service from such selected at least one technician; computer interface and storage means for receiving indication of selected type of such repair service from such selected at least one technician; computer processor means for selecting such at least one repair service of such selected type of repair service; communications device means for notifying such selected at least one repair service to contact such at least one customer; and computer interface and storage means for receiving customer satisfaction evaluation.

In accordance with another preferred embodiment hereof, this invention provides at least one network-client-server-assisted system, relating to assisting providing services to at least one customer, comprising the steps of: maintaining a database on such at least one network-client-server-assisted system of customer-assistance information relating to such at least one customer; receiving, on such at least one network-client-server-assisted system, requests relating to such services from such at least one customer; and notifying automatically, using such at least one network-client-server-assisted system, at least one service provider to provide such services requested by such at least one customer.

Glossary of General Terms and Acronyms

The following terms and acronyms explained below as background and are used throughout the detailed description:

Client-Server. This term is sometimes used herein to refer to a model of interaction in a distributed system in which a program at one site sends a request to a program at another site and waits for a response. The requesting program is called the "client," and the program, which responds to the request, is called the "server." In the context of the World Wide Web, the "client" is often a "Web browser", which runs on a user's computer; the program which responds to HTTP-based requests at a Website is commonly referred to as a "Web server." Additionally, "Client" may be an executable program running on a user's computer which communicates with a "server" or "Web server" via the Internet or other networking methods using HTTP.

Domain Name System (DNS). This term is sometimes used herein to refer to an Internet service that translates domain names (which are alphabetic identifiers) into IP addresses (which are numeric identifiers for machines on a TCP/IP network).

File Transfer Protocol (FTP). This term is sometimes used herein to refer to the Internet standard high-level protocol for transferring files from one machine to another over TCP/IP networks. FTP is commonly used to download programs and other files to a computer from other servers. It is also used to transfer Web page files.

Internet. This term is sometimes used herein to refer to a collection of interconnected (public and/or private) networks that are linked together by a set of standard protocols to form a distributed network. While this term is intended to refer to what is now commonly known as the Internet, it is also intended to encompass variations, which may be made in the future, including changes and additions to existing standard protocols.

HyperText Markup Language (HTML). This term is sometimes used herein to refer to a standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser (or suitable executable program), the codes are interpreted by the Web browser (or suitable executable program) and used to parse and display the document. In addition to specifying how the Web browser (or suitable executable program) is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

HyperText Transport Protocol (HTTP). This term is sometimes used herein to refer to the standard World Wide Web client-server protocol used for the exchange of information (such as HTML documents, and client requests for such documents) between a Web browser or suitable executable program and a Web server. HTTP includes a number of different types of messages that can be sent from the client to the server to request different types of server actions. For example, a "GET" message, which has the format GET, causes the server to return the document or file located at the specified Universal Resource Locator (URL).

LAN (Local Area Network)—This term is sometimes used herein to refer to a system that links together electronic office equipment, such as computers and word processors, and forms a network within an office or building.

Transmission Control Protocol/Internet Protocol (TCP/IP). This term is sometimes used herein to refer to a standard Internet protocol (or set of protocols) which specifies how two computers exchange data over the Internet. TCP/IP handles issues such as packetization, packet addressing, and handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-125527-4 (vol. II), and 0-13-474222-2 (vol. III).

Troubleshoot. This term is sometimes used herein to refer to a process of diagnosing and locating the source of a problem and taking corrective action up to, but not including repair.

Troubleshooter. This term is sometimes used herein to refer to a person with appropriate skills who is capable of diagnosing and locating the source of a problem and taking corrective action up to, but not including repairs Uniform Resource Locator (URL). This term is sometimes used herein to refer to a unique address which fully specifies the location of a file or other resource on the Internet. The general format of a URL is protocol://machine address:port/path/filename. The port specification is optional, and if none is entered by the user, the Web browser (or suitable executable program) defaults to the standard port for whatever service is specified as the protocol. For example, if HTTP is specified as the protocol, the Web browser (or suitable executable program) will use the HTTP default port. The machine address in this example is the domain name for the computer or device on which the file is located.

WAN (Wide Area Network)—This term is sometimes used herein to refer to a communications network that uses such devices as telephone lines, satellite dishes, or radio waves to span a larger geographic area than can be covered by a LAN.

Work Cell. Used herein to refer generally to geographic areas that define the boundaries of service provided by technicians. Generally, work cell boundaries are set to ensure technicians can reach any customer within a predetermined time from dispatch.

World Wide Web ("Web"). Used herein to refer generally to both (1) a distributed collection of interlinked, user-viewable hypertext documents (commonly referred to as "Web documents", "Web pages", "electronic pages" or "homepages") that are accessible via the Internet, and (2) the client and server on-location services management software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass future markup languages and transport protocols that may be used in place of or in addition to the HyperText Markup Language and the HyperText Transfer Protocol.

BRIEF DESCRIPTION OF THE DRAWINGS

Figures 43, 44:
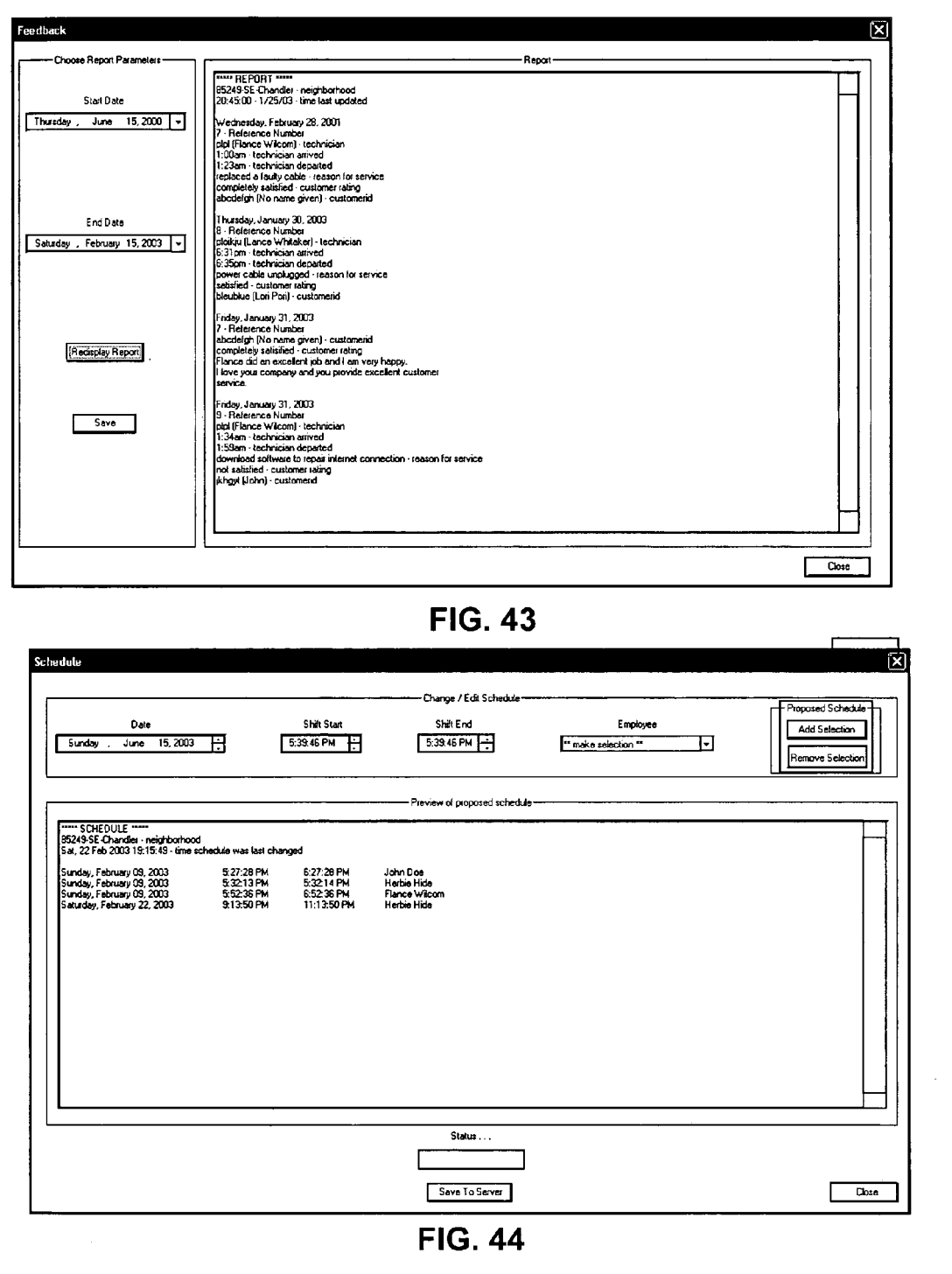

FIG. 43 illustrates a preferred electronic display screen image of a supervisor's feedback report of on-location electronics troubleshooting services requests handled by technician in a specified work cell for a specified date range, according to a preferred embodiment of the present invention.

FIG. 44 provides a preferred electronic display screen image of the screen used by the supervisor to modify the current work shift schedules contained in the on-location electronics troubleshooting services system, according to a preferred embodiment of the present invention.

FIG. 45 illustrates a preferred electronic display screen image of the homepage which presents the initial user selection options for the on-location electronics troubleshooting services system website, according to a preferred embodiment of the present invention.

FIG. 46 is an electronic display screen image of the preferred screen requesting contact information which is presented to users who selected the "Interested in Our Service?" text link on the website homepage, according to a preferred embodiment of the present invention.

FIG. 47 presents a preferred electronic display screen presented to users interested in on-location electronics troubleshooting services after submitting contact information to the on-location electronics troubleshooting services system website, according to a preferred embodiment of the present invention.

FIG. 48 provides a preferred electronic display screen image requesting customer phone number and PIN number which is presented to users who selected the "Customer Login" text link from the on-location electronics troubleshooting services system website homepage, according to a preferred embodiment of the present invention.

FIG. 49 illustrates a preferred electronic display screen image presented to users when they have not entered a correct phone number or PIN number, according to a preferred embodiment of the present invention.

FIG. 50 presents a preferred electronic display screen image displaying the preferred options available to customers after successfully logging in to the on-location electronics troubleshooting services system website, according to a preferred embodiment of the present invention.

FIG. 51 provides an example of a preferred electronic display screen image thanking the customer for submitting comments regarding the on-location electronics troubleshooting services, according to a preferred embodiment of the present invention.

FIG. 52 provides a preferred electronic display screen image requesting technician phone number and PIN number which is presented to users who selected the "Technician Login" text link from the on-location electronics troubleshooting services system website homepage, according to a preferred embodiment of the present invention.

FIG. 53 illustrates a preferred electronic display screen image presented to a technician when the technician has not entered a correct phone number or PIN number, according to a preferred embodiment of the present invention.

FIG. 54 presents a preferred electronic display screen image displaying the preferred options available to technicians after successfully logging in to the on-location electronics troubleshooting services system website, according to a preferred embodiment of the present invention.

FIG. 55 is an illustration of a preferred electronic display screen image for completing a work order presented to a technician who chose the "Complete Work Order" text link from technician options screen, according to a preferred embodiment of the present invention.

FIG. 56 provides a preferred electronic display screen image used to notify a technician that an incorrect work order number was entered when attempting to complete a work order and to request reentry of the work order number and other requested information, according to a preferred embodiment of the present invention.

FIG. 57 illustrates a preferred electronic display screen image presented to a technician after successfully completing a work order and indicating the customer requires a contractor for further repairs, according to a preferred embodiment of the present invention.

FIG. 58 provides an illustration of a preferred electronic display screen image presented to the technician/customer after successfully completing a work order which requests that customers preferably provide an indication of their level of satisfaction, according to a preferred embodiment of the present invention.

FIG. 59 provides a preferred electronic display screen image used to notify a customer that an incorrect customer PIN number was entered when attempting to indicate level of satisfaction with a technician's work a work order and to request reentry of the customer PIN number and level of satisfaction, according to a preferred embodiment of the present invention.

FIG. 64 is an electronic display screen image of the preferred screen requesting contact and low voltage background information which is presented to users who selected the "Interested in becoming a Systemsecure technician?" text link on the website homepage, according to a preferred embodiment of the present invention.

FIG. 65 provides a preferred electronic display screen image requesting supervisor phone number and PIN number which is presented to users who selected the "Supervisor Login" text link from the on-location electronics troubleshooting services system website homepage, according to a preferred embodiment of the present invention.

FIG. 66 illustrates a preferred electronic display screen image presented to supervisors who have not entered a correct phone number or PIN number, according to a preferred embodiment of the present invention.

FIG. 67 is a preferred electronic display screen image requesting a technician's contact information which is presented after a supervisor has successfully logged in to the on-location electronics troubleshooting services system website, according to a preferred embodiment of the present invention.

FIG. 68 illustrates a preferred electronic display screen image presented to a supervisor after successful entry of a technician's contact information which allows the technician to set up the required technician interface software download to the technician's personal computer, according to a preferred embodiment of the present invention.

FIG. 69 presents a preferred electronic display screen image, which is displayed when a customer selects the "Modify billing info" text link on the electronic display screen image presented in FIG. 50 and which allows a customer to modify customer contact and credit card information, according to a preferred embodiment of the present invention.

DETAILED DESCRIPTION OF THE BEST MODES AND AND PREFERRED EMBODIMENTS OF THE INVENTION

Figure 1:
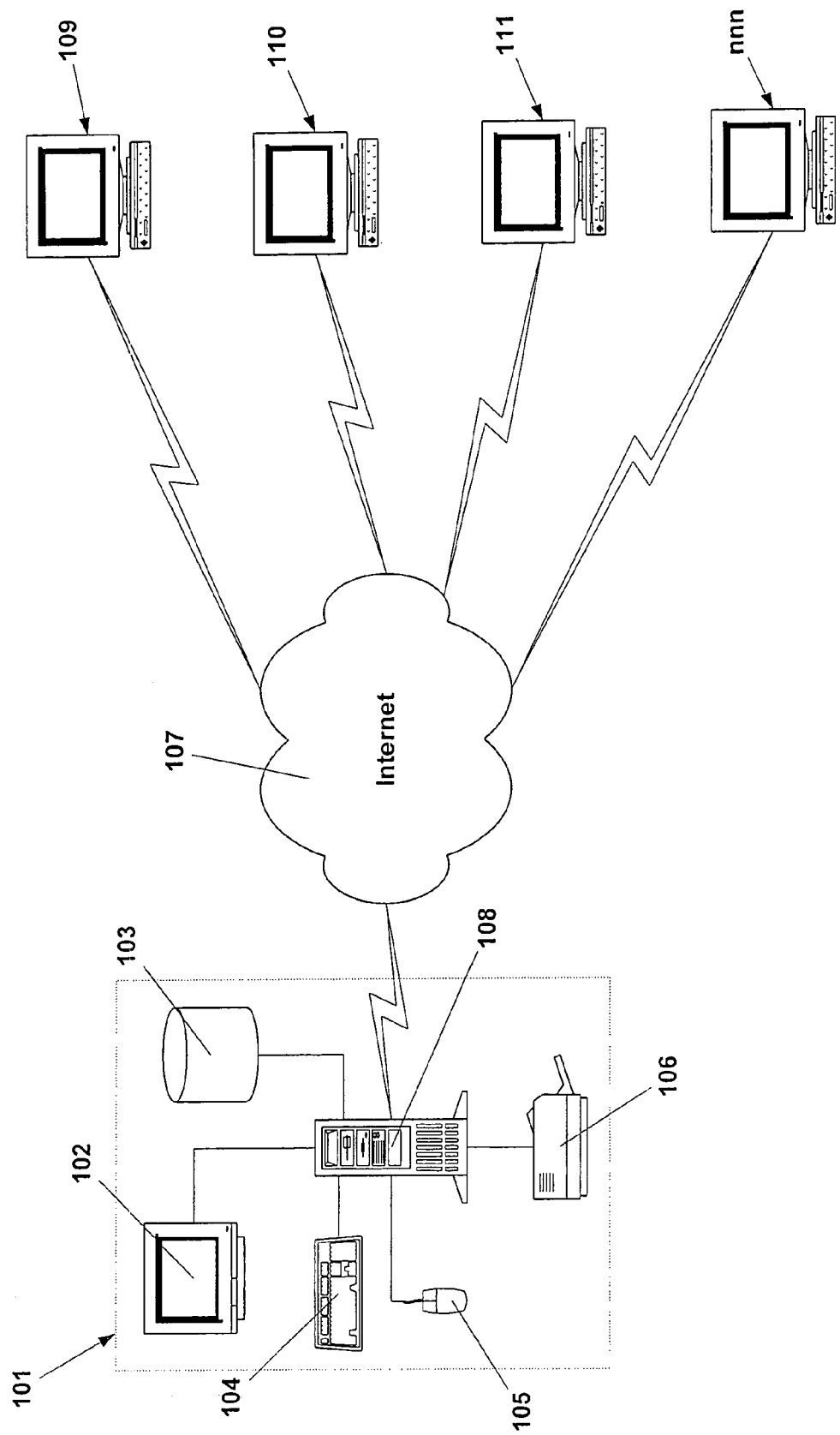
FIG. 1 is a schematic overview illustrating an example of the hardware architecture of the Internet.

Referring now to FIG. 1, a schematic overview of a preferred embodiment of the present invention on the Internet is shown. The present invention preferably comprises a web server 101. The web server 101 comprises input and output devices as is well known in the art. For example, the web server 101 preferably comprises a central processing unit (CPU) 108, a display screen or monitor 102, a keyboard 104, a printer 106, a mouse 105, etc. The web server 101 further preferably comprises a database 103 for storage of the data and software comprising preferred embodiments of the present invention. The web server 101 is preferably connected to the Internet 107 that serves as the presently preferred communications medium. The Internet 107 comprises a global network of networks and computers, public and private. The Internet 107 is the preferable connection method to the users' workstations 109, 110, 111 and nnn in preferred embodiments of the present invention.

The CPU 108 executes program code stored in one or more of ROM, RAM and mass storage devices to carry out the functions and acts described in connection with the web server 101. The CPU 108 comprises at least one conventional high-speed digital microprocessor such as an Intel Pentium processor, electrically coupled to each of the other components of the web server 101, adequate to execute program modules for all application functions including, but not limited to executing customer login, technician login, supervisor login, interaction with customer, technician and supervisor local software, supervisor and manager reporting processes, communicating with the banking system, selected electronics suppliers, electronics repair contractors and at least one telephone interface system. The CPU 108 interacts with ROM, RAM and the mass storage device to execute stored program code according to conventional data processing techniques.

According to one embodiment of the invention, as shown in FIG. 1, each user workstation device 109, 110, 111 and nnn is a browser based system implemented as a single interactive visual display device, audio device or other like interactive device such as a general purpose computer, a personal digital assistance (PDA), phone, or interactive television system. There are many commercial software programs that can enable the communications required by the consumer workstations with the Web Server 101, the primary function being transmission and reception of data through the Internet and presentation of data to the consumer. Examples of such software programs include the Netscape Navigator browser by Netscape Corporation and the Internet Explorer browser by Microsoft Corporation.

Each user workstation 109, 110, 111 and nnn (collectively nodes) is capable of communicating directly and indirectly with the Web Server 101. Communication between each node 109, 110, 111 and nnn and the web server 101 is electronic by means of known communication protocols, such as TCP/IP, and is capable of decrypting and encrypting data received and transmitted between nodes 109, 110, 111 and nnn. Each node 109, 110, 111 and nnn may be connected directly or indirectly to the website server 101 via a connection to a network, such as a local area network (LAN), a wide area network (WAN), the Internet 107 or the like, via a public switched phone network, dedicated data line, cellular network, Personal Communication System, microwave, satellite networks, cable or the like.

In a preferred embodiment shown in FIG. 1 the web server 101 is implemented as a single general purpose computer. In another preferred embodiment, the functionality of the web server 101 is distributed over a plurality of computers. In that preferred embodiment, the web server 101 is configured in a distributed architecture, wherein the databases and processors are housed in separate units or locations and connected via a network connection such as those discussed above. Those skilled in the art will appreciate that an almost unlimited number of processors may be supported. This arrangement yields a more dynamic and flexible system, less prone to catastrophic hardware failures affecting the entire system.

Although the illustrated overview is one preferred embodiment, one skilled in the art will appreciate that, under appropriate circumstances, various sections may be omitted, rearranged or adapted in various ways for various purposes.

Figure 2:
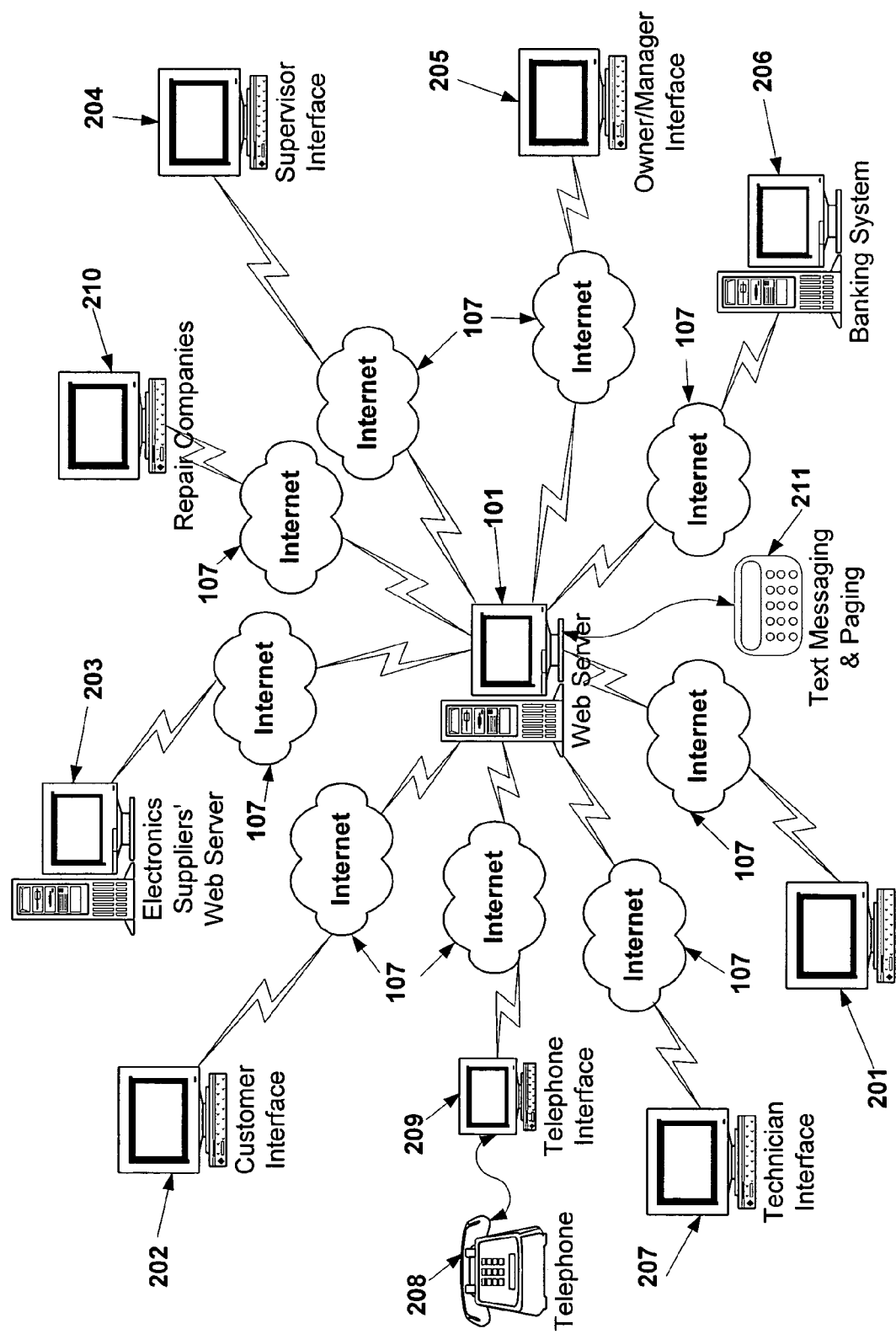
FIG. 2 is a schematic illustration of the typical communications between the on-location electronics troubleshooting services website components and on-location electronics troubleshooting services workstation components of various types of users, according to a preferred embodiment of the present invention.

Referring now to FIG. 2, it presents a schematic overview of the preferred functional modules of the present invention. Preferably, the Web Server 101 and its underlying on-location services management software provide all the services requested or required for each of the other functions. Preferably, the underlying on-location services management software is constructed using available software development languages such as Java, Visual Basic and the like. The database management preferably utilizes commercially available products such as Oracle, Microsoft SQL Server and the like.

Preferably, the Website Interface software 201 provides access to the web site through a connection to the Internet 107 to perform a variety of functions at the request of users. Preferably, it allows existing customers 303 to login to the on-location services management software on the Web Server 101 and make changes to their customer information including credit card billing information. Additionally, customers 303 may preferably request that on-location electronics troubleshooting services be provided at an additional location, move the existing services to another location, install the user interface software on another computer or make a comment.

Preferably, it also provides the capability for users interested in on-location electronics troubleshooting services to request they be contacted. Preferably, it also provides the opportunity for technicians 304 to login to the on-location services management software operating on the Web Server 101 for initial customer setup and customer interface software 202 download, to record completion of work orders and to assist customers 303 in the completion of a satisfaction survey.

Additionally, it preferably provides a means for supervisors to login to the on-location services management software operating on the Web Server 101 to assist new technicians 304 in initial setup and technician interface software 207 download to the technician's personal computer. Also, it preferably provides the capability for technicians 304 interested in providing on-location electronics troubleshooting services to apply for employment.

Preferably, the Customer Interface software 202 has been downloaded from the Web Server 101 to the personal computer belonging to the customer 303 for use by an existing customer 303 to preferably request that on-location electronics troubleshooting services be performed. A request for services from a customer 303 and subsequent responses are preferably transmitted via the Internet 107 to the on-location services management software operating on the Web Server 101.

The Electronics Suppliers' Web Server 203 preferably may be accessed from the on-location services management software operating on the Web Server 101 by a customer 303 via a link via the Internet 107 for the purpose of purchasing a product from the electronics supplier.

The Supervisor Interface software 204 is preferably a downloaded software program resident on a supervisor's personal computer which preferably communicates with the on-location services management software operating on the Web Server 101 via the Internet 107. The Supervisor Interface software 204 preferably permits a supervisor to login to the on-location services management software operating on the Web Server 101 and perform a variety of tasks preferably including recording the beginning and ending times of a shift, viewing and creating and modifying technician work schedule and contact information, and viewing reports of on-location electronics troubleshooting services performed.

The Owner/Manager Interface software 205 is preferably a downloaded software program resident on an owner/manager's personal computer which preferably communicates with the on-location services management software operating on the Web Server 101 via the Internet 107. The Owner/Manager Interface 205 preferably permits an owner/manager to login to the on-location services management software operating on the Web Server 101 and perform a variety of tasks preferably including viewing technician work schedules and contact information, viewing a variety of reports including on-location electronics troubleshooting services performed and customer satisfaction reports.

Preferably, the Banking System 206 communicates the on-location services management software operating on the Web Server 101 via the Internet 107 to verify customer credit card information and accept credit card transactions presented for collection by the on-location services management software on the Web Server 101.

The Technician Interface software 207 is preferably a downloaded software program resident on a personal computer belonging to a technician 304 which preferably communicates with the on-location services management software operating on the Web Server 101 via the Internet 107. The Technician Interface 207 preferably permits a technician 304 to login to the on-location services management software operating on the Web Server 101 and perform a variety of tasks preferably including recording the beginning and ending times of a shift and viewing technician work schedules.

The Telephone 208 (which may be a standard corded or wireless telephone or a standard cellular telephone) and telephone interface preferably work in concert to provide an alternative method for customers 303 to request on-location electronics troubleshooting services. Additionally, the Telephone 208 and telephone interface 209 preferably provide an alternative method for technicians 304 and supervisors 302 to record the beginning and ending times of a shift. Preferably, on-location services management software on the Web Server 101 periodically queries telephone interface 209 for messages via the Internet 107. Preferably, when messages are presented they are removed from telephone interface 209 and processed by on-location services management software on the Web Server 101 to complete the actions requested by customers 303, technicians 304 and supervisors 302.

Preferably, email messages are sent to Repair Companies 210 via the Internet 107 by the on-location services management software on the Web Server 101 whenever it has been determined that a customer 303 requires a repair and a technician 304 has entered the information via the Website Interface 201. The email message is sent to a selected repair company which will preferably contact the customer 303 to schedule the required services. Preferably, technicians 304 are dispatched using text messaging and paging 211 performed directly by the on-location services management software operating on the Web Server 101.

Although the illustrated overview is one preferred embodiment, one skilled in the art, upon reading this specification, will appreciate that, under appropriate circumstances, various sections may be omitted, rearranged or adapted in various ways for various purposes.

According to a preferred embodiment of the present invention, preferably a combination of on-location services management software and Internet services are utilized to manage and dispatch technicians 304 to troubleshoot reported problems with low-voltage electronics in homes and small businesses at any time of day, any day of the week, and any day of the year. A preferred goal is for the technician 304 to arrive on-location within a timeframe of less than one hour from the time of receipt of the request for on-location electronics troubleshooting services. Preferably, to accomplish a rapid response to customer requests for troubleshooting assistance, work cells will be defined which preferably include an appropriate number of technicians 304 and customers 303. In addition, technicians 304 are assigned to work cells on the basis of their residence; preferably technicians 304 who live within a given work cell are assigned to that work cell. Under appropriate circumstances, technicians 304 may be assigned to work cells which do not include their residence.

Preferably, technicians 304 are automatically dispatched to the location of customer 303 using pager text messages generated from the entered and stored information by the customer 303, such as contact name and address and telephone numbers. Preferably, technician dispatch is automatically performed using an algorithm which considers the time of the last dispatch for each technician 304 assigned to a work cell and dispatches the technician 304 with the longest time since the last dispatch.

Figure 3:
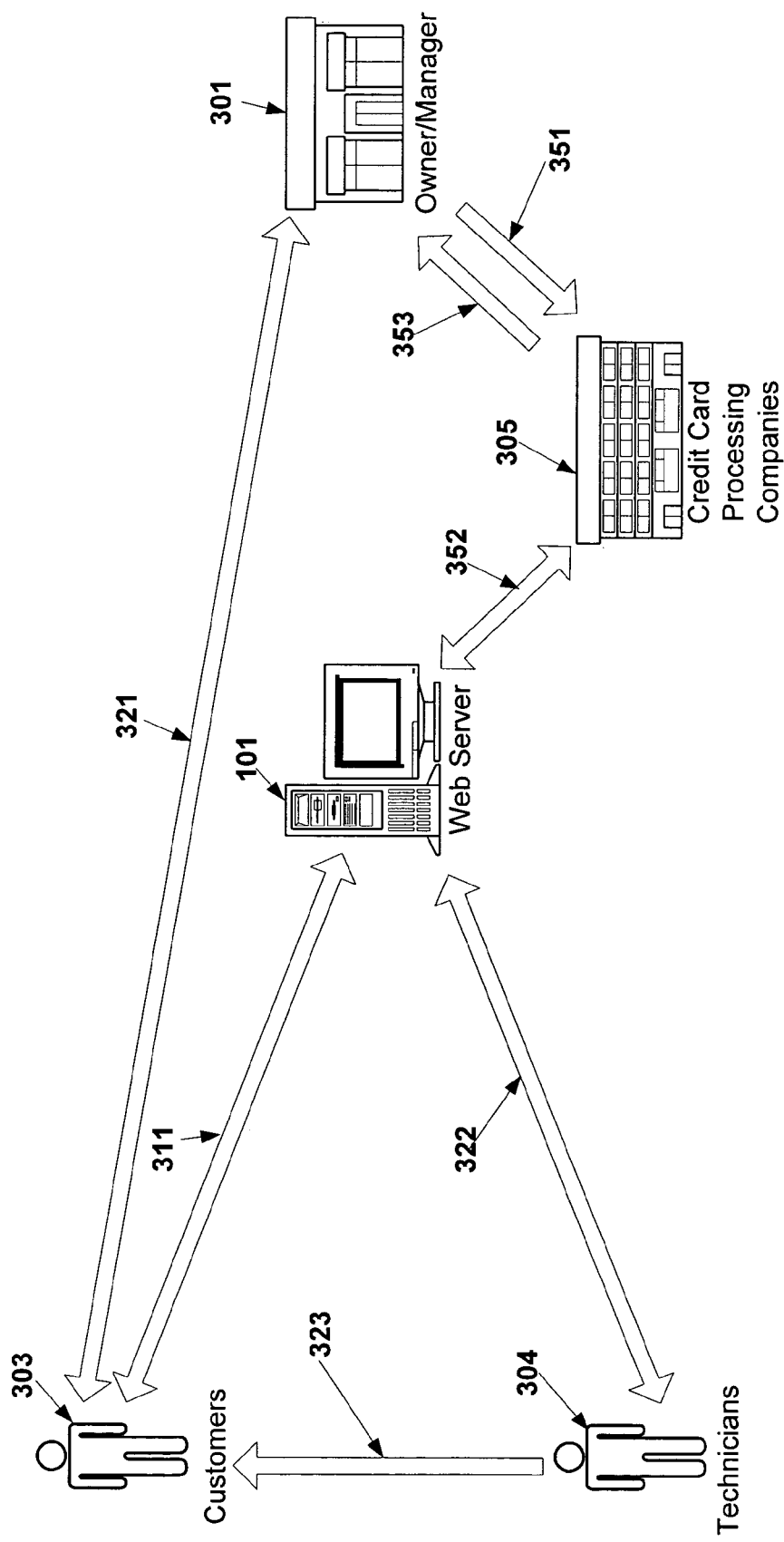
FIG. 3 is a schematic illustrating the customer sign up portion of a preferred on-location electronics troubleshooting services business method using an Internet website-based server system, according to a preferred embodiment of the present invention.

Referring now to FIG. 3, a schematic overview of a preferred embodiment of the primary business elements of the present invention is shown.

In a preferred embodiment of the present invention, in the initial contact step 311 a customer 303 learns of the on-location electronics troubleshooting services from advertising and other marketing activities and preferably expresses an interest in the services through the Web Site Home Page, FIG. 45, Interested in Our Service screen, FIG. 46, and the Thanks, You will be contacted screen, FIG. 47. Preferably, in customer contact step 321 the Owner/Manager 301 contacts the customer 303 using one or more typical methods and preferably the customer 303 agrees to subscribe to the on-location electronics troubleshooting services for a period of at least one year and preferably to pay the agreed monthly fee via an automatic monthly charge to a credit card belonging to the customer 303.

Figures 60, 61:
FIG. 60 provides an example of a preferred electronic display screen image thanking customers for using on-location electronics troubleshooting services which is presented after successfully providing an indication of their level of satisfaction, according to a preferred embodiment of the present invention.
FIG. 61 is a preferred electronic display screen image requesting a customer's contact and credit card information which is presented after a technician has selected the "Initial Customer Setup" text link on the electronic display screen image presented in FIG. 54, according to a preferred embodiment of the present invention.
Figures 62, 63:
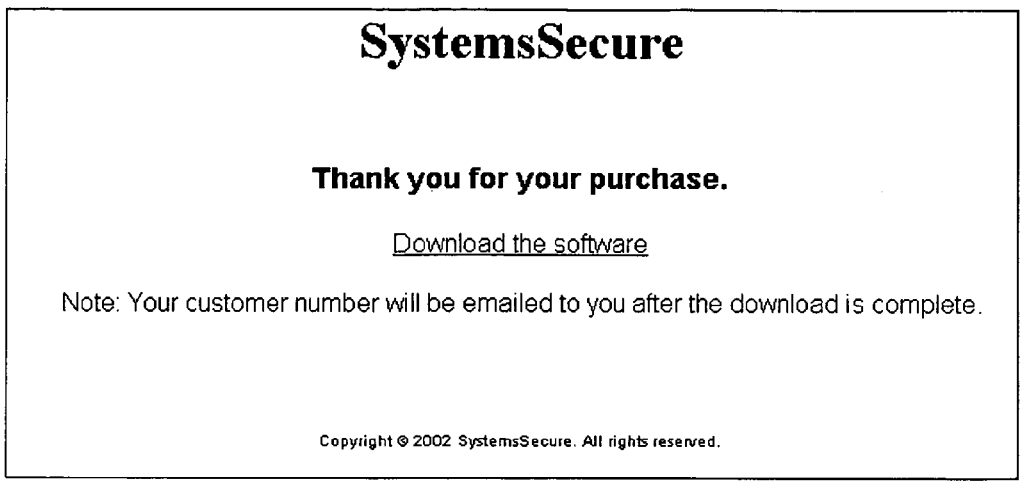
FIG. 62 illustrates a preferred electronic display screen image presented to a technician after successful entry of a customer's contact and credit card information which allows the technician to set up the required customer interface software download to the customer's personal computer, according to a preferred embodiment of the present invention.
FIG. 63 presents an illustration of a preferred electronic display screen image requesting that the customer's contact and credit card information be re-entered because the credit card was not accepted on the first entry, according to a preferred embodiment of the present invention.

In a preferred embodiment of the present invention, as illustrated by the technician 304 dispatch step 322, once a potential customer 303 has agreed to subscribe to the on-location electronics troubleshooting services, a technician 304 will be dispatched to the home or place of business of the potential customer 303. Preferably, once the technician 304 is at the service location of customer 303, he or she will complete the customer sign up step 322 by logging on to the on-location services management software operating on the Web Server 101, as shown in FIG. 45, FIG. 52, FIG. 53 and FIG. 54; and the customer 303 will preferably enter his or her name and address and contact information and credit card information, as illustrated in FIG. 61 and FIG. 62 (embodying herein computer interface and storage means for registering customer data for at least one customer). After entry and acceptance of the credit card information, the customer information is stored in the database (embodying herein database means for maintaining a database of such customer data for such at least one customer and embodying herein computer interface and storage means for receiving credit card account information from such at least one customer) and the customer interface software 202 is downloaded from the Web Server 101 and installed on a personal computer which is, or can be, connected to the Internet 107, as shown in FIG. 3. Preferably, the technician 304 instructs the customer 303 on the usage of the customer interface software 202.

Referring again to FIG. 3, in the "arrange for credit card processing" step 351, the owner/manager 301 will preferably conclude an agreement with appropriate credit card processing companies 305 to permit verification of credit cards of customer 303; and then the processing may begin of credit card payment requests and automatic deposit of the payments to a specified bank account on behalf of the owner/manager 301. In the request payment step 352, on completion of a service request preferably the on-location services management software will preferably create a payment request for the customer 303 and transmit it to the credit card processing company 305 for payment to the owner/manager 301. Alternatively, in the request payment step 352, each month the on-location services management software will preferably automatically create a payment request for each customer 303 and transmit it to the credit card processing company 305 for payment to the owner/manager 301. In the receive payments step 353 the owner/manager 301 preferably receives the customer 303 payments (embodying herein computer processor means for managing collecting at least one fee from such at least one customer relating to such on-location electronics troubleshooting services; and embodying herein computer processor and communications means for requesting payment from such at least one credit card account on behalf of such at least one customer; and embodying herein computer processor means for recording such payment on behalf of such at least one customer; and embodying herein computer processor and communications means for requesting payment from such at least one credit card account on behalf of such at least one customer comprises computer processor and communications means for requesting such at least one payment from such at least one credit card account on behalf of such at least one customer at completion of on-location electronics troubleshooting services by such at least one technician; and embodying herein computer processor and communications means for requesting such at least one payment from such at least one credit card account on behalf of such at least one customer substantially automatically at pre-determined intervals).

Figure 4:
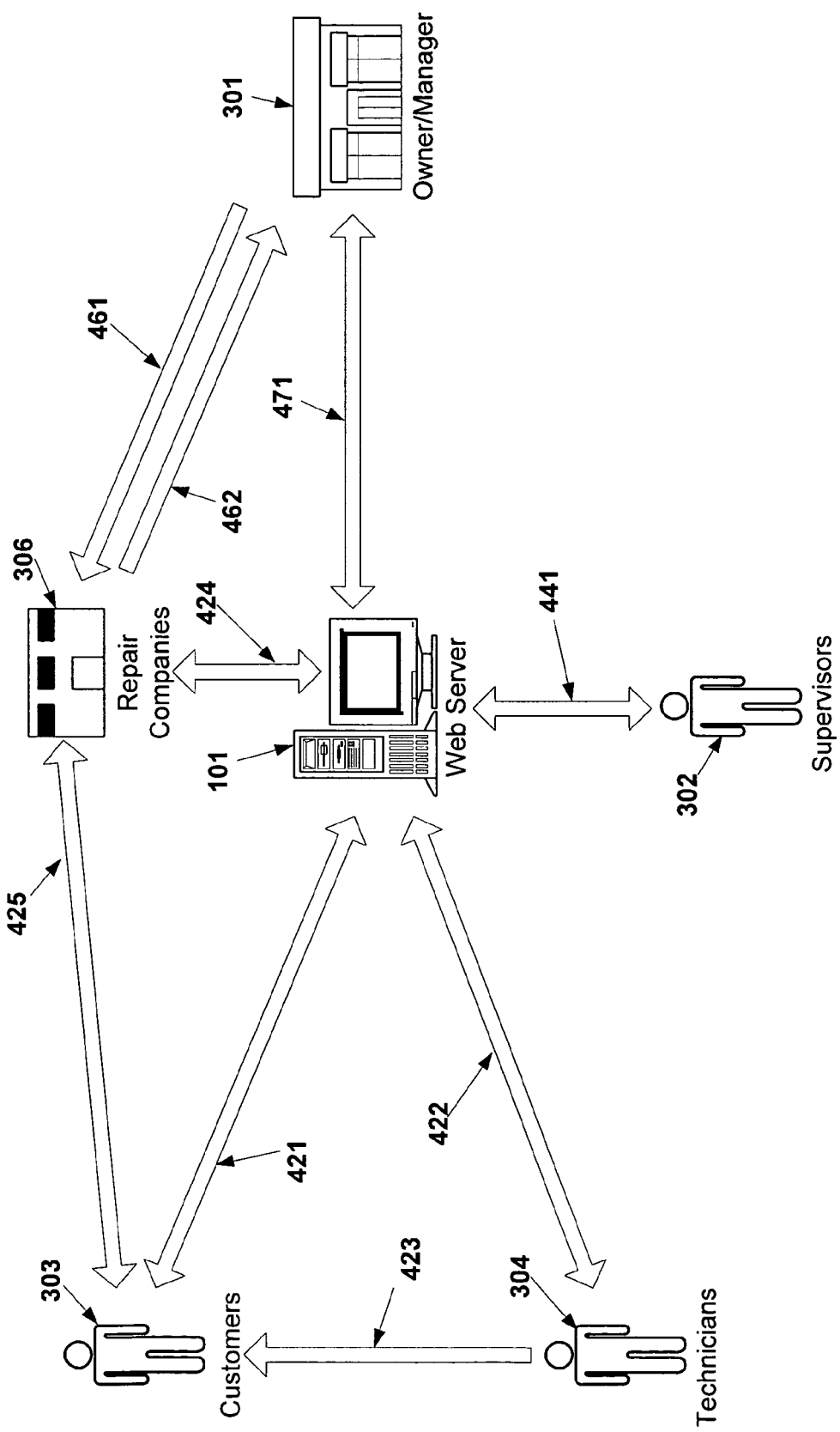
FIG. 4 is a schematic illustrating the preferred on-location services portion of a preferred on-location electronics troubleshooting business method using an Internet website-based server system, according to a preferred embodiment of the present invention.

Referring now to FIG. 4, in a preferred embodiment of the present invention, the first step of providing on-location support is illustrated by the services request step 421 in which a customer 303, preferably using the customer interface software 202, logs in to the on-location services management software operating on the Web Server 101 using his or her customer ID number (embodying herein computer interface means for inputting login identification information by such at least one customer) and preferably completes a request for on-location assistance. The preferred login software interactions between the customer 303 and the customer interface software 202 are presented in FIG. 6, FIG. 7, FIG. 8, FIG. 9 FIG. 10, FIG. 11 and FIG. 12. The preferred assistance request interactions between the customer 303 and the customer interface software 202 are illustrated in FIG. 13, FIG. 14, FIG. 15, FIG. 16, FIG. 17, and FIG. 18 (embodying herein computer interface and storage means for receiving requests relating to such on-location electronics troubleshooting services from such at least one customer).

Referring further to FIG. 4, in the technician dispatch step 422 preferably a technician 304 is selected from the technicians 304 assigned to the work cell in which the customer 303 is located and is preferably dispatched by on-location services management software running on the Web Server 101. Preferably, the on-location services management software considers the elapsed time since the last dispatch for each available technician 304 (embodying herein computer processing means for selecting such at least one technician using dispatch selection criteria) and automatically selects the technician 304 with the longest period since the last dispatch (embodying herein wherein such dispatch selection criteria comprises such at least one technician assigned to such same geographic dispatch area of such at least one customer requesting on-location electronics troubleshooting services, and such at least one technician having greatest elapsed time since last such dispatch). Preferably, after selecting an available technician 304 the on-location services management software sends an alpha/numeric page to the selected technician 304 and records the time the page was sent to the technician 304 in the database with the original service request from the customer 303 (embodying herein computer processor means for substantially fully automating such dispatching of such at least one technician to such at least one customer relating to such on-location troubleshooting; and embodying herein computer processor means for recording time of such notification of such at least one technician). The alphanumeric page preferably provides the necessary information, including contact name, contact phone number and location address, for the technician 304 to contact the customer 303 (embodying herein computer processor and communications-device means for automatically notifying such at least one technician to provide such on-location electronics troubleshooting services requested by such at least one customer; and embodying herein communications device means for notifying such at least one technician to provide such on-location electronics troubleshooting services requested by such at least one customer). Preferably, on receipt of the pager message the technician 304 will call the customer 303 and provide an estimated time of arrival.

Referring to FIG. 4 again, preferably the step of problem resolution 423 begins with the arrival of the technician 304 at the service location of the customer 303 who requested the troubleshooting service. On arrival, the technician 304 will preferably evaluate the problem reported by the customer 303 and make any necessary adjustments, changes in settings and parameters and, in general, preferably do all that is possible to solve the reported problem without making an internal repair to the problem low-voltage equipment. If the technician 304 cannot resolve the reported problem preferably the customer 303 is advised to arrange for a repair to the problem low-voltage equipment.

Preferably, as the final part of the problem resolution step 423, at the completion of troubleshooting the technician 304 will preferably use a personal computer at the customer 303 location to close the troubleshooting request. Preferably, the technician 304 will login to the on-location services management software on the Web Server 101 as shown in FIG. 45, FIG. 52, FIG. 53 and FIG. 54. After successfully logging in, the technician 304 preferably reports the start and completion times of the troubleshooting effort (embodying herein computer interface and storage means for receiving start time of such on-location electronics troubleshooting service from selected such at least one technician; and embodying herein computer interface and storage means for receiving end time of such on-location electronics troubleshooting services from selected such at least one technician) and if necessary, requests repair service specifying the type of repair service needed and submits the information to be stored in the on-location services management software database (embodying herein computer interface and storage means for recording on-location electronics troubleshooting service information; and embodying herein computer interface and storage means for receiving of any need relating to repair service from such selected at least one technician; and embodying herein computer interface and storage means for receiving indication of selected type of such repair service from such selected at least one technician; and embodying herein computer processor means for selecting such at least one repair service of such selected type of repair service). Then the technician 304 requests that the customer 303 indicate his or her level of satisfaction with the service as illustrated in FIG. 55, FIG. 56, FIG. 57, FIG. 58, FIG. 59 and FIG. 60 (embodying herein computer interface and storage means for receiving customer satisfaction evaluation). If the customer 303 has indicated dissatisfaction with the service provided the on-location services management software on the Web Server 101 will initiate an alpha/numeric page to the supervisor 302, as shown in supervisor notice step 441, who will preferably take necessary actions to resolve the customer 303 dissatisfaction.

Further, if the technician 304 has indicated the need for a repair to the problem low-voltage equipment, the on-location services management software on the Web Server 101 will generate an email notice to a number of selected repair companies 306, as shown in repair company notice step 424. Preferably, the on-location services management software on the Web Server 101 selects a pre-determined number of repair companies 306 from a pre-qualified list of companies that specialize in the type of repairs required by the customer 303 (embodying herein communications device means for notifying such selected at least one repair service to contact such at least one customer). After receiving the email notice, preferably a selected number of repair companies 306 will contact the customer 303 directly and arrange the repairs and subsequent payment by the customer 303 to the repair company 306 as shown in the equipment repairs step 425.

Referring again to FIG. 4, as illustrated by "arrange repair services" step 461, the owner/manager 301 preferably identifies repair companies 306 which can provide repairs for customers 303. Preferably, the owner/manager 301 will evaluate skill and quality of service of each candidate repair company 306, selecting only those which meet the standards of the owner/manager 301. Preferably, each selected repair company 306 will complete an agreement to meet the required standards of service and provide a commission to the owner/manager 301 for each completed repair. In the repair service set up step 471, the owner/manager 301 will load each repair company 306 with which the owner/manager 301 has completed an agreement. In the commission payment step 462, preferably each repair company 306 will pay the owner/manager 301 a commission based on the number and amount of each completed repair on an agreed schedule.

Referring to FIG. 4, after completion of the requested repairs the customer 303 will be given the opportunity to report completion of the repairs and in return be eligible to receive a portion of the commission paid by the repair company 306 to the owner/manager 301.

Figure 5:
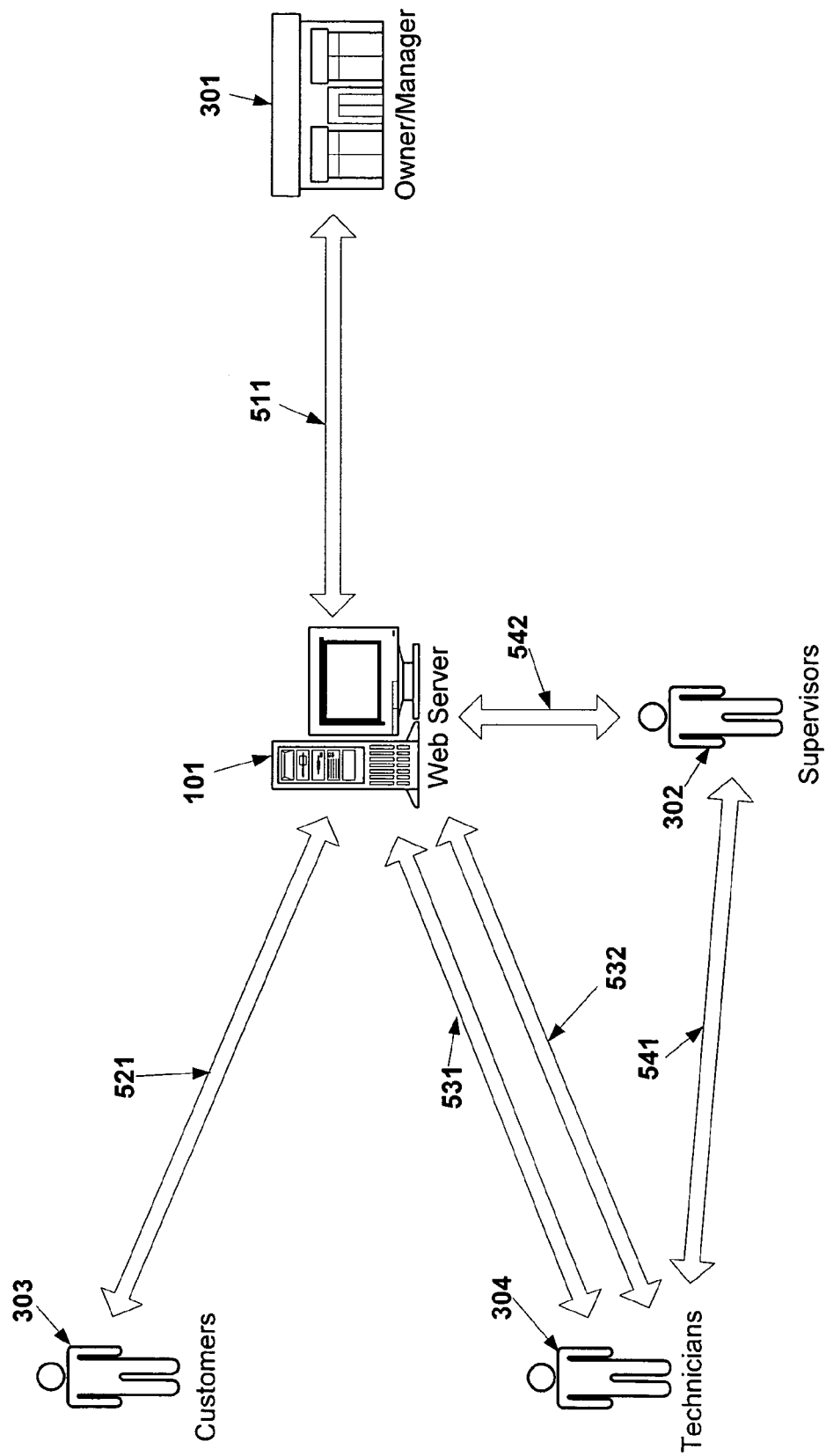
FIG. 5 is a schematic illustrating preferred methods for technicians', supervisors', customers', others interactions with the on-location services management software, including changing customer billing information, technician and supervisor shift start and end and other similar activities.

Referring to FIG. 5, in the customer update step 521, preferably the customer 303 can login to the on-location services management software on the Web Server 101 to update billing and contact information, request addition of service for an additional location, request moving the service to a different location, request installation of the customer interface software 202 on a different personal computer. These activities are illustrated in FIG. 45, FIG. 48, FIG. 49, FIG. 50, FIG. 69 and FIG. 70. Additionally, a customer 303 can preferably provide additional feedback or comments as illustrated in FIG. 51.

Additionally, as shown in FIG. 5, a technician 304 may apply to work for/with the owner/manager 301 in technician application step 531. This activity is illustrated by the screens shown in FIG. 45 and FIG. 64. After acceptance of a technician 304 to work with/for the owner/manager 301 a supervisor 302 will go to the residence of the technician 304 to set up the technician interface software 207 on a personal computer which is capable of being connected to the Internet 107, as shown in technician set up step 541. Preferably, the supervisor 302 will login to the on-location services management software on the Web Server 101 using a typical browser as shown in FIG. 45, FIG. 65 and FIG. 66. After successfully logging in, the supervisor 302 accesses the Create Employee Account screen, as shown in FIG. 67, and preferably enters all the requested information (embodying herein computer interface and storage means for registering technician data relating to at least one technician having electronics-technician abilities relating to providing such on-location electronics troubleshooting services). After completing the Create Employee Account screen, the technician information is saved to the database (embodying herein database means for maintaining a database of such technician data relating to such at least one technician). The supervisor will preferably use the Download Employee Software screen, as shown in FIG. 68, to download the Technician Interface software 207 from the Web Server 101 and install it on the personal computer belonging to the technician 304.

Further, as shown in FIG. 5, the technician schedule step 532 preferably includes several technician 304 activities. First each technician 304 will login through the technician interface software 207 as illustrated by the screens shown FIG. 31, FIG. 32, FIG. 33, FIG. 34, FIG. 35, FIG. 40 and FIG. 41. Upon a successful login, preferably each technician 304 will indicate either the start or end time of his or her shift, as shown in the screen examples illustrated in FIG. 25, FIG. 26, FIG. 27 and FIG. 28. Preferably, by indicating the shift start time makes a technician 304 available to receive dispatch messages from the on-location services management software on the Web Server 101. Likewise, indicating the shift end time makes the technician 304 unavailable for dispatch messages. After a successful login, the technician 304 may also query the on-location services management software on the Web Server 101 for the current schedule and technician 304 contact information, as shown in the screen example shown in FIG. 24.

Once again, referring to FIG. 5, preferably the supervisor 302 uses the supervisor interface software 204 to complete several actions as part of supervisor schedule step 542. The supervisor 302 preferably logs in the on-location services management software on the Web Server 101 using the Supervisor Interface software 204 installed on his or her personal computer. The screens used for login are shown in FIG. 31, FIG. 32, FIG. 33, FIG. 34, FIG. 35, FIG. 40 and FIG. 41. Preferably, upon a successful login, each supervisor 302 will indicate either the start or end time of his or her shift, as shown in the screen examples illustrated in FIG. 36, FIG. 37, FIG. 38 and FIG. 39. Preferably, by indicating the shift start time makes a supervisor 302 available to receive messages from the on-location services management software on the Web Server 101. Likewise, indicating the shift end time makes the supervisor 302 unavailable for messages. After a successful login, the supervisor 302 may also query the on-location services management software on the Web Server 101 for the current schedule and supervisor 302 and technician 304 contact information, as shown in the screen example shown in FIG. 42. Additionally, a supervisor 302 may elect to view a report of on-location electronics troubleshooting services provided by technicians 304, as shown in FIG. 43 or to add/remove or edit technician 304 schedules, as shown in FIG. 44. Referring to FIG. 5, preferably the owner/manager 301 will login to the on-location services management software on the Web Server 101 to perform a variety of management and administrative activities as part of the owner/manager management step 511. The activities may preferably include queries and reports of on-location electronics troubleshooting services rendered, supervisor 302 and technician 304 schedules, reports of dissatisfied customers 303 and other actions as may be required. Examples of some preferred reports, which preferably may be any type of graph or text report and which can be saved, emailed and or printed, are:

Average time it takes for a technician 304 to call back a customer 303 from the time the technician 304 received a work order request, Average time it takes for a technician 304 to arrive and start at the location of a customer 303 from the time the technician 304 received the work order, Average time it takes for a technician 304 to end at the location of customer 303 location after performing the service from the time the technician 304 received the work order, Average service cost per visit, Average time it takes for a technician 304 to start at the location of a customer 303 from the time the technician 304 called back the customer 303 to let them know help is on the way or that they have received the call from the customer 303, Average time it takes for a technician 304 to end at the location of a customer 303 from the time the technician 304 called back the customer 303 to let them know help is on the way or that they have received the call from the customer 303, Average time it takes for a technician 304 to complete a service visit, Average errors in attempting to process the credit card belonging to the customer 303 per given period of time or per quantity signed, Average times a customer 303 needed to change their credit card on the website because when service was completed, their credit card was denied per given period of time or per quantity signed up, Total or average amount of service requests per amount of people signed up or per given period of time, Average amount of calls in which the customer 303 would prefer to have the dispatcher at a given company dispatch their work request, instead of the customer 303 doing it, Average amount of times a customer 303 prefers that a specific technician 304 receive their work per number signed up or per given period of time, Average amount of times, the customer 303 needs service and wants to be added to the system, so they can do it themselves next time per number signed up or per given period of time, Average amount of times, the customer 303 needs service and does not want to be added to the system per number signed up or per given period of time, Total or average amount of service requests per amount of employees, Total or average amount of service requests per given amount of time, Total or average amount of hours spent by any given internal group or multiple groups within a company maintaining the company (company's own internal operations) or outside the company per number signed up or per given period of time, Total and average start times for employees per number signed up or per given period of time, Total and average end times for employees per number signed up or per given period of time, Reports depicting tasks with internal tracking numbers, start times, end times, outstanding problems, how a day could have been more productive, and comments for employees over time or a specified period of time, Graphs showing % time spent per given internal tracking number for an employee or multiple employees over time or a specified period of time, Reports depicting tasks, start times, end times and comments over time or a specified period of time, and Graphs showing % time spent per given task over time or a specified period of time (embodying herein computer interface and processor means for presenting text reports; and computer interface and processor means for presenting graphical reports).

As described above, each of the activities of customer 303 are facilitated by particular on-location services management software capabilities. The following screens and interrelationships describe a preferred embodiment of the customer interface software 202.

Figure 6:
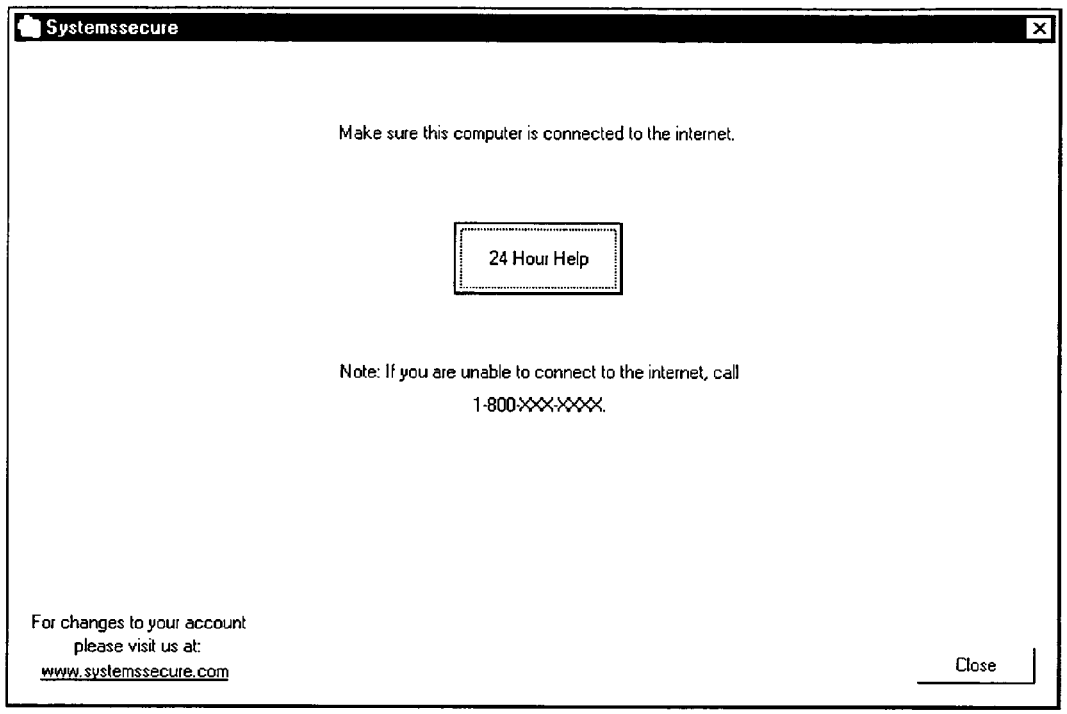
FIG. 6 presents an example of a preferred electronic display screen image illustrating the customer start screen for communicating with the website-based server of the on-location electronics troubleshooting services system, according to a preferred embodiment of the present invention.

Referring to FIG. 6, Customer Start Screen, the customer 303 preferably may select the text link which opens a browser which preferably displays the website or selects the Close button to close the entire application. Preferably, selecting the 24 Hour Help button will display the Note screen, FIG. 7.

Figure 7:
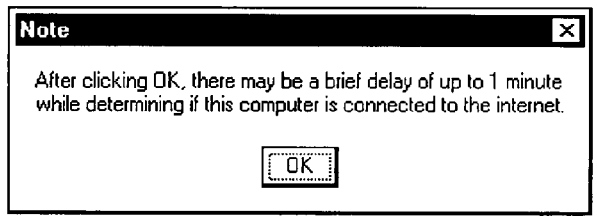
FIG. 7 illustrates an example of a preferred electronic display screen image illustrating the customer brief delay notice presented while a session for a customer is started on the website-based server of the on-location electronics troubleshooting services system, according to a preferred embodiment of the present invention.
Figure 8:
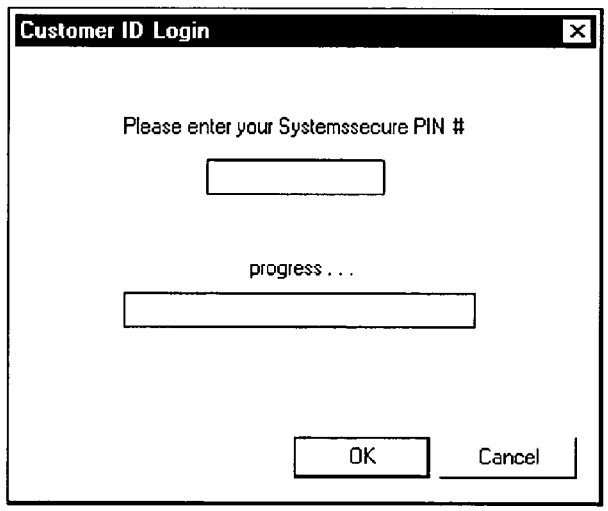
FIG. 8 illustrates an example of a preferred electronic display screen image showing how a customer may login to the on-location electronics troubleshooting services system, according to a preferred embodiment of the present invention.

Referring to FIG. 7, Note screen the customer 303 must select the OK button to continue the login process. Preferably, after this button is clicked the dialog closes and the program checks to see if the personal computer belonging to the customer 303 is connected to the Internet. If the personal computer is connected to the Internet then preferably the Customer ID Login screen, as illustrated in FIG. 8, will display. If the personal computer is not connected to the Internet then Error: Internet Connection screen, FIG. 18, will preferably display.

Figure 16:
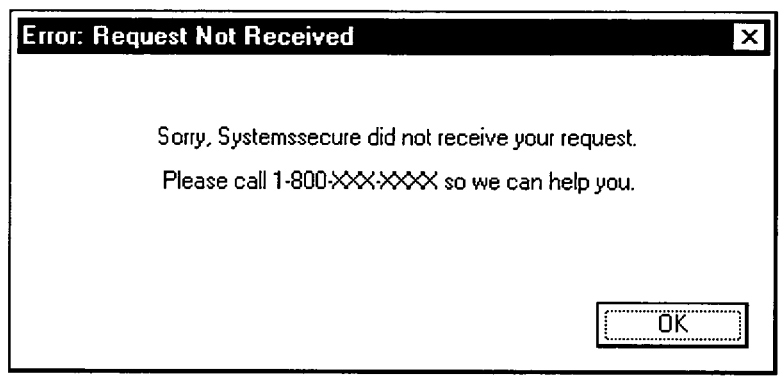
FIG. 16 illustrates a preferred electronic display screen image notifying the customer their on-location electronics troubleshooting services request was not received, according to a preferred embodiment of the present invention.

Referring to FIG. 8, Customer ID Login screen, preferably a customer 303 must type in his or her personal customer ID number and click the OK button to successfully login (embodying herein computer interface means for inputting login identification information by such at least one customer). The program then preferably sends this request to the server and waits for a reply for a specified period of time. During this time a progress bar preferably continually updates. If the program does not receive the reply within the specified period of time, then the Error: Request Not Received screen, as illustrated in FIG. 16, is preferably presented.

If the reply is received within the specified period of time and the customer ID number was entered incorrectly then preferably the Error: Login Failed screen, as shown in FIG. 9, is displayed (embodying herein computer processing means for validating login identification information from such at least one customer).

If the customer 303 selects the Cancel button on the Login screen, FIG. 8, preferably all dialogs are closed and the Customer Start Screen, FIG. 6, is displayed.

Figure 9:
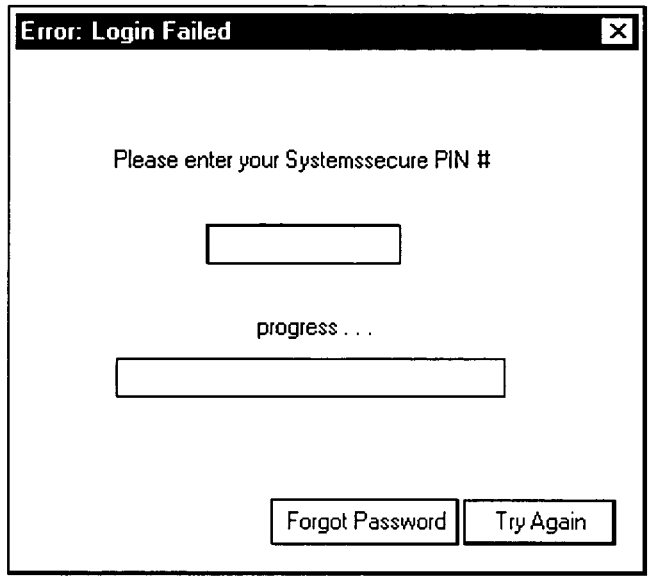
FIG. 9 presents a preferred electronic display screen image example illustrating the error message received by a customer who has attempted to login with an incorrect pin number, according to a preferred embodiment of the present invention.

Referring to FIG. 9, Error: Login Failed screen, preferably a customer 303 must type in his or her personal customer ID number again and click the OK button to successfully login. The program then preferably sends this request to the server and waits for a reply for a specified period of time. During this time a progress bar preferably continually updates. If the program does not receive the reply within the specified period of time then the Error: Request Not Received screen, as illustrated in FIG. 16, is preferably presented.

If the reply is received within the specified period of time and the customer ID number is incorrect then FIG. 9, the Error: Login Failed screen, is displayed again one last time. After the second incorrect customer ID number in this dialog, preferably the Notification screen, FIG. 10, is displayed telling the customer 303 their customer ID number will be emailed.

Figure 11:
FIG. 11 is a preferred electronic display screen image example of a request by the on-location electronics troubleshooting services system for the customer to verify key contact information, according to a preferred embodiment of the present invention.

If the reply is received within the specified period of time and the customer ID number was entered correctly then preferably FIG. 11, the Confirm Account Information screen, will display.

Figure 10:
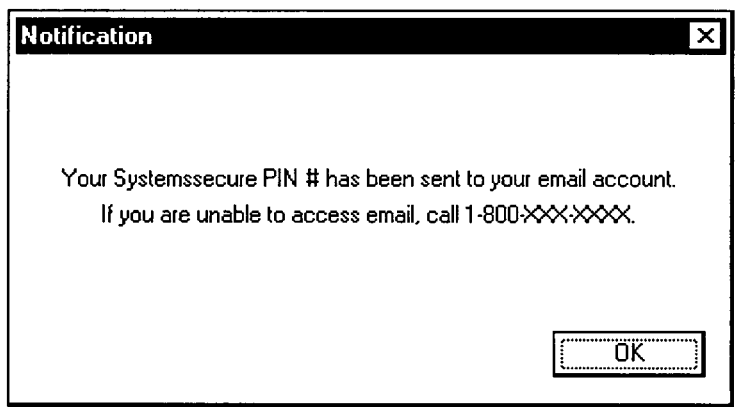
FIG. 10 illustrates a preferred electronic display screen image example of the message received when a customer cannot login or has forgotten a pin number, according to a preferred embodiment of the present invention.

Referring again to FIG. 9, preferably customer 303 may optionally click the Forgot Password button which will display the Notification Screen as shown in FIG. 10 to receive the appropriate pin number by email.

Referring to FIG. 10, the Notification screen, upon presentation of this screen, preferably the customer 303 may only select the OK button which will preferably close all dialogs and return the customer 303 to the Customer Start screen, FIG. 6.

Figure 12:
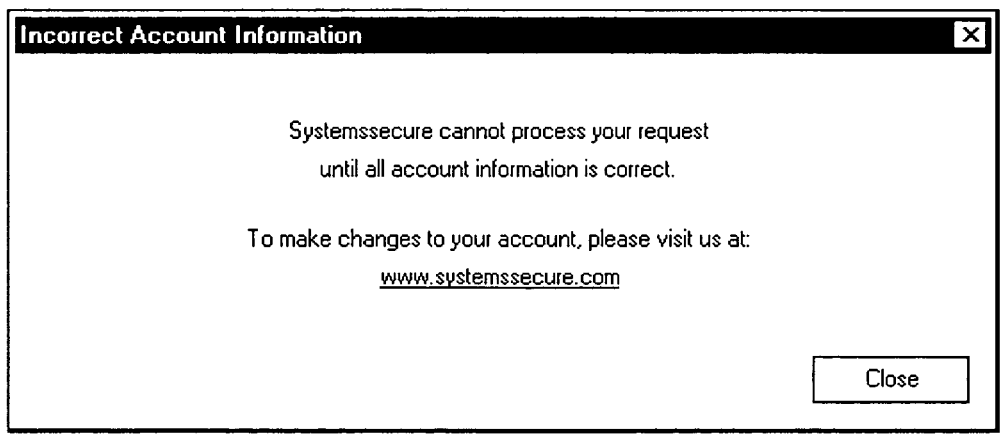
FIG. 12 presents a preferred electronic display screen image example directing the customer to use the on-location electronics troubleshooting services system website to fix incorrect account information, according to a preferred embodiment of the present invention.
Figure 13:
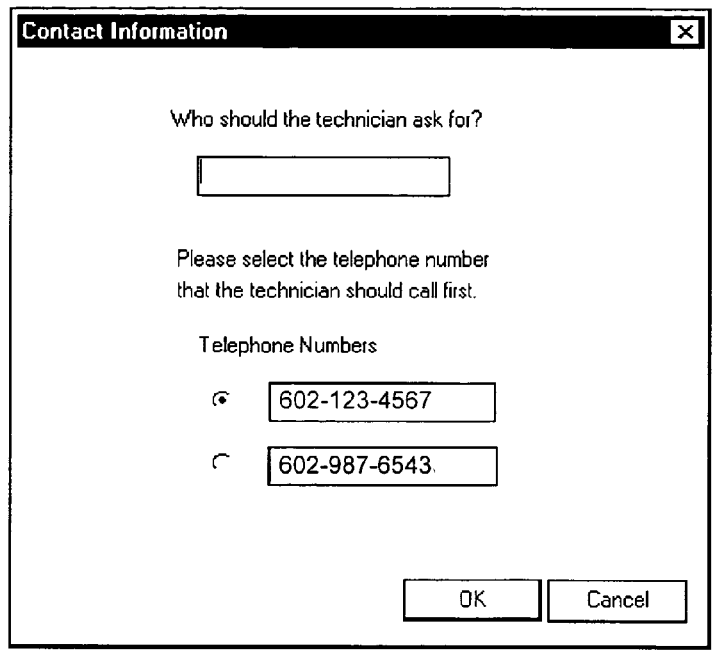
FIG. 13 illustrates a preferred electronic display screen image of customer confirmation of contact information for a trouble call for the on-location electronics troubleshooting services system, according to a preferred embodiment of the present invention.

Referring to FIG. 11, the Confirm Account Information screen, the customer 303 may preferably select the either the Correct button which will preferably display the Contact Information screen, FIG. 13, or the Incorrect button which will preferably present the Incorrect Account Information screen, FIG. 12 (embodying herein computer interface means for receiving confirmation of accuracy of such customer information).

Referring to FIG. 12, the Incorrect Account Information screen, the customer 303 may preferably select either the Close button which closes all dialogs and displays the Customer Start Screen, FIG. 6, or select the text link which will preferably launch a browser window bringing the customer 303 to the website to update the account information.

Figure 14:
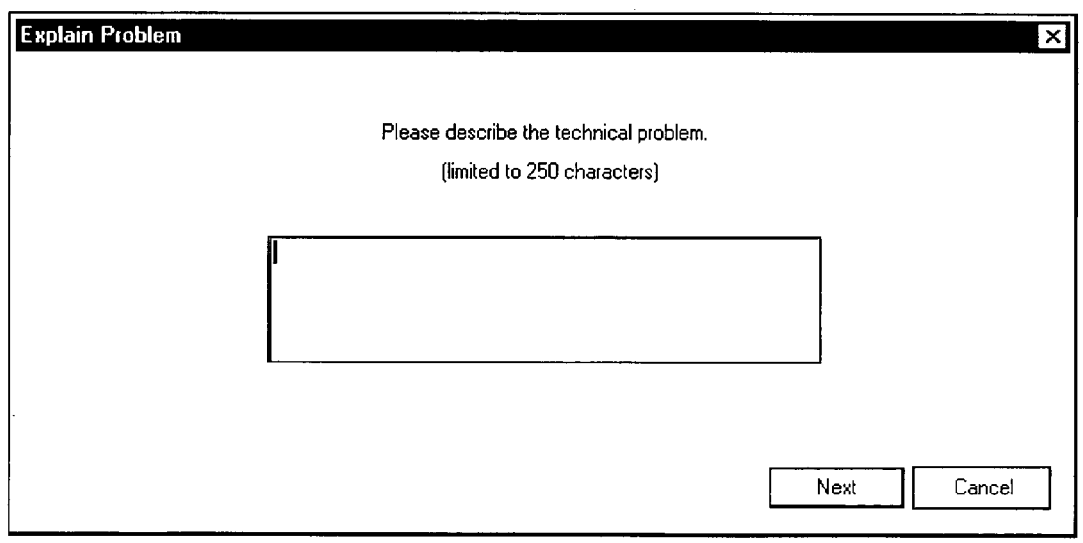
FIG. 14 is a preferred electronic display screen image for customer entry of a description of the technical problem for which on-location electronics troubleshooting services are requested, according to a preferred embodiment of the present invention.

Referring to FIG. 13, the Contact Information screen, preferably the customer 303 may enter a name, select a phone number, and select the 'OK' button (embodying herein computer interface and storage means for receiving contact information relating to such current at least one on-location electronics troubleshooting request) which will display the Explain Problem screen, FIG. 14; or the customer 303 may select the Cancel button, which will preferable close all dialogs and display the Customer Start Screen, FIG. 6.

Figure 15:
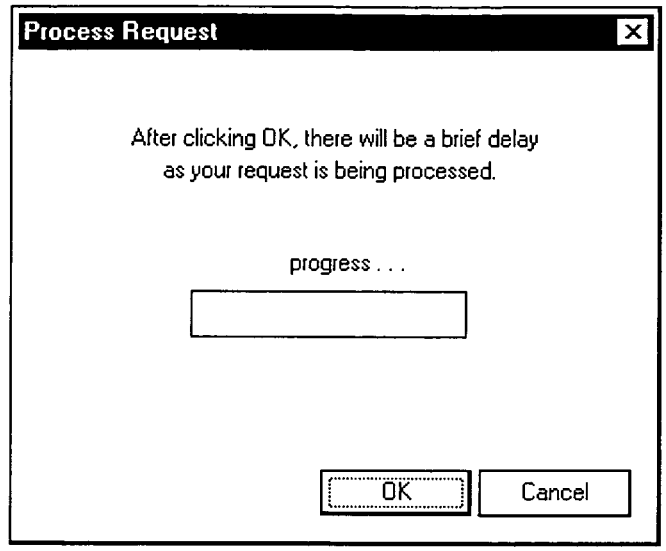
FIG. 15 presents a preferred electronic display screen image of processing request notice presented to a customer after entry of a technical problem by the on-location electronics troubleshooting services system, according to a preferred embodiment of the present invention.

Referring to FIG. 14, the Explain Problem screen, the customer 303 may preferably enter a description of the problem in the available text box (embodying herein computer interface and storage means for receiving problem description relating to such current at least one on-location electronics troubleshooting request by such at least one customer) and select the 'Next' button which will preferably present the Process Request screen FIG. 15, or may select the Cancel button which will preferably close all dialogs and display the Customer Start Screen, FIG. 6.

Figure 17:
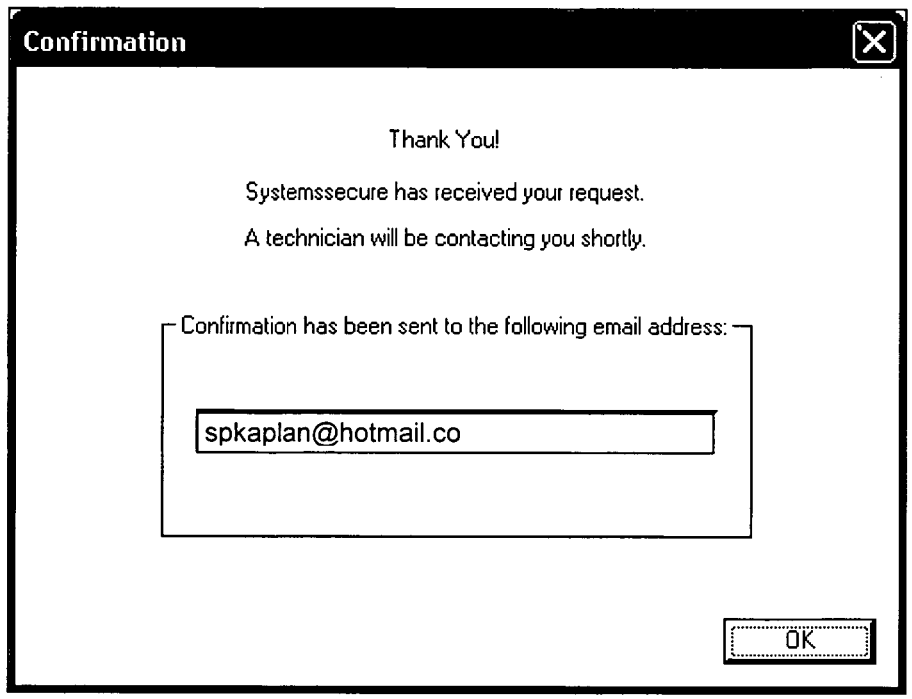
FIG. 17 illustrates a preferred electronic display screen image notifying the customer their on-location electronics troubleshooting services request was received and confirmation has been sent to their e-mail address.

Referring to FIG. 15, Process Request, the customer 303 may preferably select the 'OK' button to send the request to the server and continually wait for a reply for a specified period of time. During this time the progress bar continually updates. If a reply is not received within the specified period of time, then preferably the Error: Request Not Received screen, FIG. 16, is displayed. If a reply is received within the specified period of time, the request has been received and stored in the database (embodying herein computer interface and storage means for receiving requests relating to such on-location electronics troubleshooting services from such, at least one customer), then preferably the Confirmation screen, FIG. 17, is presented to the customer 303. Alternatively, the customer 303 may select the Cancel button which will preferably close all dialogs and display the Customer Start Screen, FIG. 6.

Referring to FIG. 16, Error: Request Not Received screen, the customer 303 preferably may only select the OK button which preferably closes all dialogs and FIG. 6, the Customer Start screen is displayed.

Referring to FIG. 17, the Confirmation screen, preferably customer 303 may only select the OK button which preferably closes all dialogs and FIG. 6, and the Customer Start screen is displayed.

Figure 18:
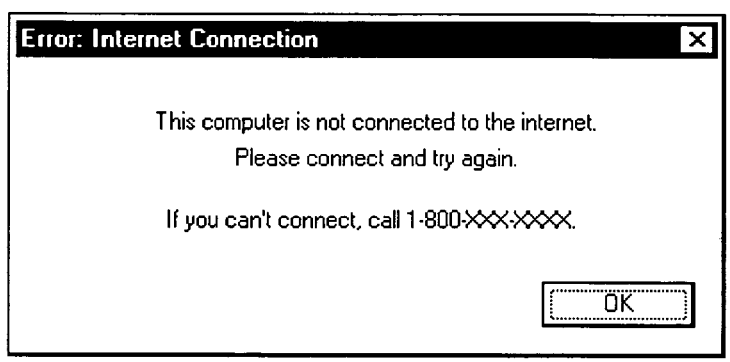
FIG. 18 presents a preferred electronic display screen image informing the customer that no connection to the Internet was found when a customer attempted to use the on-location electronics troubleshooting services system, according to a preferred embodiment of the present invention.

Referring to FIG. 18, the Error: Internet Connection screen, preferably the customer 303 may only select the OK button which preferably closes all dialogs and FIG. 6, and the Customer Start screen is displayed.

As described above, each of the activities of technician 304 are facilitated by particular on-location services management software capabilities. The following screens and interrelationships describe a preferred embodiment of the technician interface software 207.

Figure 19:
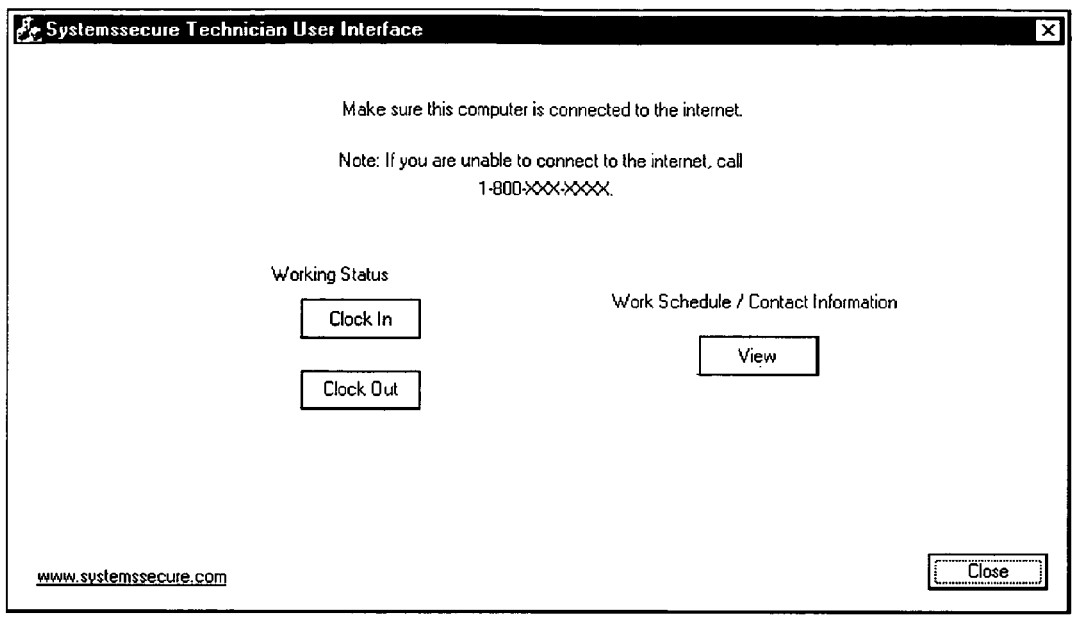
FIG. 19 presents an example of a preferred electronic display screen image illustrating the technician start screen for communicating with the website-based server of the on-location electronics troubleshooting services system, according to a preferred embodiment of the present invention.

Referring to FIG. 19, the Technician Start screen, the technician 304 has five options when initiating access to the system.

Selecting the text link will preferably launch a browser window bringing the technician 304 to the website.

Figure 20:
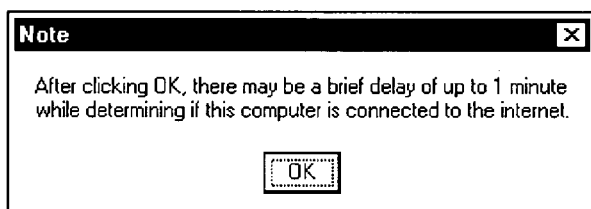
FIG. 20 illustrates an example of a preferred electronic display screen image illustrating the technician brief delay notice presented while a session for a technician is started on the website-based server of the on-location electronics troubleshooting services system, according to a preferred embodiment of the present invention.

Selecting the Clock In button, the Clock Out button or the View (Work Schedule/Contact Information) button preferably will pop up the Note screen, as shown in FIG. 20 (embodying herein computer interface and storage means for receiving at least one work shift start request from such at least one technician).

Selecting the Close button will preferably close the entire application.

Figure 21:
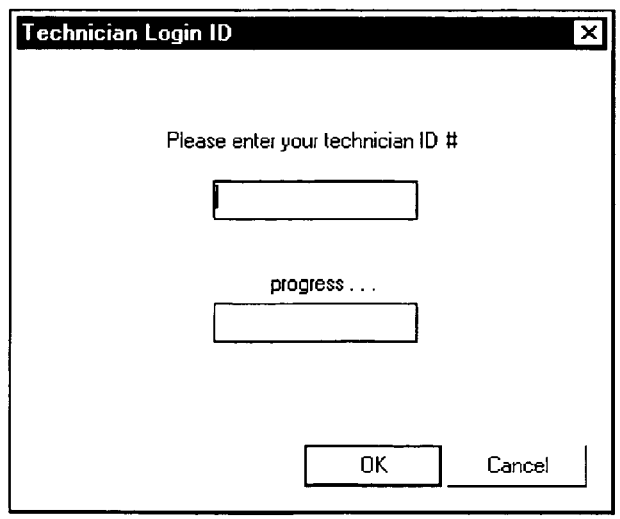
FIG. 21 illustrates an example of a preferred electronic display screen image showing how a technician may login to the on-location electronics troubleshooting services system, according to a preferred embodiment of the present invention.
Figure 29:
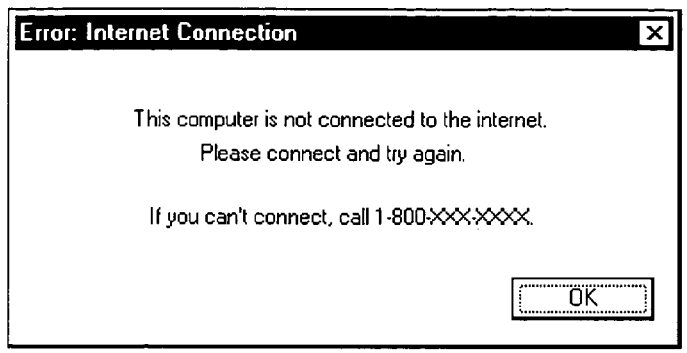
FIG. 29 presents a preferred electronic display screen image informing the technician that no connection to the Internet was found when a customer attempted to use the on-location electronics troubleshooting services system, according to a preferred embodiment of the present invention.

Referring to FIG. 20, the Note screen, the technician 304 must select the OK button to continue the login process. After this button is clicked, the dialog closes and the program checks to see if the personal computer belonging to the technician 304 is connected to the Internet. If the personal computer is connected to the Internet, then preferably the Login screen, as illustrated in FIG. 21 will pop up. If the personal computer belonging to the technician 304 is not connected to the Internet, then preferably the Error: Internet Connection screen, as shown in FIG. 29, will pop up.

Figure 30:
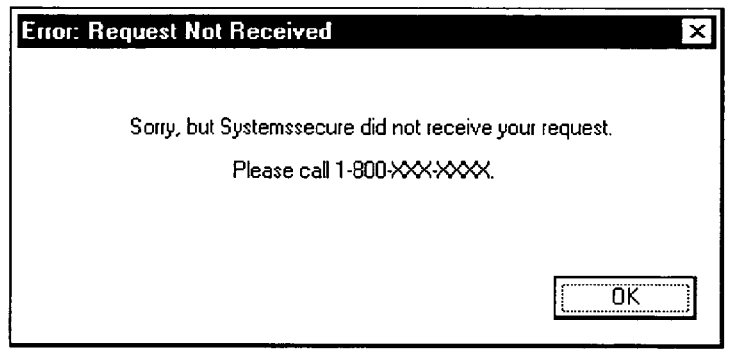
FIG. 30 illustrates a preferred electronic display screen image notifying the technician that the technician's on-location electronics request transmission was not received, according to a preferred embodiment of the present invention.

Referring to FIG. 21, Technician Login ID, preferably a technician 304 must type in his or her personal technician ID number and click the OK button to successfully login. The program then preferably sends this request to the server and waits for a reply for a specified period of time. During this time a progress bar preferably continually updates. If the program does not receive the reply within the specified period of time then the Error: Request Not Received screen, as illustrated in FIG. 30, is preferably presented.

Figure 22:
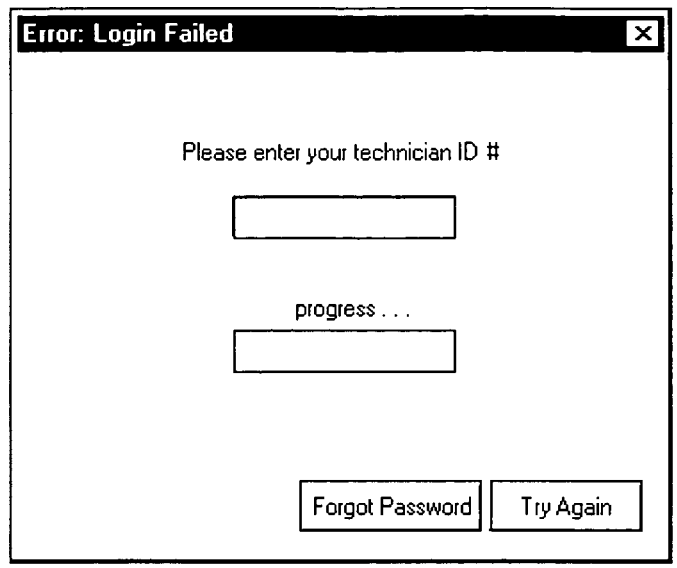
FIG. 22 presents a preferred electronic display screen image example illustrating the error message received by a technician who has attempted to login with an incorrect technician ID number, according to a preferred embodiment of the present invention.

If the reply is received within the specified period of time and the technician ID number was entered incorrectly, then preferably the Error: Login Failed screen, as shown in FIG. 22, is displayed.

If the reply is received within the specified period of time and the technician ID number was entered correctly, then preferably one of five additional screens will be presented to the technician 304 depending on the selection that was previously made on the Technician Start screen, FIG. 19.

Figure 25:
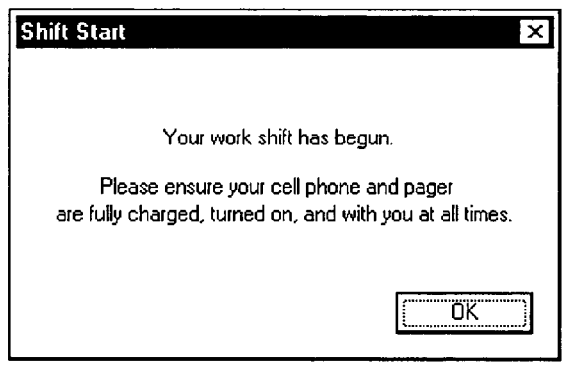
FIG. 25 illustrates the preferred shift start confirmation message sent to the technician as an electronic display screen image after successfully "clocking in" to the on-location electronics troubleshooting services system, according to a preferred embodiment of the present invention.
Figure 27:
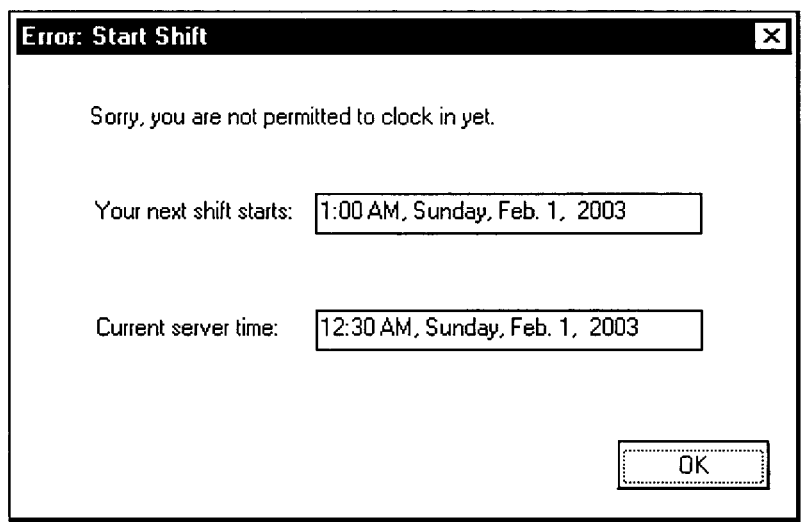
FIG. 27 presents a preferred electronic display screen image notifying the technician that an attempt to "clock in" to the on-location electronics troubleshooting services system prior to the start of a scheduled shift was made too early, according to a preferred embodiment of the present invention.

If the button originally clicked on the Technician Start screen, FIG. 19, was Clock In, and it is currently within 15 minutes of the shift start time for the technician 304 through the end of the shift time, the Shift Start screen, as shown in FIG. 25 is preferably displayed after the Clock In time has been preferably saved to the database (embodying herein computer interface means for presenting confirmation of start of work shift to such at least one technician). Alternatively, if it is not within 15 minutes of the shift start time for the technician 304 through the end of the shift time, the Error: Start Shift, screen, as shown in FIG. 27, is preferably presented.

Figure 26:
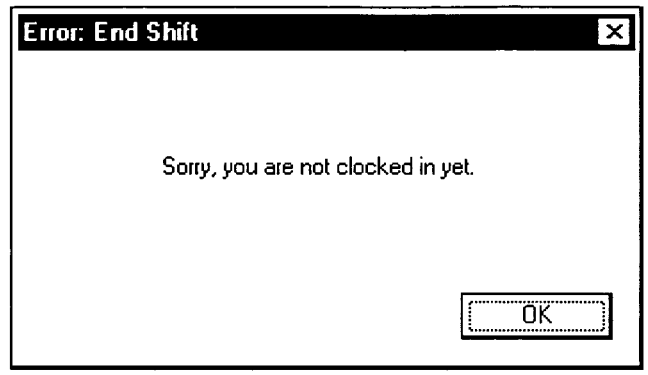
FIG. 26 presents a preferred electronic display screen image notifying the technician when an attempt to "clock out" was made without having "clocked in" to the on-location electronics troubleshooting services system, according to a preferred embodiment of the present invention.
Figure 28:
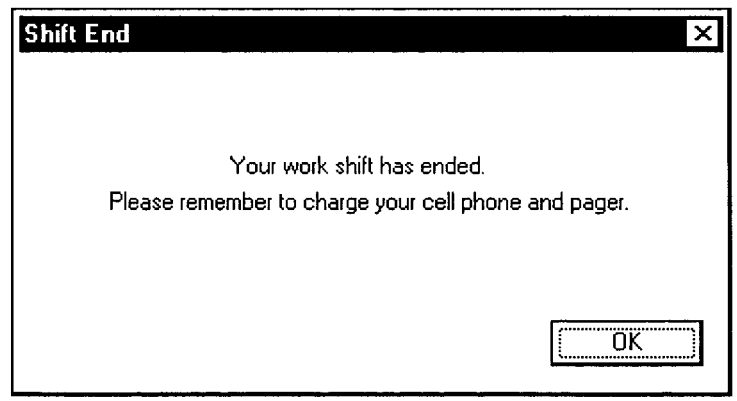
FIG. 28 provides a preferred electronic display screen image notifying the technician that the "clock out" request to end the shift was successful, according to a preferred embodiment of the present invention.

If the button originally clicked on the Technician Start screen, FIG. 19, was Clock Out, then preferably one of two possible outcomes will occur: if the technician 304 previously clocked in, preferably Shift End, as shown in FIG. 28, is displayed after saving the Clock Out time to the database (embodying herein computer interface and storage means for receiving at least one end of work shift request from such at least one technician); or, if the technician 304 has not previously clocked in, preferably Error: End Shift, FIG. 26, is presented to the technician 304.

Figure 24:
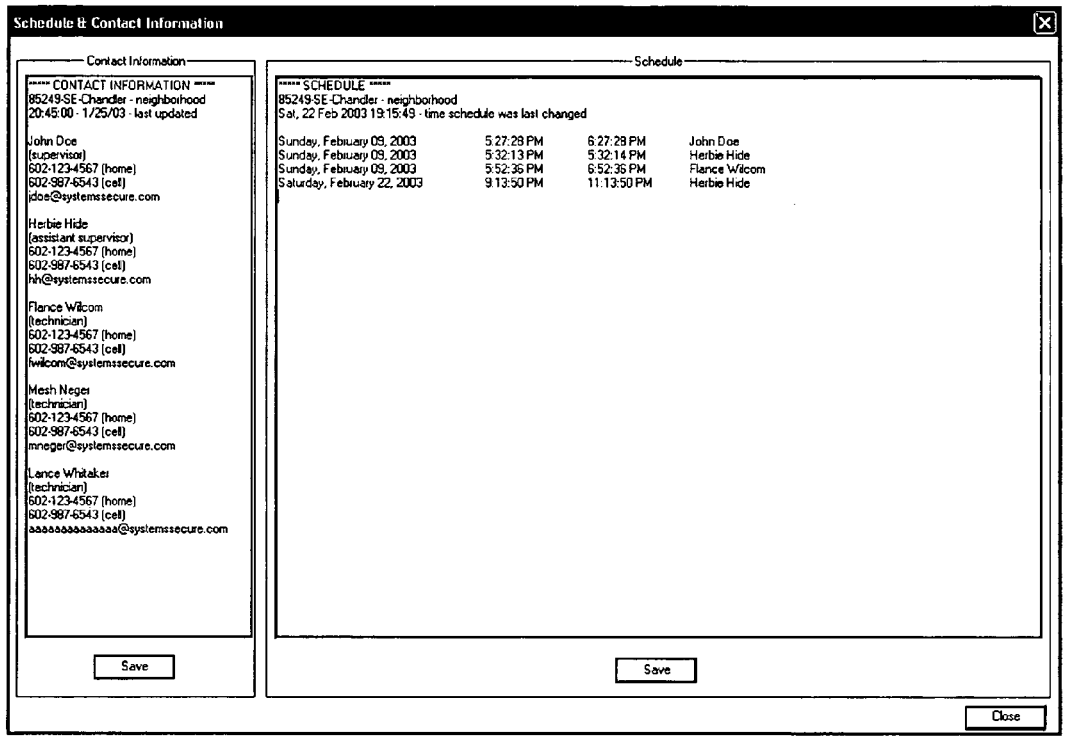
FIG. 24 provides a preferred electronic display screen image illustrating the presentation of the technician work shift schedule and key contact information contained in the on-location electronics troubleshooting services system, according to a preferred embodiment of the present invention.

If the button originally clicked on the Technician Start screen, FIG. 19, was View, then preferably the Schedule and Contact Information screen, FIG. 24, is presented to the technician 304.

If the technician 304 selects the Cancel button, preferably all dialogs are closed and the Technician Start screen, FIG. 19, is displayed.

Referring to FIG. 22, the Error: Login Failed screen, preferably a technician 304 must type in his or her personal technician ID number again and click the OK button to successfully login. The program then preferably sends this request to the server and waits for a reply for a specified period of time. During this time a progress bar preferably continually updates. If the program does not receive the reply within the specified period of time, then the Error: Request Not Received screen, as illustrated in FIG. 30, is preferably presented.

Figure 23:
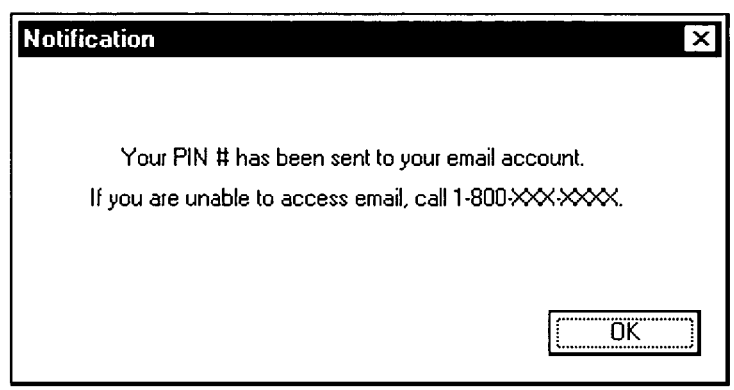
FIG. 23 illustrates a preferred electronic display screen image example of the message received when a technician cannot login or has forgotten a technician ID number, according to a preferred embodiment of the present invention.

If the reply is received within the specified period of time and the technician ID number is incorrect, then FIG. 22, the Error: Login Failed screen, is displayed again one last time. After the second incorrect technician ID number in this dialog, preferably the Notification screen, FIG. 23, is displayed, telling the technician 304 that the technician's ID number will be emailed.

If the reply is received within the specified period of time and the technician ID number was entered correctly, then preferably one of five additional screens will be presented to the technician 304 depending on the selection that was previously made on the Technician Start screen, FIG. 19.

If the button originally clicked on the Technician Start screen, FIG. 19, was Clock In, and it is currently within 15 minutes of the shift start time for the technician 304 through the end of the shift time, the start time for the technician 304 is recorded and the Shift Start screen, as shown in FIG. 25, is preferably displayed. Alternatively, if it is not within 15 minutes of the shift start time for the technician 304 through the end of the shift time, the Error: Start Shift, screen, as shown in FIG. 27, is preferably presented.

If the button originally clicked on the Technician Start screen, FIG. 19, was Clock Out, then preferably one of two possible outcomes will occur: if the technician 304 previously clocked in, the actual shift end time of the technician 304 is recorded in the database (embodying herein computer interface means for presenting confirmation of end of work shift to such at least one technician) and preferably Shift End, as shown in FIG. 28, is displayed; or if the technician 304 has not previously clocked, preferably Error: End Shift, FIG. 26, is presented to the technician 304.

If the button originally clicked on the Technician Start screen, FIG. 19, was View, then preferably the Schedule and Contact Information screen, FIG. 24, is presented to the technician 304.

If the technician 304 selects the Cancel button, preferably all dialogs are closed and the Technician Start screen, FIG. 19, is displayed.

Referring to FIG. 23, the Notification screen, upon presentation of this screen preferably the technician 304 may only select the OK button, which will preferably close all dialogs and return the supervisor 302 to the technician 304 Start screen, FIG. 19.

Referring to FIG. 24, the Schedule & Contact Information screen, all technicians 304 have three choices. The technician 304 may preferably select the Print button in the Contact Information pane to print all of the contact information, the technician 304 may preferably select the Print button in the Schedule pane to print the work shift schedule, or the technician 304 may preferably select the Close button which will preferably close all dialogs and preferably display the Technician Start screen, FIG. 19 (embodying herein computer interface means for presenting planned shift scheduling to such at least one technician).

Referring to FIG. 25, Shift Start screen, the technician 304 may preferably only select the OK button, which preferably closes all dialogs and displays the Technician Start screen, FIG. 19.

Referring to FIG. 26, Error: End Shift screen, the technician 304 preferably may only select the OK button. This preferably closes all dialogs and FIG. 19, the Technician Start screen, is displayed.

Referring to FIG. 27, Error: Start Shift screen, the technician 304 preferably may only select the OK button. This preferably closes all dialogs and FIG. 19, the Technician Start screen, is displayed.

Referring to FIG. 28, Shift End screen, the technician 304 preferably may only select the OK button which closes all dialogs, and FIG. 19, the Technician Start screen, is displayed.

Referring to FIG. 29, Error: Internet Connection screen, the technician 304 preferably may only select the OK button. This preferably closes all dialogs and FIG. 19, the Technician Start screen, is displayed.

Referring to FIG. 30, Error: Request Not Received screen, the technician 304 preferably may only select the OK button. This preferably closes all dialogs and FIG. 19, the Technician Start screen is displayed.

As described above, each of the activities of supervisor 302 are facilitated by particular on-location services management software capabilities. The following screens and interrelationships describe a preferred embodiment of the supervisor interface software 204.

Figure 31:
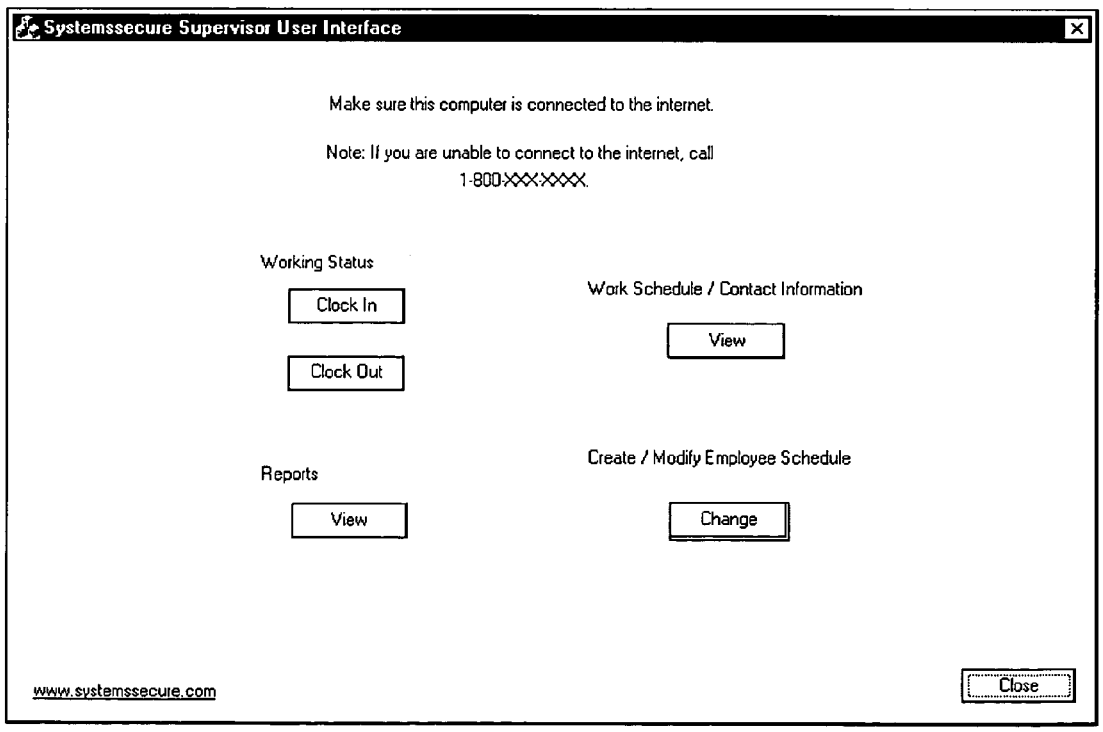
FIG. 31 presents an example of a preferred electronic display screen image illustrating the supervisor start screen for communicating with the website-based server of the on-location electronics troubleshooting services system, according to a preferred embodiment of the present invention.

Referring to FIG. 31, Supervisor Start screen, preferably, the supervisor 302 has various choices when initiating access to the system.

Selecting the text link preferably launches a browser window bringing the supervisor 302 to the website.

Figure 32:
FIG. 32 illustrates an example of a preferred electronic display screen image illustrating the supervisor brief delay notice presented while a session for a supervisor is started on the website-based server of the on-location electronics troubleshooting services system, according to a preferred embodiment of the present invention.

Selecting the Clock In button, the Clock Out button, the View (Work Schedule/Contact Information) button, the View (Reports) button, or the Change (Create/Modify Employee Schedule) button preferably will pop up the Note screen, as shown in FIG. 32.

Selecting the Close button will preferably close the entire application.

Figure 33:
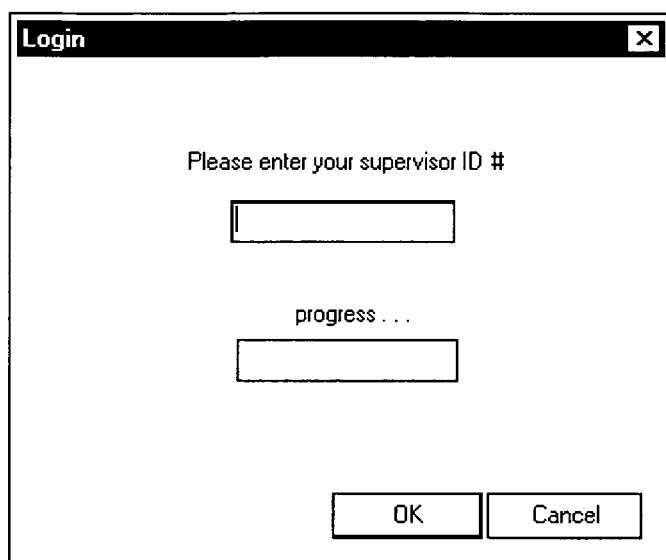
FIG. 33 illustrates an example of a preferred electronic display screen image showing how a supervisor may login to the on-location electronics troubleshooting services system, according to a preferred embodiment of the present invention.
Figure 40:
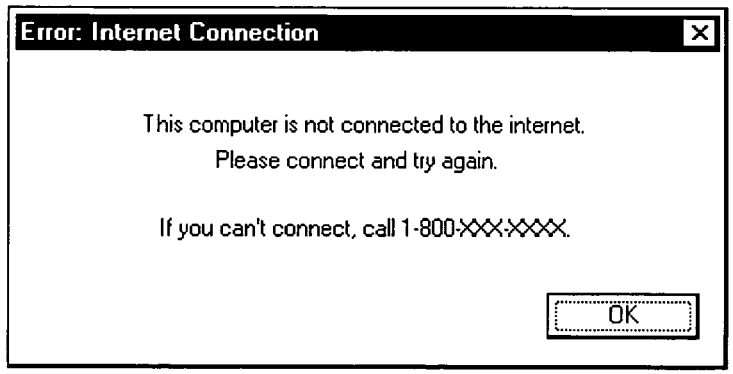
FIG. 40 presents a preferred electronic display screen image informing the supervisor that no connection to the Internet was found when a supervisor attempted to use the on-location electronics troubleshooting services system, according to a preferred embodiment of the present invention.

Referring to FIG. 32, Note screen, the supervisor 302 must select the OK button to continue the login process. After this button is clicked, the dialog closes and the program checks to see if the personal computer belonging to the supervisor 302 is connected to the Internet. If the personal computer is connected to the Internet, then preferably the Login screen, as illustrated in FIG. 33 will pop up. If the personal computer belonging to the supervisor 302 is not connected to the Internet, then preferably the Error: Internet Connection screen, as shown in FIG. 40, will pop up.

Figure 41:
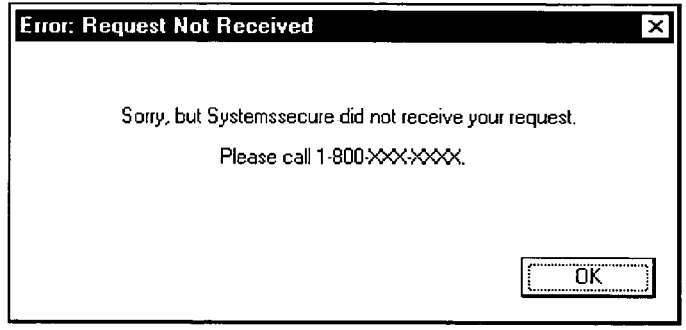
FIG. 41 illustrates a preferred electronic display screen image notifying the supervisor that the supervisor's on-location electronics request transmission was not received, according to a preferred embodiment of the present invention.

Referring to FIG. 33, the Supervisor Login screen, preferably a supervisor 302 must type in his or her personal supervisor ID number and click the OK button to successfully login. The program then preferably sends this request to the server and waits for a reply for a specified period of time. During this time a progress bar preferably continually updates. If the program does not receive the reply within the specified period of time then the Error: Request Not Received screen, as illustrated in FIG. 41, is preferably presented.

Figure 34:
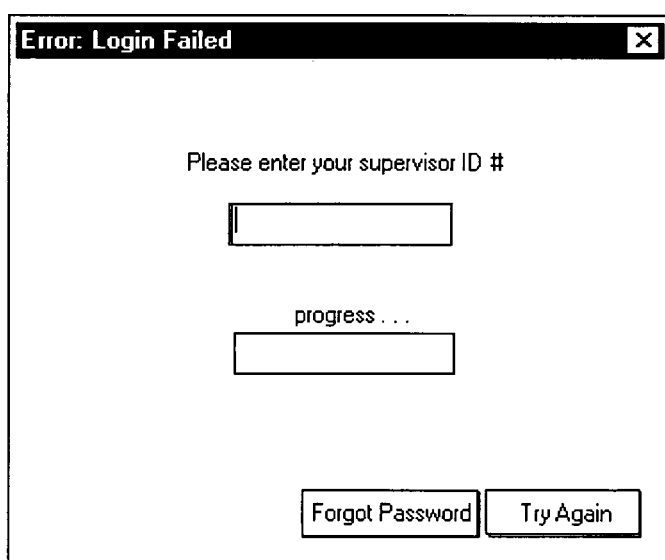
FIG. 34 presents a preferred electronic display screen image example illustrating the error message received by a supervisor who has attempted to login with an incorrect supervisor ID number, according to a preferred embodiment of the present invention.

If the reply is received within the specified period of time and the supervisor ID number was entered incorrectly, then preferably the Error: Login Failed screen, as shown in FIG. 34, is displayed.

If the reply is received within the specified period of time and the supervisor ID number was entered correctly, then preferably one of seven additional screens will be presented to the supervisor 302, depending on the selection that was previously made on the Supervisor Start screen, FIG. 31.

Figure 36:
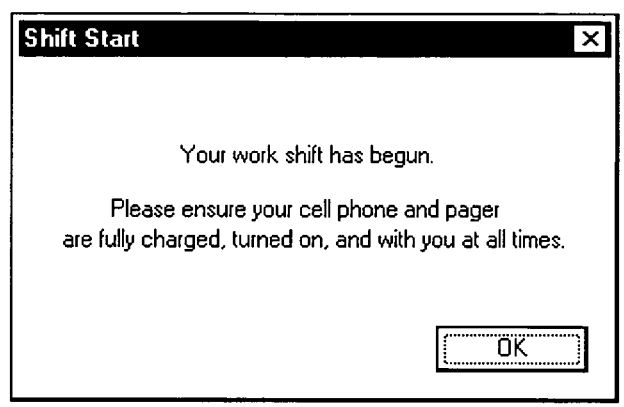
FIG. 36 illustrates the preferred shift start confirmation message sent to the supervisor as an electronic display screen image after successfully "clocking in" to the on-location electronics troubleshooting services system, according to a preferred embodiment of the present invention.
Figure 38:
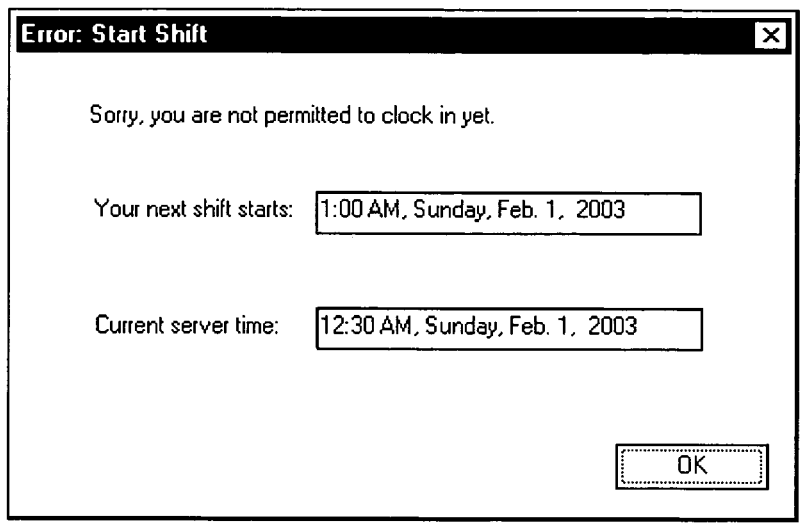
FIG. 38 presents a preferred electronic display screen image notifying the supervisor that an attempt to "clock in" to the on-location electronics troubleshooting services system prior to the start of a scheduled shift was made too early, according to a preferred embodiment of the present invention.

If the button originally clicked was Clock In, and it is currently within 15 minutes of the shift start time for the supervisor 302 through the end of the shift time, the Shift Start screen, as shown in FIG. 36, is preferably displayed. Alternatively, if it is not within 15 minutes of the shift start time for the supervisor 302 time through the end of the shift time, the Error: Start Shift, screen, as shown in FIG. 38, is preferably presented.

Figure 37:
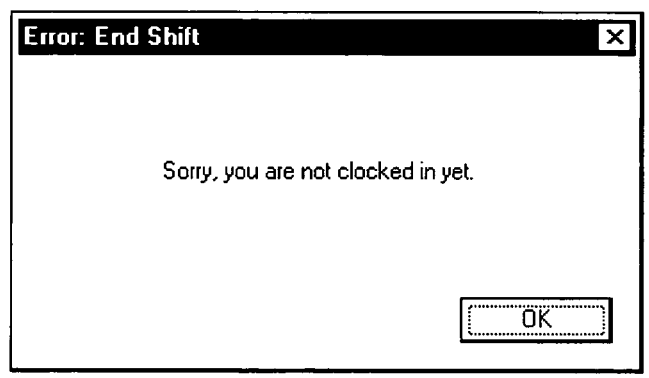
FIG. 37 presents a preferred electronic display screen image notifying the supervisor when an attempt to "clock out" was made without having "clocked in" to the on-location electronics troubleshooting services system, according to a preferred embodiment of the present invention.
Figure 39:
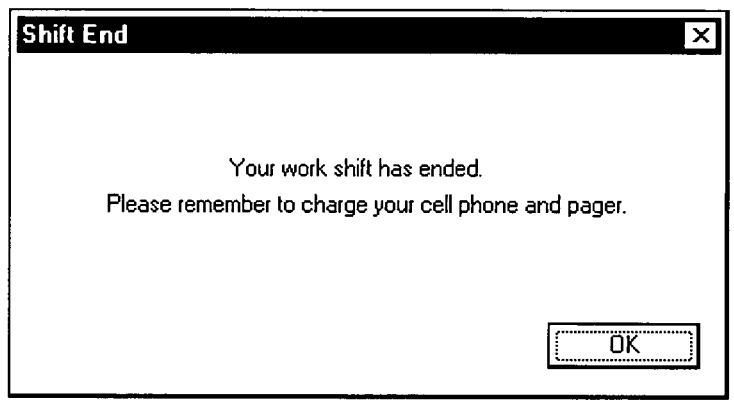
FIG. 39 provides a preferred electronic display screen image notifying the supervisor that the "clock out" request to end the shift was successful, according to a preferred embodiment of the present invention.

If the button originally selected in FIG. 31, Supervisor Start screen, was Clock Out, then preferably one of two possible outcomes will occur: if the supervisor 302 previously clocked in, preferably Shift End, as shown in FIG. 39, is displayed; or if the supervisor 302 has not previously clocked in, preferably Error: End Shift, FIG. 37, is presented to the supervisor 302.

Figure 42:
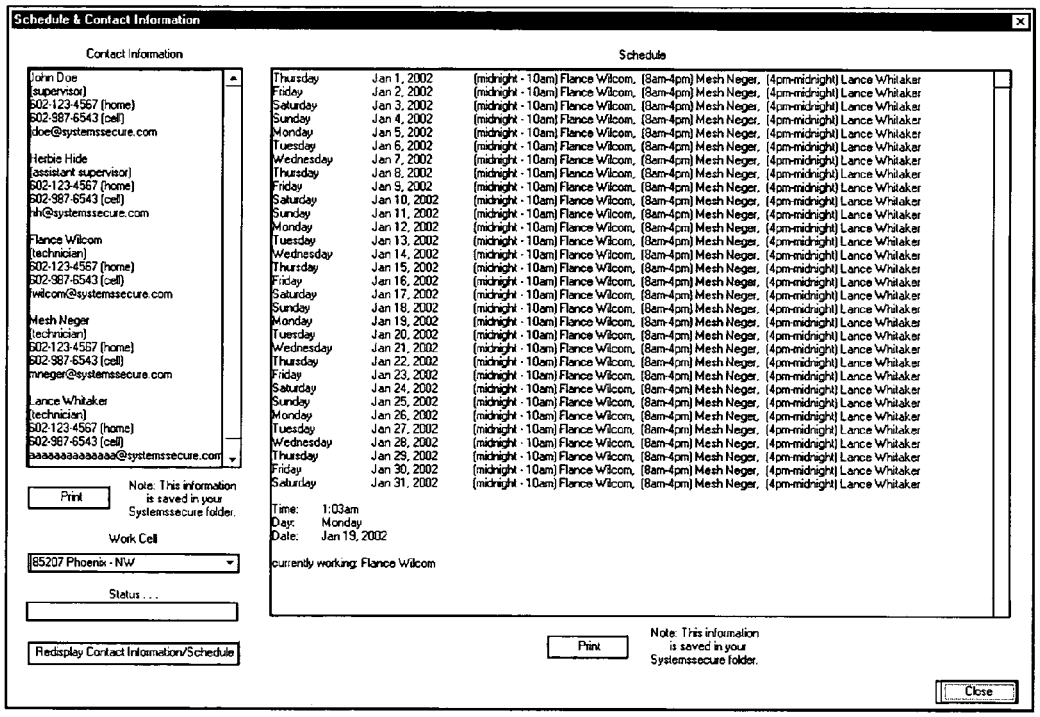
FIG. 42 provides a preferred electronic display screen image illustrating the presentation to the supervisor of the technician work shift schedule and key contact information contained in the on-location electronics troubleshooting services system, according to a preferred embodiment of the present invention.

If the button originally clicked in FIG. 31, Supervisor Start screen, was View (Work Schedule/Contact Information), then preferably FIG. 42, Schedule & Contact Information, is displayed to the supervisor 302.

If the button originally clicked in FIG. 31, Supervisor Start screen, was View (Reports), then preferably Report, FIG. 43, is presented.

If the button originally clicked in FIG. 31, Supervisor Start screen, was Change (Create/Modify Employee Schedule) then preferably FIG. 44, Schedule, is displayed.

If the supervisor 302 selects the Cancel button on the Login screen, FIG. 33, preferably all dialogs are closed and the Supervisor Start screen, FIG. 31, is displayed.

Referring to the Error: Login Failed screen, as illustrated by FIG. 34, preferably a supervisor 302 must type in his or her personal supervisor ID number again and click the OK button to successfully login. The program then preferably sends this request to the server and waits for a reply for a specified period of time. During this time a progress bar preferably continually updates. If the program does not receive the reply within the specified period of time then the Error: Request Not Received screen, as illustrated in FIG. 41, is preferably presented.

Figure 35:
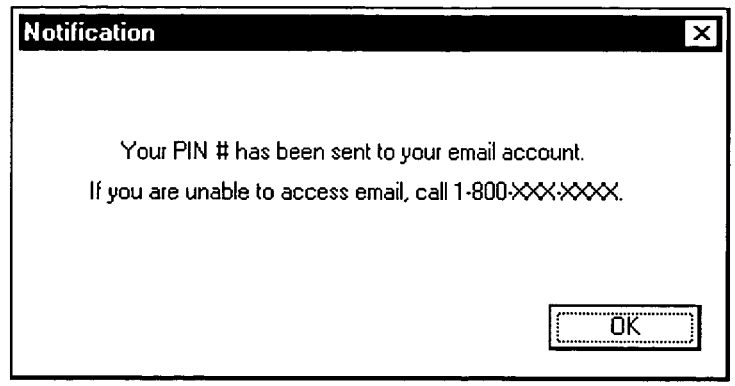
FIG. 35 illustrates a preferred electronic display screen image example of the message received when a supervisor cannot login or has forgotten a supervisor ID number, according to a preferred embodiment of the present invention.

If the reply is received within the specified period of time and the supervisor ID number is incorrect, then FIG. 34, the Error: Login Failed screen, is displayed again one last time. After the second incorrect supervisor ID number in this dialog, preferably the Notification screen, FIG. 35, is displayed, telling the supervisor 302 that the supervisor's ID number will be emailed.

If the reply is received within the specified period of time and the supervisor ID number was entered correctly then preferably one of seven additional screens will be presented to the supervisor 302, preferably depending on the selection that was previously made on the Supervisor Start screen, FIG. 31.

If the button originally clicked was Clock In, and it is currently within 15 minutes of the shift start time for the supervisor 302 through the end of the shift time, records the actual shift start time of the supervisor 302 is recorded in the database and the Shift Start screen, as shown in FIG. 36 is preferably displayed. Alternatively, if it is not within 15 minutes of the shift start time for the supervisor 302 through the end of the shift time, the Error: Start Shift, screen as shown in FIG. 38, is preferably presented.

If the button originally selected in FIG. 31, Supervisor Start screen, was Clock Out, then preferably one of two possible outcomes will occur: if the supervisor 302 previously clocked in, the actual shift end time of the supervisor 302 is recorded in the database and preferably Shift End, as shown in FIG. 39, is displayed; or if the supervisor 302 has not previously clocked in, preferably Error: End Shift, FIG. 37, is presented to the supervisor 302.

If the button originally clicked in FIG. 31, Supervisor Start screen, was View (Work Schedule/Contact Information), then preferably FIG. 42, Schedule & Contact Information, is displayed to the supervisor 302.

If the button originally clicked in FIG. 31, Supervisor Start screen, was View (Reports), then preferably Report, FIG. 43, is presented.

If the button originally clicked in FIG. 31, Supervisor Start screen, was Change (Create/Modify Employee Schedule) then preferably FIG. 44, Schedule, is displayed.

If the supervisor 302 selects the Forgot Password button on the Error: Login Failed screen, FIG. 34, preferably all dialogs are closed and the Notification screen, FIG. 35, is displayed.

Referring to FIG. 35, the Notification screen, upon presentation of this screen, preferably the supervisor 302 may only select the OK button which will preferably close all dialogs and return the supervisor 302 to the Supervisor Start screen, FIG. 31.

Referring to FIG. 36, Shift Start screen, the supervisor 302 may only select the OK button. This preferably closes all other dialogs and returns the supervisor 302 to FIG. 31, the Supervisor Start screen.

Referring to FIG. 37, Error: End Shift screen, the supervisor 302 preferably may only select the OK button. This preferably closes all dialogs and FIG. 31, the Supervisor Start screen, is displayed.

Referring to FIG. 38, Error: Start Shift screen, the supervisor 302 preferably may only select the OK button. This preferably closes all dialogs and FIG. 31, the Supervisor Start screen, is displayed.

Referring to FIG. 39, Shift End screen, the supervisor 302 preferably may only select the OK button. This preferably closes all dialogs and FIG. 31, the Supervisor Start screen, is displayed.

Referring to FIG. 40, Error: Internet Connection screen, the supervisor 302 preferably may only select the OK button. This preferably closes all dialogs and FIG. 31, Supervisor Start screen, is displayed.

Referring to FIG. 41 Error: Request Not Received screen, the supervisor 302 preferably may only select the OK button. This preferably closes all dialogs and FIG. 31, Supervisor Start screen, is displayed.

Referring to FIG. 42, Schedule & Contact Information screen, all supervisors 302 preferably have three choices; and if he or she supervises more than one work cell, two additional options are preferably available. All supervisors 302 preferably have at least the following three choices.

The supervisor 302 may select the Print button in the Contact Information pane to preferably print all of the contact information for technician 304. The supervisor 302 may select the Print button in the Schedule pane to preferably print the entire schedule for technician 304. The supervisor 302 may select the Close button to preferably close all dialogs and display FIG. 31, Supervisor Start screen.

For supervisors 302 responsible for only one work cell, everything in the Work Cell pane preferably will be unavailable, the Work cell preferably will still be displayed in the menu, the Redisplay Contact Information/Schedule button preferably will still be displayed, and the Status bar preferably will be displayed without any solid bars.

For supervisors 302 responsible for multiple work cells, selecting a Work Cell from the pull down menu list will preferably cause the specific cell to appear in the Work Cell pane; and preferably the Contact Information and Schedule are removed from the display. When a supervisor 302 selects the Redisplay Contact Information/Schedule button, the Contact Information and Schedule are removed from the display, all buttons and the entire display becomes grayed out and unavailable, and the program preferably sends this request to the server and continually waits for a reply for a specified period of time. During this time the progress bar preferably continually updates. If the program does not receive a reply within the specified period of time preferably, the Error: Request Not Received screen, FIG. 41, is displayed. If the program does receive the reply within the specified period of time, preferably all buttons and pull down menus cease to become grayed out and become available, and the Contact Information and Schedule preferably are refreshed for that selected Work Cell.

Referring to FIG. 43, Feedback Report, all supervisors 302 preferably have five options. Selecting the Redisplay Report button preferably removes the Report from the display, and all buttons and the entire display preferably becomes grayed out and unavailable. The program preferably sends the report request to the server and preferably waits for a reply for a specified period of time. During this time the progress bar preferably continually updates. If the program does not receive the reply within the specified period of time, preferably the Error: Request Not Received screen, FIG. 41, is displayed. If the program does receive the reply within the specified period of time, preferably the Report is refreshed for that selected Work Cell, for the Start Date and End Date inclusive, and all buttons and pull down menus preferably become available.

Selecting the Close button will preferably close all dialogs and display the Supervisor Start screen, FIG. 31.

Selecting the Start Date from the pull down calendar preferably permits the selection of a desired date and the current Report is preferably removed from the display. Selecting the End Date from the pull down calendar preferably permits the selection of a desired date, and the current Report is preferably removed from the display.

Supervisors responsible for only one work cell preferably will have no other options; and the work cell in the Choose Report Parameters pane preferably will be grayed out and unavailable, and the work cell will still be displayed in the menu.

Supervisors responsible for multiple work cells preferably have the additional ability to select a particular work cell from the pull down menu list. Preferably, after a selection has been made, that one specific work cell appears and the current Report is removed from the display. The supervisor 302 then preferably has all the options described above available for completing a desired report.

Referring to FIG. 44, Schedule, all supervisors 302 will have at least the following seven choices.

Selecting a Shift from the Shift pull down menu list preferably permits Shift selection.

Selecting a Date from the pull down calendar preferably permits Date selection.

Selecting an Employee from the pull down menu list preferably permits Employee selection.

Selecting the Add selection button in the Proposed Schedule pane preferably displays the Preview of Proposed schedule using the selected Shift, Date and Employee.

Selecting the Remove selection button in the Proposed Schedule pane preferably displays requested removal in the Preview of Proposed schedule display using the selected Date, Shift and Employee.

Selecting the Save to Server button preferably causes the buttons and the entire display to become grayed out and unavailable. The program then sends this request to the server and preferably waits for a reply for a specified period of time. During this time the progress bar preferably continually updates. If the program does not receive the reply within the specified period of time, then the Error: Request Not Received screen, FIG. 41, is preferably displayed. If the program does receive the reply within the specified period of time, preferably the entire display ceases to become grayed out and buttons become available and the schedule saved on the server is redisplayed in the Preview of Proposed Schedule pane.

Selecting the Close button preferably closes all dialogs, and the Supervisor Start screen, FIG. 31, is displayed.

Supervisors 302 responsible for only one work cell have all of the above options, but the Work Cell in the Change/Edit Schedule pane will be grayed out and unavailable. Preferably the cell will still be displayed in the menu.

For supervisors 302 responsible for multiple work cells, all of the above options are preferably available plus one additional option. Selecting a Work Cell from the pull down menu list preferably presents the selected cell, the current Report is preferably removed from the display, and all buttons and pull down menus preferably become grayed out and unavailable. The program preferably then sends this request to the server and continually waits for a reply for a specified period of time. During this time the progress bar continually updates. If the program does not receive the reply within the specified period of time, preferably the Error: Request Not Received screen, FIG. 41, is displayed. If the program does receive the reply within the specified period of time, preferably all buttons and pull down menus become available, and preferably the schedule saved on the server is redisplayed in the Preview of Proposed Schedule pane.

As described above, particular activities are facilitated by particular software available to customers 303, technicians 304 and supervisors 302 through a browser connection to the on-location services management software on the Web Server 101. The following screens and interrelationships describe a preferred embodiment of the website interface software 201.

Referring to FIG. 45, the Home Page screen, a potential customer, supervisor 302, customer 303, or technician 304 may preferably make one of five choices.

Preferably, selecting the "Interested in our service?" text link displays FIG. 46, the Interested in Our Service screen. Preferably, selecting the "Customer login" text link displays FIG. 48, the Customer login screen. Preferably, selecting the "Technician login" text link displays FIG. 52, the Technician login screen. Preferably, selecting the "Interested in becoming a technician?" text link displays FIG. 64, the Employment Interest screen. Preferably, selecting the "Supervisor login" text link preferably displays FIG. 65, the Supervisor Login screen.

Referring to FIG. 46, the Interested In Our Service screen, a potential customer 303 preferably fills out all of his/her contact information and selects the submit button. After clicking the submit button, FIG. 47, the Thanks, You will be contacted screen is preferably displayed.

Referring to FIG. 47, the Thanks, You will be contacted screen preferably displays a thank you message, and preferably the potential customer 303 is not prompted to take any further action.

Referring to FIG. 48, the Customer login screen, the customer 303 preferably enters his or her phone number and customer ID number and selects the submit button. If the phone number or customer ID number was incorrect, then the Customer Login Incorrect screen, FIG. 49, is preferably displayed. If the phone number and customer ID number were correct, then the Customer Logged In screen, FIG. 50, is preferably displayed Referring to FIG. 49, the Customer Login Incorrect screen, the customer 303 enters his or her phone number and customer ID number and selects the submit button. If the phone number or customer ID was incorrect, then the Incorrect Login screen, FIG. 49, is preferably displayed again. If the phone number and customer ID are correct, then the Customer Logged In screen, FIG. 50, is preferably displayed.

Referring to FIG. 50, the Customer Logged In screen, the customer 303 may preferably select one of five choices. Selecting the 'Interested in adding service to another location' radio button and clicking the submit button will preferably display the Thanks, You will be contacted screen, FIG. 47. Selecting the 'Moving' radio button and clicking the submit button will preferably display the Thanks, You will be contacted screen, FIG. 47. Selecting the 'Moving service to another computer' radio button and clicking-the submit button will preferably display the Thanks, You will be contacted screen, FIG. 47. Selecting the 'Modify billing info' radio button and clicking the submit button will preferably display the Modify billing information screen, FIG. 69. Selecting the 'Comments' radio button, completing his/her comments about the service, and clicking the submit button will preferably display the Thanks Response screen, FIG. 51.

Referring to FIG. 51, the Thanks Response screen, a thank you for your response message is preferably displayed and the customer 303 is preferably not required to take any action.

Referring to FIG. 52, the Technician Login screen, the technician 304 preferably enters his or her phone number and technician ID number and clicks the submit button. If either the phone number or technician ID number was incorrect, then the Technician Login Incorrect screen, FIG. 53, is preferably displayed. If the phone number and technician ID number are correct, then the Technician Logged In screen, FIG. 54, is preferably displayed.

Referring to FIG. 53, the Technician Login Incorrect screen, the technician 304 preferably enters his or her phone number and technician ID number and selects the submit button. If either the phone number or technician ID number is incorrect, then the Technician Login Incorrect screen, FIG. 53, is preferably displayed again. If the phone number and technician ID number are correct, then the Technician Logged In screen, FIG. 54, is preferably displayed.

Referring to FIG. 54, the Technician Logged In screen, the technician 304 preferably may select one of two choices. Selecting the 'Complete work order' radio button and clicking the submit button will preferably display the Complete work order screen, FIG. 55. Selecting the 'Initial customer setup' radio button will preferably display the Purchase Service screen, FIG. 61.

Referring to FIG. 55, the Complete Work Order screen, preferably the technician 304 fills in the Work Order Number, the Time in, the Time out, preferably selects either the "Yes" or "No" radio button to indicate the customer 303 needs a contractor to solve the problem the customer 303 has, and clicks the Submit button.

If the Work Order Number entered has not been previously recorded by the system, it is incorrect and preferably the Incorrect Work Order screen, FIG. 56, is displayed. If the Work Order Number is correct and the "Yes" radio button for "Does the customer 303 need services from a contractor?" question was selected, then the Find Contractor screen, FIG. 57, is preferably displayed (embodying herein computer interface and storage means for receiving indication of any need relating to repair service from such selected at least one technician).

If the Work Order Number is correct and the "No" radio button for "Does the customer need services from a contractor?" question was selected, the information is saved to the database (embodying herein computer interface and storage means for recording on-location electronics troubleshooting service information), then the Customer Satisfaction screen, FIG. 58, is preferably displayed (embodying herein computer interface and storage means for receiving start time of such on-location electronics troubleshooting service from such selected at least one technician; and embodying herein computer interface and storage means for receiving end time of such on-location electronics troubleshooting services from such selected at least one technician).

Referring to FIG. 56, the Incorrect Work Order screen, preferably the technician 304 fills in the Work Order Number, the Time in, the Time out, preferably selects either the "Yes" or "No" radio button to indicate the customer 303 needs a contractor to solve the problem the customer 303 has and clicks the Submit button.

If the Work Order Number entered has not been previously recorded by the system, then it is incorrect and preferably the Incorrect Work Order screen, FIG. 56, is displayed again.

If the Work Order Number is correct and the "Yes" radio button for "Does the customer need services from a contractor?" question was selected, then the Find Contractor screen, FIG. 57, is preferably displayed.

If the Work Order Number is correct and the "No" radio button for "Does the customer need services from a contractor?" question was selected, then the Customer Satisfaction screen, FIG. 58, is preferably displayed Referring to FIG. 57, the Find Contractor screen, preferably the technician 304 selects either the Commercial button or Residential button and then selects a contractor specialty from the drop down list and clicks the Submit button which preferably saves all the information in the database and displays the Customer Satisfaction screen, FIG. 58 (embodying herein computer interface and storage means for recording on-location electronics troubleshooting service information; and embodying herein computer interface and storage means for receiving indication of selected type of such repair service from such selected at least one technician).

Referring to FIG. 58, the Customer Satisfaction screen, preferably the customer 303 fills in his/her customer ID number and indicates his or her level of satisfaction by selecting either the "Completely Satisfied" radio button, the "Satisfied" radio button or the "Unsatisfied" radio button and clicks the Submit button (embodying herein computer interface and storage means for receiving customer satisfaction evaluation).

If the customer ID number entered was correct, then the Thanks screen, FIG. 60, is preferably displayed.

If the customer ID number entered was incorrect, then FIG. 59, the Customer Satisfaction Incorrect Customer Id screen is preferably displayed.

Referring to FIG. 59, the Customer Satisfaction Incorrect Customer Id screen, preferably the customer 303 fills in his/her customer ID number and indicates his or her level of satisfaction by selecting either the "Completely Satisfied" radio button, the "Satisfied" radio button or the "Unsatisfied" radio button and clicks the Submit button.

If the customer ID number entered was correct, then the Thanks screen, FIG. 60, is preferably displayed.

If the customer ID number entered was incorrect, then FIG. 59, the Customer Satisfaction Incorrect Customer Id screen is preferably displayed again.

Referring to FIG. 60, the Thanks Service screen, preferably presents a thank you message and preferably the customer 303 is not required to take any action.

Referring to FIG. 61, the Purchase Service screen, preferably the customer 303 fills in Name, Address, City, State, Zip, Phone, Email, Credit Card Number, and Expiration and clicks the submit button.

Preferably, if the customer's 303 credit card information was accepted, then the information is saved and then the Download screen, FIG. 62 is preferably displayed (embodying herein computer interface and storage means for registering customer data relating to at least one customer; (embodying herein database means for maintaining a database of such customer data relating to such at least one customer).

Preferably, if the credit card belonging to the customer 303 was not accepted, then the Re-Enter Credit Card Information screen, FIG. 63, is preferably displayed.

Referring to FIG. 62, the Download screen, preferably the technician 304 selects the Download Software text link to begin the customer interface software 202 download to the personal computer belonging to the customer 303 and preferably activates the downloaded customer interface software 202.

Referring to FIG. 63, the Re-Enter Credit Card Information screen, preferably the customer 303 fills in Name, Address, City, State, Zip, Phone, Email, Credit Card Number, and Expiration and clicks the submit button.

Preferably, if the customer's 303 credit card information was accepted, then the Download screen, FIG. 62 is preferably displayed.

Preferably, if the credit card belonging to the customer 303 was not accepted, then the Re-Enter Credit Card Information screen, FIG. 63, is preferably displayed again.

Referring to FIG. 64, the Employment Interest screen, preferably the potential employee fills in Name, Address, City, State, Zip, Phone, Email and skills and clicks the Submit button; then the Thanks you will be contacted screen, FIG. 47, is preferably displayed.

Referring to FIG. 65, the Supervisor Login screen, preferably the supervisor 302 enters his or her phone number and supervisor ID number and clicks the Submit button.

If either the phone number or supervisor ID number is incorrect, then the Supervisor Login Incorrect screen, FIG. 66, is preferably displayed.

If the phone number and supervisor ID number are correct, then the Create Employee Account screen, FIG. 67, is preferably displayed.

Referring to FIG. 66, the Supervisor Login Incorrect screen, preferably the supervisor 302 enters his or her phone number and supervisor ID number and clicks the Submit button.

If the either phone number or supervisor ID number is incorrect, then the Supervisor Login Incorrect screen, FIG. 66, is preferably displayed again.

If the phone number and supervisor ID number are correct, then the Create Employee Account screen, FIG. 67, is preferably displayed.

Referring to FIG. 67, the Create Employee Account screen, preferably the new employee fills in Name, Address, City, State, Zip, Cell Phone, Home Phone, Pager, Email and clicks the Submit button, the information is saved and the Download Employee Software screen, FIG. 68, is preferably displayed (embodying herein computer interface and storage means for registering technician data relating to at least one technician having electronics-technician abilities relating to providing such on-location electronics troubleshooting services; and (embodying herein database means for maintaining a database of the technician data relating to such at least one technician).

Referring to FIG. 68, the Download Employee Software screen, preferably the supervisor 302 selects the Download Software text link on the employee's personal computer to download the technician interface software 207 and preferably activates the technician interface software 207.

Figure 70:
FIG. 70 provides an illustration of a preferred electronic display screen image presented to customers after successfully changing contact and credit card information, according to a preferred embodiment of the present invention.

Referring to FIG. 69, the Modify Billing Information screen, preferably the customer 303 fills in Name, Address, City, State, Zip, Primary Phone Number, Secondary Phone Number, Email address, Credit Card Number, Expiration, and clicks the submit button, which preferably displays the Billing Information Changed screen, FIG. 70.

Referring to FIG. 70, the Billing Information Changed screen, preferably a thank you message and confirmation of updated information is displayed. Preferably, the customer 303 is not prompted to do anything.

Figure 71:
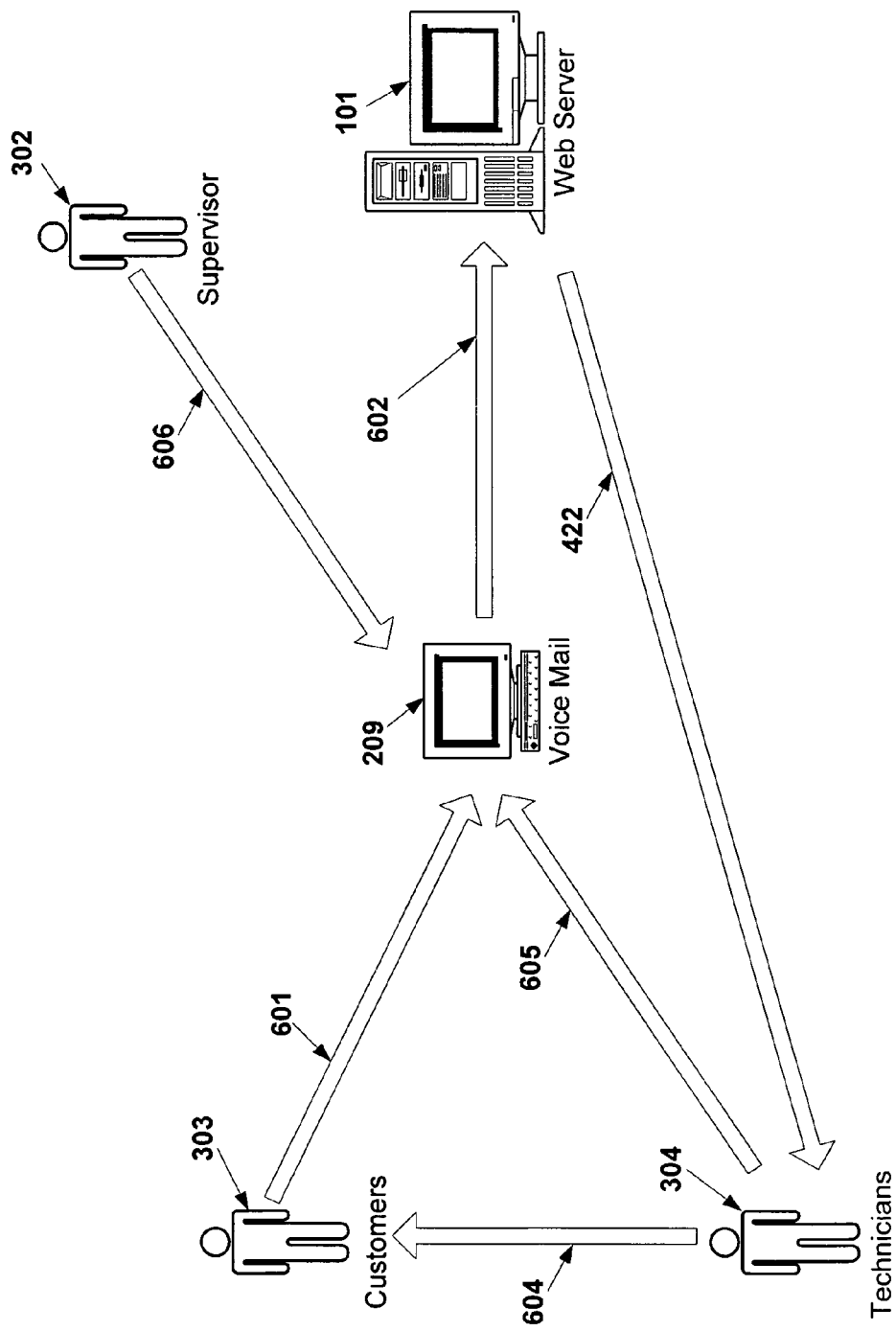
FIG. 71 is a schematic illustrating a preferred alternate on-location electronics troubleshooting services business method using telephones in combination with an Internet website-based server system for selected functions, according to a preferred embodiment of the present invention.

Referring now to FIG. 71, there is presented a schematic overview of the business functions which may be preferably conducted using a standard telephone or cellular telephone as an alternative preferred embodiment of the present invention.

First, a customer 303 may preferably use a telephone, as illustrated by the services request step 521, to place a call which is preferably answered by telephone interface 209 particularly programmed to collect the customer ID (account) number and pin number from the customer 303 and to subsequently store the information for later transfer to the on-location services management software on the Web Server 101. All the necessary validations and edits are performed by the telephone interface 209 to ensure validity of the information entered by the customer 303.

Second, after receiving an on-location electronics troubleshooting service request the telephone interface 209 creates and sends an on-location electronics troubleshooting service request email containing the customer id and pin number to the on-location services management software on the Web Server 101. Preferably, when an on-location electronics troubleshooting service request is received and recorded in the database, the on-location services management software will automatically initiate a dispatch message to a technician 304 using the methods described above in the technician dispatch step 422 in FIG. 4. Preferably, when the telephone interface 209 receives technician 304 start or end shift times, a technician 304 start time email or technician 304 end time email is sent to the on-location services management software on the Web Server 101 and recorded automatically as if the technician 304 had entered the information as described in the technician schedule step 532 shown in FIG. 5. Preferably, the telephone interface 209 receives supervisor 302 start or end shift times, a supervisor 302 start time email or supervisor 302 end time email is sent to the on-location services management software on the Web Server 101 and recorded automatically as if the supervisor 302 had entered the information as described in the supervisor schedule step 542 shown in FIG. 5.

Third, as shown in on-location services step 604, preferably after completion of the on-location electronics troubleshooting services the technician 304 will initiate a telephone call to the telephone interface 209 to record the completion of the service call, record whether there is a need for repair services, and record the satisfaction level of the customer 303. All the necessary validations and edits are performed by the telephone interface 209 to ensure validity of the information entered by the technician 304.

Fourth, as shown in the telephone technician shift start and end step 605, the technician 304 calls into the telephone interface 209, enters his or her technician ID number and indicates whether this is the start of the shift or the end of the shift. The telephone interface 209 then sends a technician 304 start shift email or a technician 304 end shift email to the on-location services management software on the Web Server 101. All the necessary validations and edits are performed by the telephone interface 209 to ensure validity of the information entered by the technician 304.

Fifth, as shown in the telephone supervisor shift start and end step 606, the supervisor 302 calls into the telephone interface 209, enters his or her supervisor ID number, and indicates whether this is the start of the shift or the end of the shift. The telephone interface 209 then sends a supervisor 302 start shift email or a supervisor 302 end shift email to the on-location services management software on the Web Server 101. All the necessary validations and edits are performed by the telephone interface 209 to ensure validity of the information entered by the supervisor 302.

Although the illustrated overview is one preferred embodiment, one skilled in the art will appreciate that, under appropriate circumstances, various sections may be omitted, rearranged or adapted in various ways for various purposes.

Figure 72:
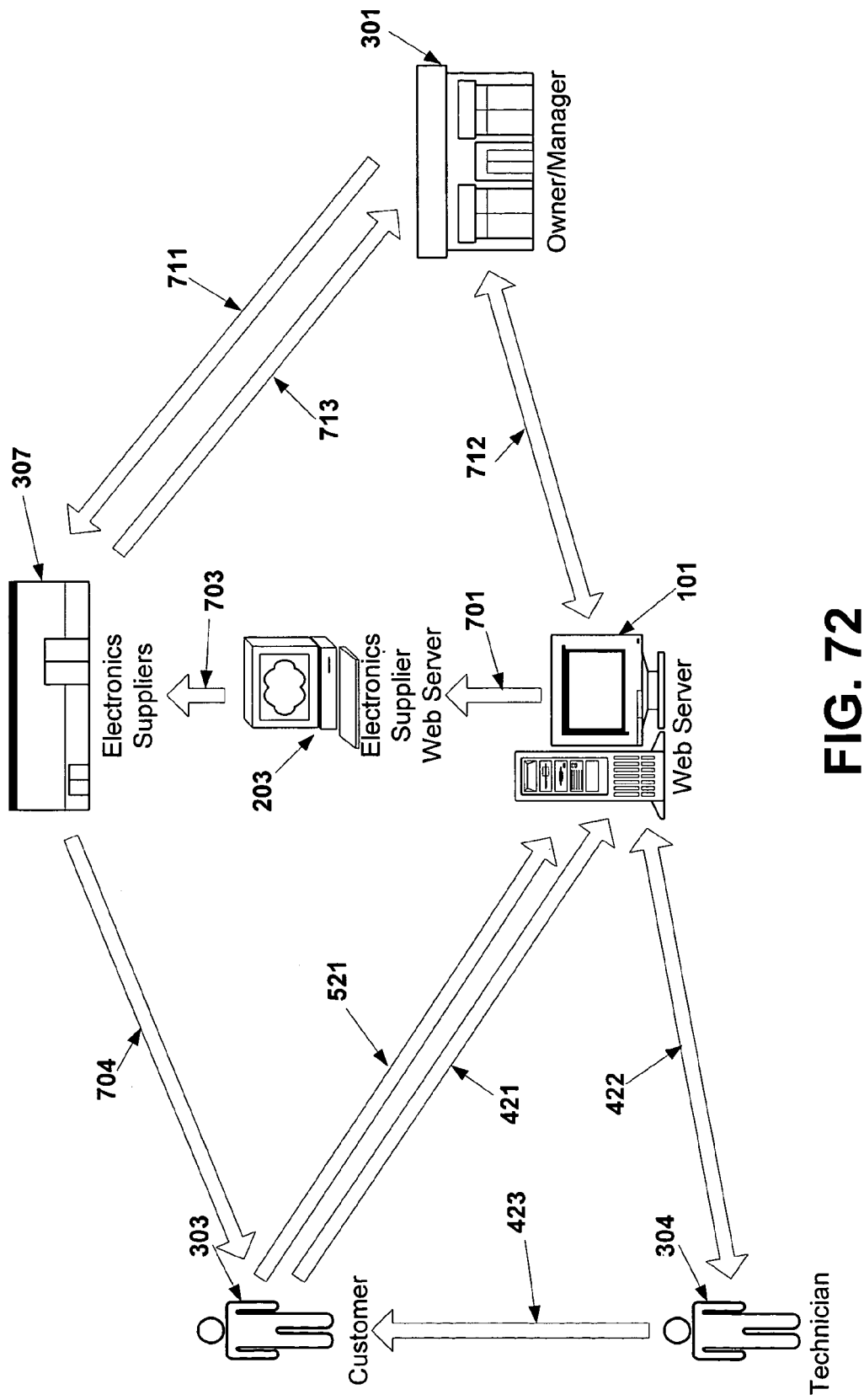
FIG. 72 is a schematic illustrating a preferred electronics supplier sales partnering business method, according to a preferred embodiment of the present invention.

Referring now to FIG. 72, an additional preferred embodiment of the present invention is illustrated in which a customer 303 may purchase a desired piece of low-voltage electronic equipment from electronics equipment suppliers 307 that have been selected for their product line and delivery standards.

In the electronics equipment supplier agreement step 711, preferably the owner/manager 301 will identify particular electronics equipment suppliers 307 who provide appropriate types and brands of low-voltage electronics, who are willing to provide very rapid delivery to customers 303, and who will preferably pay a commission based on the value of the products sold to customers 303.

In the electronics equipment supplier maintenance step 712, the owner/manager 301 will preferably add a hyperlink to the electronics equipment supplier web server 203 once an agreement is completed with an electronics equipment supplier 307. The hyperlink will allow customers 303 to access the electronics equipment supplier web site 203 selected by the customers 303.

In the electronics equipment purchase step 701, a customer 303 will select the desired item and arrange payment through the electronics equipment supplier web site 203. In turn, the electronics equipment supplier 307 will schedule delivery of the purchased equipment directly with the customer 303, as shown in the electronics equipment delivery step 704. Periodically, each electronics equipment suppliers 307 will remit to the owner/manager 301 commissions for electronics equipment purchased by customer 303 coming to the electronics equipment supplier web site 203 from the on-location services management software operating on the Web Server 101, as depicted in the payment step 713.

If desired, a customer 303 may request on-location services to assist with the implementation of the purchased electronics equipment using the same steps as depicted in FIG. 4, of services request step 421, the technician dispatch step 422 and problem resolution 423.

Figure 73:
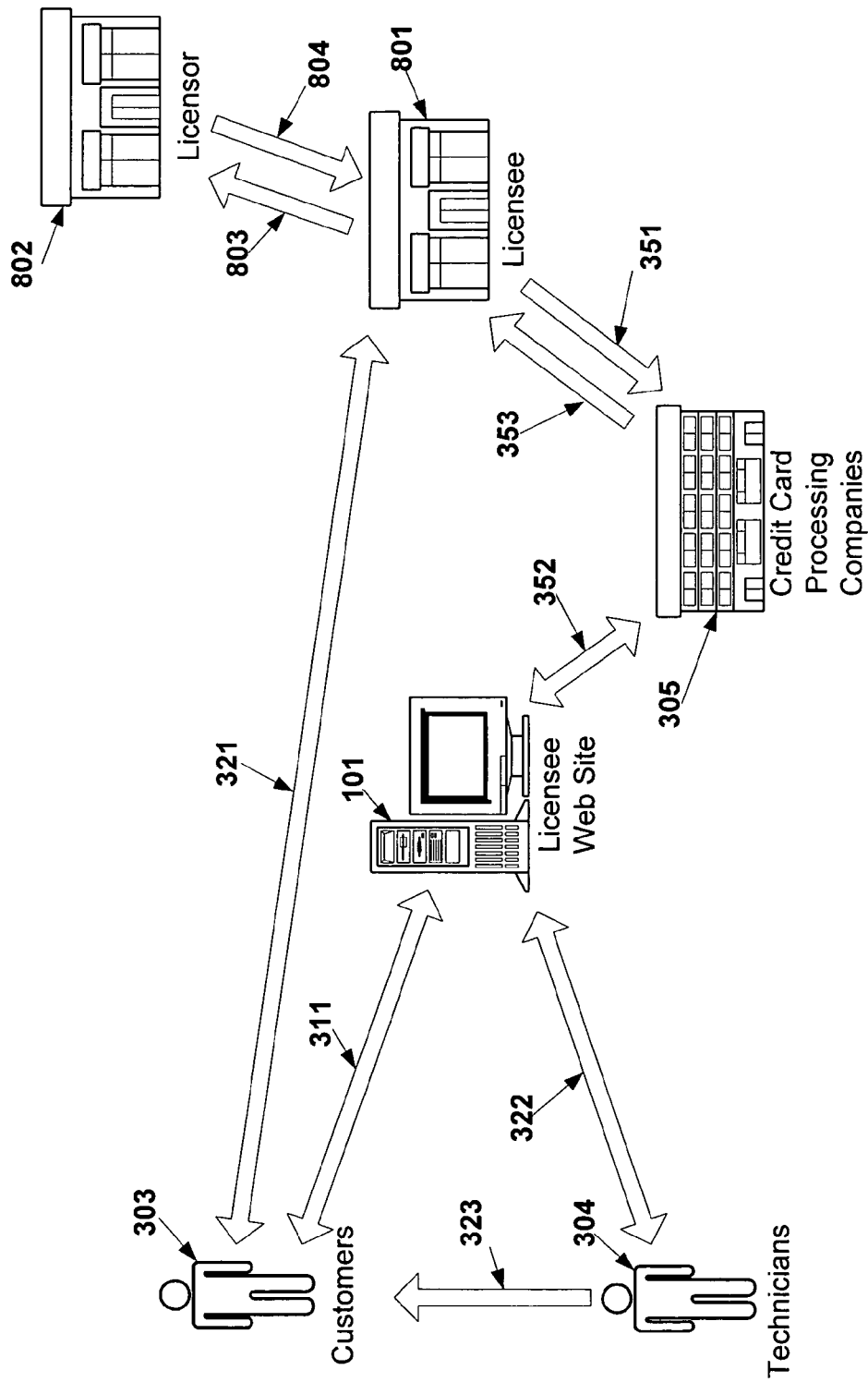
FIG. 73 is a schematic illustrating a services business method using an Internet website-based server system, according to an alternate preferred embodiment of the present invention.

Referring now to FIG. 73, a schematic overview of an alternate preferred embodiment of the primary business functions of the present invention is shown.

In a preferred embodiment of the present invention, in the initial contact step 311, a customer 303 learns of the on-location electronics troubleshooting services from advertising and other marketing activities and preferably expresses an interest in the services through the Web Site Home Page, FIG. 45, Interested in Our Service screen, FIG. 46, and the Thanks, You will be contacted screen, FIG. 47. Preferably, in customer contact step 321, the Licensee 801 contacts the customer 303 using one or more typical methods; and preferably the customer 303 agrees to subscribe to the on-location electronics troubleshooting services for a period of at least one year and preferably agrees to pay the agreed monthly fee via an automatic monthly charge to a credit card belonging to the customer 303. According to an alternate preferred embodiment of the present invention, customer 303 pays an initial setup fee and a "per incident" fee each time the customer requests service. Upon reading the teachings of this specification, those with ordinary skill in the art will now understand that, under appropriate circumstances, considering issues such as business and marketing strategy, types of clients, type of service being provided by licensee, etc., other payment arrangements may suffice, such as, for example, eliminating the initial setup fee, prepaying for services, paying an annual fee, etc.

Preferably, Licensee 801 pays licensing fees to Licensor 802, as indicated by step 803, in exchange for a license to use the software and/or business methods of licensor 802, as indicated by step 804. Preferably, licensee 801 pays an initial licensing fee, followed by periodic licensing fees (preferably paid monthly) as indicated by step 803. Preferably, at least a portion of the licensing fees are based on the number of technicians 304 employed by licensee 801. Upon reading the teachings of this specification, those with ordinary skill in the art will now understand that, under appropriate circumstances, considering issues such as business and marketing strategy, types of clients, type of service being provided by licensor, etc., other licensing arrangements may suffice, such as, for example, a fixed one-time licensing fee, annual licensing fees, licensing fees based on the number of customers 303, licensing fees based on geographic region or some other pertinent factor, etc.

In a preferred embodiment of the present invention, once a potential customer 303 has agreed to subscribe to the on-location electronics troubleshooting services as indicated by step 311, a technician 304 will be dispatched to the home or place of business of the potential customer 303 as indicated by step 323. Preferably, once the technician 304 is at the service location of the customer 303, he or she will complete the customer sign up step 322 by logging to the on-location'services management software operating on the Web Server 101, as shown in FIG. 45, FIG. 52, FIG. 53 and FIG. 54; and the customer 303 will preferably enter his or her name and address and contact information and credit card information, as illustrated in FIG. 61 and FIG. 62 (embodying herein computer interface and storage means for registering customer data relating at least one customer). After entry and acceptance of the credit card information, as indicated by step 351, step 352 and step 353, the customer information is stored in the database (embodying herein database means for maintaining a database of such customer data for such at least one customer; and (embodying herein computer interface and storage means for receiving credit card account information from such at least one customer), and the customer interface software 202 is downloaded from the Web Server 101 and installed on a personal computer which is, or can be, connected to the Internet 107, as shown in FIG. 3. Preferably, the technician 304 instructs the customer 303 on the usage of the customer interface software 202 (see FIG. 2).

Preferably, when customer 303 needs assistance, customer 303 submits a request for service (preferably via website 101 as indicated by step 311 or via telephone call to licensee as indicated by step 321). Preferably, technicians 304 are then notified, as indicated by step 322, to assist the customer 303, as indicated by step 323. Preferably, technicians 304 provide service trouble-shooting, assisting, and maintaining low voltage equipment, such as, for example, computer networking audio/visual equipment, communications systems, security systems, Internet connectivity, etc. Upon reading the teachings of this specification, those with ordinary skill in the art will now understand that, under appropriate circumstances, considering issues such as business and marketing strategy, types of clients, type of service being provided by licensor, etc., having technicians provide other services may suffice, such as, for example, repairing other types of equipment, janitorial services, etc. Further, upon reading the teachings of this specification, those with ordinary skill in the art will now understand that, under appropriate circumstances, considering issues such as business and marketing strategy, types of clients, type of service being provided by licensor, etc., using customer interface software for uses other than dispatching technicians may suffice, such as, for example, to make requests to customer service representatives, place orders at restaurants, and other situations in which a request for service can benefit from automated selection and dispatch of available resources to provide the requested service, etc.

Referring again to FIG. 73, in the arrange for credit card processing step 351, the licensee 801 will preferably conclude an agreement with appropriate credit card processing companies 305 to permit verification of customer 303 credit cards, the processing of credit card payment requests and automatic deposit of the payments to a specified bank account on behalf of the licensee 801. In the request payment step 352, each month the on-location services management software will preferably automatically create a payment request for each customer 303 and transmit it to the credit card processing company 305 for payment to the licensee 801. Alternatively, customer 303 may alternatively chooses to pay on a per visit basis using a credit card at the time of completion of the on-location services. Preferably, the technician 304 will enter the necessary credit card information in the 322 step which is preferably followed by the request payment step 352. In the receive payments step 353, the licensee 801 preferably receives the payments from customer 303 (embodying herein computer processor means for managing collecting at least one fee from such at least one customer relating to such on-location electronics troubleshooting services; and embodying herein computer processor and communications means for requesting such at least one payment from such at least one credit card account on behalf of such at least one customer substantially automatically at pre-determined intervals; and computer processor and communications means for requesting such at least one payment from such at least one credit card account on behalf of such at least one customer at completion of on-location electronics troubleshooting services by such at least one technician; and embodying herein computer processor means for recording such payment on behalf of such at least one customer).

Figure 74:
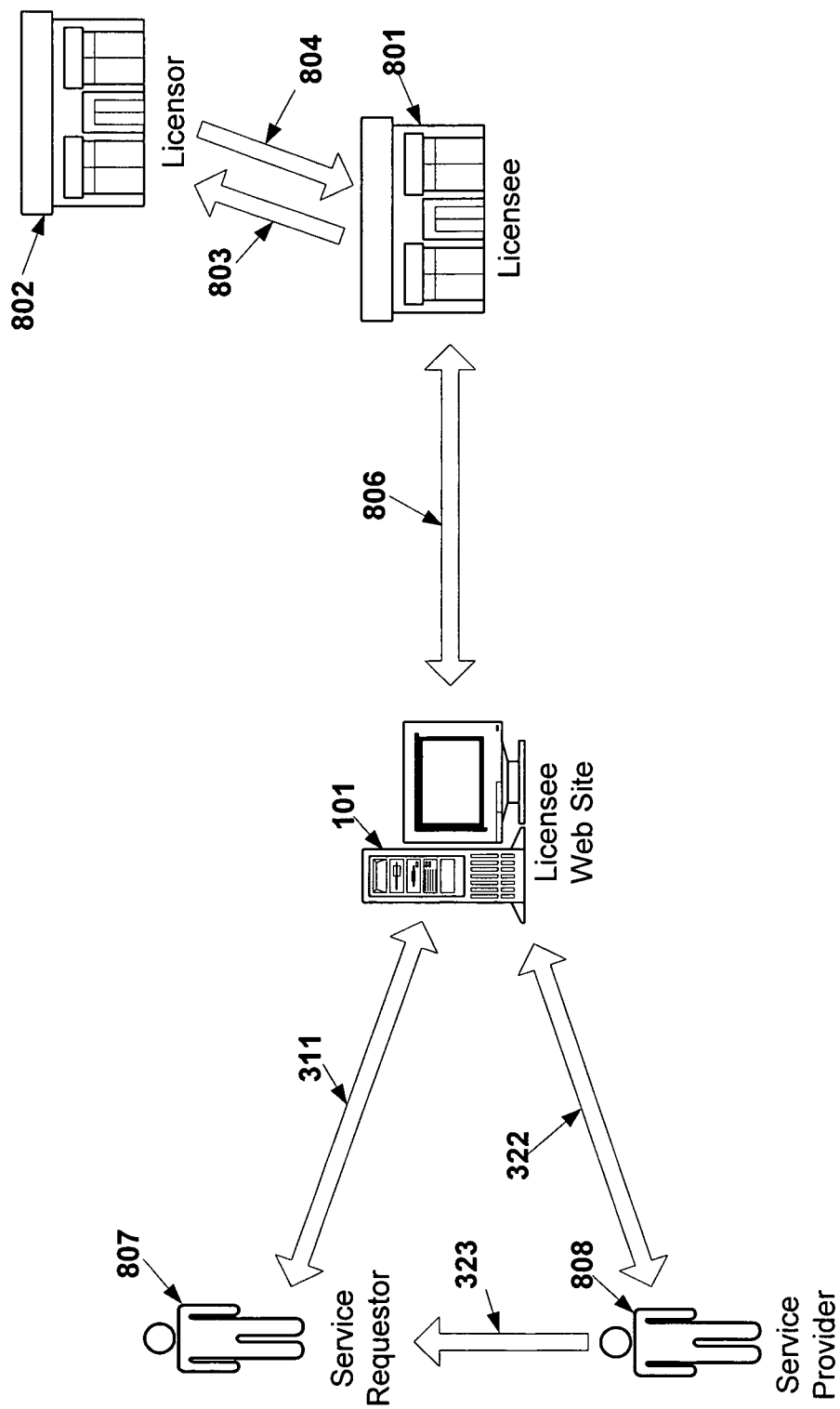
FIG. 74 is a schematic illustrating an overview of how the invention may, under appropriate circumstances, suffice to provide a variety of benefits and be implemented to solve many different problems, according to an alternate preferred embodiment of the present invention.

Referring now to FIG. 74, which presents an overview of how the invention may, under appropriate circumstances, suffice to provide a variety of benefits and be implemented to solve many different problems in different service and management environments. According to an alternate preferred embodiment of the present invention, the "customers" may be hotel guests, building tenants, services customers, or internal employees of a company as represented by service requester 807. Preferably, licensee 801 manages website 101 as indicated by step 806. Preferably, service requester 807 makes service requests via website 101 or telephone as indicated by step 311. Preferably, website software contacts service provider 808 as indicated by step 322 by telephone and/or by an Internet interface. Preferably, service provider 808 assists service requester 807 as indicated by step 323. Preferably, licensee 801 pays license fees to licensor 802, as indicated by step 803, in exchange for the license, as indicated by 804. Preferably, license fees are determined in various ways including level of usage as measured by the number of service requests managed, the number of service providers managed, the number of employees or some similar method.

With respect to providing hotel services to hotel guests, preferably the invention may be implemented to accept requests for toiletries, food, etc. via a user-interface on a personal computer in each room and/or have the guest call an internal or a 1-800 number to register their request. Preferably the request gets processed through the software and the appropriate service provider receives the message through a phone/pager and addresses the guest's needs without additional human intervention. Thus services to the guests are improved, workloads reduced and analysis of the types of requests and levels of service is provided through improved reporting.

With respect to services provided through call centers, such as AT&T for example. Preferably, customers would utilize the software installed on their computers or call a 1-800 number to initiate a question or request. Preferably, in turn the invention would identify the appropriate customer service representative in the call center, based on the nature of the request, who would then call the customer back. The customer receives improved service, get the problem solved and the company may potentially reduce staffing levels and better track and manage requests from start to closure.

With respect to Information Technology (IT) departments, preferably the invention may be used to accept, dispatch and manage technical requests for support and service from internal employees. Preferably an internal employee requiring assistance would utilize the software installed on their computers or call a 1-800 number to initiate a request. Preferably, in turn the invention would identify the appropriate IT support representative, based on the nature of the request, who would then provide the service to the requesting internal employee. The internal employees would get their problem solved more quickly and the company may potentially reduce staffing levels and better track and manage requests from start to closure.

With respect to building managers for large buildings, preferably the invention may be used to accept, dispatch and manage all manner of requests for support and services from building tenants. Preferably tenants requiring assistance would utilize the software installed on their computers or call a 1-800 number to initiate a request. Preferably, in turn the invention would identify the employee or trades contractor, based on the nature of the request, who would then provide the service to the requesting tenant. Tenants would get their problems solved more quickly and the building manager may potentially reduce staffing levels minimize trades contractor charges and better track and manage requests from start to closure.

With respect to employee scheduling and timekeeping, preferably the invention may be utilized to permit employees working away from the office, or in the office, to schedule their time and clocked in and out. Preferably, employees may be required to logon when a shift starts and log out when it ends using the invention. Preferably, this can be accomplished through software user interface on a personal computer or by calling a 1-800 number. Preferably, this use of the invention can eliminate a very manual and tedious process and problems with lying about hours worked, having employees clock in before a shift starts, clocking out before a shift ends, not properly adding up hours worked in a week by a given employee, not having a supervisor know when his/her employees are on/off the clock, etc.

Although the illustrated overviews provide at least one preferred embodiment, those skilled in the art will appreciate that, under appropriate circumstances, various sections may be omitted, rearranged or adapted in various ways for various purposes.

Upon reading this specification, those skilled in the art will see that, considering similarities, differences and advantages, under appropriate circumstances as a non-preferred embodiment, the methods described herein may be applied to a variety of on-location services other than low-voltage electronics troubleshooting.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An Internet-website-client-server-assisted system, relating to providing on-location electronics troubleshooting services, comprising the steps of:
   a) registering customer information relating to at least one customer;
   b) registering technician information relating to at least one technician having electronics-technician abilities relating to providing such on-location electronics troubleshooting services;
   c) maintaining a database, on at least one Internet website client server, of such customer information relating to such at least one customer;
   d) maintaining a database, on such at least one Internet website client server, of such technician information relating to such at least one technician;
   e) collecting automatically, using such at least one Internet website client server, at least one fee from such at least one customer relating to such on-location electronics troubleshooting services;
   f) receiving, on such at least one Internet website client server, requests relating to such on-location electronics troubleshooting services from such at least one customer;
   g) notifying automatically, using such at least one Internet website client server, such at least one technician to provide such on-location electronics troubleshooting services requested by such at least one customer;
   h) receiving on-location electronics troubleshooting service information, on at least one Internet website client server, from such at least one technician; and
   i) maintaining a database, on such at least one Internet website client server, of such on-location electronics troubleshooting service information
   j) receiving indication of any need relating to repair service, on such at least one Internet website client server, from such selected at least one technician;
   k) receiving indication of selected type of such repair service, on such at least one Internet website client server, from such selected at least one technician;
   l) storing such indication of any need relating to repair service on such at least one Internet website client server;
   m) storing such selected type of such repair service, on such at least one Internet website client server;

n) selecting such at least one repair service of such selected type of repair service; and
o) notifying such selected at least one repair service to contact such at least one customer;
p) wherein such at least one customer and such at least one technician are sufficiently co-located within geographical areas to provide appropriate response times; and
q) wherein such step of receiving on-location electronics troubleshooting service information by such at least one technician comprises the steps of:
  i) receiving start time of such on-location electronics troubleshooting service, on such at least one Internet website client server, from selected such at least one technician;
  ii) receiving end time of such on-location electronics troubleshooting services, on such at least one Internet website client server, from selected such at least one technician;
  iii) storing such start time of such on-location electronics troubleshooting service on such at least one Internet website client server; and
  iv) storing such end time of such on-location electronics troubleshooting service on such at least one Internet website client server.

2. The Internet-website-client-server-assisted system according to claim 1 further comprising the steps of:
  a) receiving customer satisfaction evaluation from such selected at least one technician; and
  b) storing such customer satisfaction evaluation.

3. The Internet-website-client-server-assisted system according to claim 1, wherein such step of collecting automatically, using such at least one Internet website client server, at least one fee from such at least one customer relating to such on-location electronics troubleshooting services comprises the steps of:
  a) agreeing to at least one payment of a specified amount by such at least one customer; and
  b) receiving such at least one payment.

4. The Internet-website-client-server-assisted system according to claim 3, wherein such step of receiving such at least one payment comprises the steps of;
  a) providing of credit card account information by such at least one customer;
  b) storing such at least one credit card account information, on at least one Internet website client server, relating to such at least one customer;
  c) authorizing at least one charge to such credit card account of such at least one customer;
  d) storing such authorization of at least one charge to such credit card account, on at least one Internet website client server, of such at least one customer;
  e) requesting at least one payment from such at least one credit card account on behalf of such at least one customer; and
  f) recording such at least one payment, on at least one Internet website client server, on behalf of such at least one customer.

5. The Internet-website-client-server-assisted system according to claim 4, wherein such step of requesting at least one payment from such at least one credit card account on behalf of such at least one customer comprises the step of requesting such at least one payment from such at least one credit card account on behalf of such at least one customer substantially automatically at predetermined intervals.

6. The Internet-website-client-server-assisted system according to claim 4, wherein such step of requesting at least one payment from such at least one credit card account on behalf of such at least one customer comprises the step of requesting such at least one payment from such at least one credit card account on behalf of such at least one customer at completion of on-location electronics troubleshooting services by such at least one technician.

7. The Internet-website-client-server-assisted system according to claim 1 further comprising the steps of:
  a) notifying such at least one customer requesting such on-location electronics troubleshooting services of estimated time of arrival of notified such at least one technician; and
  b) providing such on-location electronics troubleshooting services to such at least one customer.

8. The Internet-website-client-server-assisted system according to claim 7 wherein such step of notifying such at least one customer requesting such on-location electronics troubleshooting services of estimated time of arrival of notified such at least one technician comprises the steps of:
  a) providing to such at least one customer such estimated time of arrival by such notified such at least one technician; and
  b) recording such estimated time of arrival provided by such notified such at least one technician.

9. The Internet-website-client-server-assisted system according to claim 7 further comprising the steps of:
  a) providing such on-location electronics troubleshooting services to such at least one customer at any time of day; and
  b) providing such on-location electronics troubleshooting services to such at least one customer on any day.

10. The Internet-website-client-server-assisted system according to claim 1, wherein such step of registering customer information relating to at least one customer further comprises the steps of:
  a) recruiting such at least one customer;
  b) obtaining agreement from such at least one customer to pay for such on-location electronics troubleshooting services;
  c) recording such customer information, on at least one Internet website client server, relating to such at least one customer;
  d) wherein such customer information comprises
    i) service location address;
    ii) at least one contact name;
    iii) at least one contact telephone number; and
  e) assigning such service location address to at least one geographic dispatch area.

11. The Internet-website-client-server-assisted system according to claim 10, wherein such customer information further comprises:
  a) customer name;
  b) customer billing address;
  c) customer email address;
  d) customer credit card number; and
  e) customer credit card number expiration date.

12. The Internet-website-client-server-assisted system according to claim 10 further comprising the steps of:
  a) providing on-location assistance relating to implementation of such on-site customer interface module of such Internet-website-client-server-assisted system to such at least one customer; and
  b) providing on-location usage training relating to such on-site customer interface module of such Internet-website-client-server-assisted system to such at least one customer.

13. The Internet-website-client-server-assisted system according to claim 1, wherein such step of registering technician information relating to at least one technician having electronics-technician abilities relating to providing such on-location electronics troubleshooting services comprises the steps of:
- a) establishing a plurality of qualification criteria relating to selecting such at least one technician;
- b) wherein such qualification criteria comprise
  - i) geographic location of residence of such at least one technician, and
  - ii) required minimum competency levels relating to electronics-technician abilities; and
- c) recruiting such at least one technician; and
- d) recording technician information, on at least one Internet website client server, relating to selected such at least one technician;
- e) wherein such technician information comprises
  - i) technician name,
  - ii) technician home address,
  - iii) technician home telephone number,
  - iv) technician email address, and
  - v) technician electronics-technician skills;
- f) selecting such at least one technicians using such plurality of qualification criteria;
- g) assigning such selected at least one technician a unique identification number;
- h) assigning such technician home address to at least one geographic dispatch area; and
- i) implementing at least one technician user interface module of such Internet-website-client-server-assisted system.

14. The Internet-website-client-server-assisted system according to claim 13, wherein such technician information further comprises:
- a) technician cellular phone number; and
- b) technician pager number.

15. The Internet-website-client-server-assisted system according to claim 1 wherein such step of receiving, on such at least one Internet website client server, requests relating to such on-location electronics troubleshooting services from such at least one customer comprises the steps of:
- a) inputting of login identification information, on such at least one Internet website client server, from such at least one customer;
- b) validating login identification information from such at least one customer;
- c) receiving confirmation of accuracy, on such at least one Internet website client server, of such customer information;
- d) receiving contact information, on such at least one Internet website client server, relating to such current at least one on-location electronics troubleshooting request;
- e) submitting of at least one problem description relating to such current at least one on-location electronics troubleshooting request by such at least one customer; and
- f) receiving of such at least one problem description relating to such current at least one on-location electronics troubleshooting request, on such at least one Internet website client server, from such at least one customer.

16. The Internet-website-client-server-assisted system according to claim 1, wherein such step of notifying automatically, using such at least one Internet website client server, such at least one technician to provide such on-location electronics troubleshooting services requested by such at least one customer comprises the steps of:
- a) selecting such at least one technician using dispatch selection criteria;
- b) wherein such dispatch selection criteria comprises
  - i) identifying at least one of such at least one technician assigned to such same geographic dispatch area as such service location of such at least one customer requesting on-location electronics troubleshooting services, and
  - ii) identifying at least one such technician having greatest elapsed time since such last notification; and
- c) notifying such at least one technician to provide such on-location electronics troubleshooting services requested by such at least one customer; and
- d) recording time of such notification, on such at least one Internet website client server, of such at least one technician.

17. The Internet-website-client-server-assisted system according to claim 1 further comprising the steps of:
- a) receiving at least one work shift start request, on such at least one Internet website client server, from such at least one technician;
- b) storing time of day and date of receipt of such work shift start request, on such at least one Internet website client server, from such at least one technician;
- c) sending confirmation of start of work shift to such at least one technician;
- d) receiving at least one end of work shift request, on such at least one Internet website client server, from such at least one technici
- e) storing time of day and date of receipt of such at least one end of work shift request, on such at least one Internet website client server, from such at least one technician; and
- f) sending confirmation of end of work shift to such at least one technician.

18. The Internet-website-client-server-assisted system according to claim 17 further comprising the step of presenting planned shift scheduling to such at least one technician.

19. The Internet-website-client-server-assisted system according to claim 1 further comprising the steps of:
- a) preparing text-based reports; and
- b) preparing graphical reports.

20. An Internet website client-server computer system relating to providing on-location electronics troubleshooting services comprising, in combination:
- a) computer interface and storage means for registering customer data relating to at least one customer;
- b) computer interface and storage means for registering technician data relating to at least one technician having electronics-technician abilities relating to providing such on-location electronics troubleshooting services;
- c) database means for maintaining a database of such customer data relating to such at least one customer;
- d) database means for maintaining a database of such technician data relating to such at least one technician;
- e) computer processor means for managing collecting at least one fee from such at least one customer relating to such on-location electronics troubleshooting services;
- f) computer interface and storage means for receiving requests relating to such on-location electronics troubleshooting services from such at least one customer;
- g) computer processor and communications-device means for automatically notifying such at least one technician to provide such on-location electronics troubleshooting services requested by such at least one customer;
- h) computer interface and storage means for recording on-location electronics troubleshooting service information; and i) computer processor means for substantially fully automating such dispatching of such at least one technician to such at least one customer relating to such on-location troubleshooting.

21. The Internet website client-server computer system according to claim 20 further comprising:
  a) computer processing means for selecting such at least one technician using dispatch selection criteria;
  b) wherein such dispatch selection criteria comprises
    i) such at least one technician assigned to such same geographic dispatch area of such at least one customer requesting on-location electronics troubleshooting services, and
    ii) such at least one technician having greatest elapsed time since last such dispatch; and
  c) communications device means for notifying such at least one technician to provide such on-location electronics troubleshooting services requested by such at least one customer; and
  d) computer processor means for recording time of such notification of such at least one technician.

22. The Internet website client-server computer system according to claim 20, wherein such computer processor means for managing collecting at least one fee from such at least one customer relating to such on-location electronics troubleshooting services further comprises:
  a) computer interface and storage means for receiving credit card account information from such at least one customer;
  b) computer processor and communications means for requesting payment from such at least one credit card account on behalf of such at least one customer; and
  c) computer processor means for recording such payment on behalf of such at least one customer.

23. The Internet-website-client-server-assisted system according to claim 22, wherein such computer processor and communications means for requesting payment from such at least one credit card account on behalf of such at least one customer comprises computer processor and communications means for requesting such at least one payment from such at least one credit card account on behalf of such at least one customer substantially automatically at pre-determined intervals.

24. The Internet-website-client-server-assisted system according to claim 22, wherein such computer processor and communications means for requesting payment from such at least one credit card account on behalf of such at least one customer comprises computer processor and communications means for requesting such at least one payment from such at least one credit card account on behalf of such at least one customer at completion of on-location electronics troubleshooting services by such at least one technician.

25. The Internet website client-server computer system according to claim 20, wherein such computer interface and storage means for receiving requests relating to such on-location electronics troubleshooting services from such at least one customer further comprises:
  a) computer interface means for inputting login identification information by such at least one customer;
  b) computer processing means for validating login identification information from such at least one customer;
  c) computer interface means for receiving confirmation of accuracy of such customer information;
  d) computer interface and storage means for receiving contact information relating to such current at least one on-location electronics troubleshooting request; and
  e) computer interface and storage means for receiving at least one problem description relating to such current at least one on-location electronics troubleshooting request by such at least one customer.

26. The Internet website client-server computer system according to claim 20, further comprising:
  a) computer interface and storage means for receiving at least one work shift start request from such at least one technician;
  b) computer interface means for presenting confirmation of start of work shift to such at least one technician;
  c) computer interface and storage means for receiving at least one end of work shift request from such at least one technician;
  d) computer interface means for presenting confirmation of end of work shift to such at least one technician;
  e) computer interface means for presenting planned shift scheduling to such at least one technician;
  f) computer interface and processor means for presenting text reports; and
  g) computer interface and processor means for presenting graphical reports.

27. The Internet website client-server computer system according to claim 20, wherein such computer interface and storage means for recording on-location electronics troubleshooting service information further comprises:
  a) computer interface and storage means for receiving start time of such on-location electronics troubleshooting service from such selected at least one technician;
  b) computer interface and storage means for receiving end time of such on-location electronics troubleshooting services from such selected at least one technician;
  c) computer interface and storage means for receiving indication of any need relating to repair service from such selected at least one technician;
  d) computer interface and storage means for receiving indication of selected type of such repair service from such selected at least one technician;
  e) computer processor means for selecting such at least one repair service of such selected type of repair service;
  f) communications device means for notifying such selected at least one repair service to contact such at least one customer; and
  g) computer interface and storage means for receiving customer satisfaction evaluation.

* * * * *